US012639391B2

(12) United States Patent
Lepeska et al.

(10) Patent No.: US 12,639,391 B2
(45) Date of Patent: **\*May 26, 2026**

(54) BROWSER BASED FEEDBACK FOR OPTIMIZED WEB BROWSING

(71) Applicant: Snappi, Inc., Carlsbad, CA (US)

(72) Inventors: Peter Lepeska, Boston, MA (US); William B. Sebastian, Falmouth, MA (US)

(73) Assignee: Snappi, Inc., Carlsbad, CA (US)

( \* ) Notice: Subject to any disclaimer, the term of this patent is extended or adjusted under 35 U.S.C. 154(b) by 0 days.

This patent is subject to a terminal disclaimer.

(21) Appl. No.: 18/426,594

(22) Filed: Jan. 30, 2024

(65) Prior Publication Data

US 2024/0169010 A1 May 23, 2024

Related U.S. Application Data

(63) Continuation of application No. 17/499,255, filed on Oct. 12, 2021, now Pat. No. 11,983,233, which is a
(Continued)

(51) Int. Cl.
*G06F 16/957* (2019.01)
*G06F 16/955* (2019.01)
(Continued)

(52) U.S. Cl.
CPC ...... *G06F 16/9574* (2019.01); *G06F 16/9566* (2019.01); *H04L 67/01* (2022.05);
(Continued)

(58) Field of Classification Search
CPC ............................ H04L 67/00; H04L 67/5681
See application file for complete search history.

(56) References Cited

U.S. PATENT DOCUMENTS 5,408,470 A 4/1995 Rothrock et al.
5,485,609 A 1/1996 Vitter et al.
(Continued)

FOREIGN PATENT DOCUMENTS

EP 1041497 B1 1/2005
EP 1018085 B1 4/2006
(Continued)

OTHER PUBLICATIONS

"Alnuem, "An Extended Review of Techniques for Enhancing TCP Performance", J_ King Saud University, vol. 22, Comp. & Info. Sci., 2010, pp. 45-61".
(Continued)

*Primary Examiner* — Benjamin M Thieu
(74) *Attorney, Agent, or Firm* — GTC Law Group PC & Affiliates

(57) ABSTRACT

A method of rendering a web page that includes: receiving, by a client computing device, a first hint identifying a first web object transaction for obtaining a first web object of a plurality of web objects of the web page; and initiating, by the client computing device, the first web object transaction to obtain the first web object. The method further includes: receiving, by the client computing device, the web page; and rendering, by the client computing device, the web page utilizing the first web object.

52 Claims, 26 Drawing Sheets

Related U.S. Application Data continuation of application No. 16/502,688, filed on Jul. 3, 2019, now Pat. No. 11,176,219, which is a continuation of application No. 14/789,271, filed on Jul. 1, 2015, now Pat. No. 10,372,780, which is a continuation of application No. 13/372,347, filed on Feb. 13, 2012, now Pat. No. 9,106,607.

(60) Provisional application No. 61/550,296, filed on Oct. 21, 2011, provisional application No. 61/442,119, filed on Feb. 11, 2011.

(51) Int. Cl.

| | |
|---|---|
| *H04L 67/01* | (2022.01) |
| *H04L 67/02* | (2022.01) |
| *H04L 67/50* | (2022.01) |
| *H04L 67/563* | (2022.01) |
| *H04L 67/568* | (2022.01) |
| *H04L 67/5681* | (2022.01) |
| *H04L 67/5682* | (2022.01) |

(52) U.S. Cl.
CPC ............ *H04L 67/02* (2013.01); *H04L 67/535* (2022.05); *H04L 67/563* (2022.05); *H04L 67/568* (2022.05); *H04L 67/5681* (2022.05); *H04L 67/5682* (2022.05)

(56) References Cited

U.S. PATENT DOCUMENTS

| | | | |
|---|---|---|---|
| 5,727,129 A | 3/1998 | Barrett et al. | |
| 5,740,367 A | 4/1998 | Spilo | |
| 5,870,754 A | 2/1999 | Dimitrova et al. | |
| 5,878,223 A | 3/1999 | Becker et al. | |
| 5,905,981 A | 5/1999 | Lawler | |
| 6,055,569 A | 4/2000 | Obrien et al. | |
| 6,085,193 A * | 7/2000 | Malkin ................... H04L 67/02 |
| | | | 709/200 |
| 6,085,226 A | 7/2000 | Horvitz | |
| 6,178,461 B1 | 1/2001 | Chan et al. | |
| 6,182,133 B1 | 1/2001 | Horvitz | |
| 6,253,264 B1 | 6/2001 | Sebastian | |
| 6,339,787 B1 | 1/2002 | Yohe et al. | |
| 6,453,389 B1 | 9/2002 | Weinberger et al. | |
| 6,463,508 B1 | 10/2002 | Wolf et al. | |
| 6,549,896 B1 * | 4/2003 | Candan ............... G06F 16/9574 |
| 6,578,073 B1 | 6/2003 | Starnes et al. | |
| 6,622,168 B1 | 9/2003 | Datta | |
| 6,701,316 B1 | 3/2004 | Li et al. | |
| 6,721,780 B1 | 4/2004 | Kasriel et al. | |
| 6,878,223 B2 | 4/2005 | Kuen et al. | |
| 6,879,808 B1 | 4/2005 | Nations et al. | |
| 6,993,591 B1 | 1/2006 | Klemm | |
| 7,113,935 B2 | 9/2006 | Saxena | |
| 7,124,305 B2 | 10/2006 | Margolus et al. | |
| 7,130,890 B1 | 10/2006 | Kumar et al. | |
| 7,237,061 B1 | 6/2007 | Boic | |
| 7,340,510 B1 | 3/2008 | Liskov et al. | |
| 7,343,397 B2 | 3/2008 | Kochanski | |
| 7,359,956 B2 | 4/2008 | Kanai et al. | |
| 7,363,291 B1 | 4/2008 | Page | |
| 7,418,494 B2 | 8/2008 | Dahlin et al. | |
| 7,430,331 B2 | 9/2008 | Singh | |
| 7,509,667 B1 | 3/2009 | Cook | |
| 7,526,607 B1 | 4/2009 | Singh et al. | |
| 7,548,947 B2 | 6/2009 | Kasriel et al. | |
| 7,636,767 B2 | 12/2009 | Lev-Ran et al. | |
| 7,680,897 B1 | 3/2010 | Carter et al. | |
| 7,681,032 B2 | 3/2010 | Peled et al. | |
| 7,716,225 B1 | 5/2010 | Dean et al. | |
| 7,716,332 B1 | 5/2010 | Topfl et al. | |
| 7,716,367 B1 | 5/2010 | Leighton et al. | |
| 7,747,749 B1 | 6/2010 | Erikson et al. | |

| | | | |
|---|---|---|---|
| 7,778,438 B2 | 8/2010 | Malone | |
| 7,814,149 B1 | 10/2010 | Stringham | |
| 7,836,177 B2 | 11/2010 | Kasriel et al. | |
| 7,917,531 B2 | 3/2011 | Sakurai et al. | |
| 7,941,409 B2 | 5/2011 | Mimatsu | |
| 7,941,609 B2 | 5/2011 | Almog | |
| 7,953,881 B1 | 5/2011 | Vadlakonda et al. | |
| 7,975,019 B1 | 7/2011 | Green et al. | |
| 7,975,025 B1 | 7/2011 | Szabo et al. | |
| 7,975,071 B2 | 7/2011 | Ramjee et al. | |
| 8,010,705 B1 | 8/2011 | Sebastian et al. | |
| 8,041,677 B2 | 10/2011 | Sumner et al. | |
| 8,055,616 B2 | 11/2011 | Johnston et al. | |
| 8,082,228 B2 | 12/2011 | Mu | |
| 8,136,089 B2 | 3/2012 | Snodgrass et al. | |
| 8,151,004 B1 | 4/2012 | Ufimtsev et al. | |
| 8,209,510 B1 | 6/2012 | Thathapudi et al. | |
| 8,224,964 B1 | 7/2012 | Fredrickson et al. | |
| 8,230,059 B1 | 7/2012 | Santos et al. | |
| 8,230,461 B1 | 7/2012 | Ledermann et al. | |
| 8,284,773 B1 | 10/2012 | Woleben et al. | |
| 8,327,440 B2 | 12/2012 | Milener et al. | |
| 8,335,838 B2 | 12/2012 | Zhang et al. | |
| 8,341,245 B1 | 12/2012 | Roskind et al. | |
| 8,352,318 B2 | 1/2013 | Rikhtverchik et al. | |
| 8,381,213 B1 | 2/2013 | Naamad et al. | |
| 8,423,889 B1 | 4/2013 | Zagorie et al. | |
| 8,477,635 B2 | 7/2013 | Sebastian et al. | |
| 8,478,843 B1 | 7/2013 | Ortlieb et al. | |
| 8,489,672 B2 | 7/2013 | Sebastian et al. | |
| 8,489,673 B2 | 7/2013 | Sebastian et al. | |
| 8,543,907 B1 * | 9/2013 | Roskind ............... G06F 16/958 |
| | | | 715/234 |
| 8,566,788 B2 | 10/2013 | Snodgrass et al. | |
| 8,612,374 B1 | 12/2013 | Amdahl et al. | |
| 8,639,744 B2 | 1/2014 | Sebastian | |
| 8,812,648 B2 | 8/2014 | Subramanian et al. | |
| 8,984,048 B1 | 3/2015 | Maniscalco et al. | |
| 9,037,638 B1 | 5/2015 | Lepeska et al. | |
| 9,083,583 B1 | 7/2015 | Roskind et al. | |
| 9,083,584 B2 | 7/2015 | Lee | |
| 9,106,607 B1 | 8/2015 | Lepeska et al. | |
| 9,135,364 B1 | 9/2015 | Sundaram et al. | |
| 9,231,949 B1 | 1/2016 | Jenkins et al. | |
| 9,239,862 B2 | 1/2016 | Mizrotsky et al. | |
| 9,372,780 B2 | 6/2016 | Barsness et al. | |
| 9,387,522 B2 | 7/2016 | Greeb | |
| 9,456,050 B1 | 9/2016 | Lepeska et al. | |
| 9,460,229 B2 | 10/2016 | Lepeska et al. | |
| 9,524,287 B2 | 12/2016 | Davis et al. | |
| 9,613,158 B1 | 4/2017 | Lepeska | |
| 9,621,669 B2 | 4/2017 | Crowe et al. | |
| 9,654,575 B1 | 5/2017 | Sullivan et al. | |
| 9,747,386 B1 | 8/2017 | Jenkins et al. | |
| 9,787,551 B2 | 10/2017 | Newton et al. | |
| 9,817,800 B2 | 11/2017 | Lee et al. | |
| 9,819,554 B2 | 11/2017 | Varney et al. | |
| 9,847,917 B2 | 12/2017 | Varney et al. | |
| 9,887,885 B2 | 2/2018 | Varney et al. | |
| 9,898,445 B2 | 2/2018 | Reshadi et al. | |
| 9,912,718 B1 | 3/2018 | Lepeska et al. | |
| 10,171,550 B1 | 1/2019 | Lepeska et al. | |
| 10,372,780 B1 | 8/2019 | Lepeska et al. | |
| 10,387,522 B2 | 8/2019 | Lepeska et al. | |
| 10,491,703 B1 | 11/2019 | Lepeska et al. | |
| 10,735,548 B1 | 8/2020 | Lepeska et al. | |
| 10,855,797 B2 | 12/2020 | Lepeska et al. | |
| 10,855,979 B2 | 12/2020 | Pace et al. | |
| 11,176,219 B1 | 11/2021 | Lepeska et al. | |
| 11,176,223 B1 | 11/2021 | Hill | |
| 11,983,233 B2 | 5/2024 | Lepeska et al. | |
| 12,061,663 B2 | 8/2024 | Lepeska et al. | |
| 2001/0016836 A1 | 8/2001 | Boccon-Gibod et al. | |
| 2001/0043600 A1 | 11/2001 | Chatterjee et al. | |
| 2001/0047517 A1 | 11/2001 | Christopoulos et al. | |
| 2001/0051927 A1 | 12/2001 | London et al. | |
| 2002/0006116 A1 | 1/2002 | Burkhart | |
| 2002/0010761 A1 * | 1/2002 | Carneal ................... H04L 67/02 |
| | | | 709/219 |

(56) References Cited

U.S. PATENT DOCUMENTS

| | | | |
|---|---|---|---|
| 2002/0026478 A1 | 2/2002 | Rodgers et al. | |
| 2002/0154887 A1 | 10/2002 | Lu | |
| 2002/0188735 A1 | 12/2002 | Needham et al. | |
| 2002/0194473 A1 | 12/2002 | Pope et al. | |
| 2003/0018581 A1 | 1/2003 | Bratton et al. | |
| 2003/0105833 A1 | 6/2003 | Daniels et al. | |
| 2003/0120658 A1 | 6/2003 | Carneal et al. | |
| 2003/0126232 A1 | 7/2003 | Mogul et al. | |
| 2003/0237053 A1 | 12/2003 | Chen et al. | |
| 2004/0064577 A1 | 4/2004 | Dahlin et al. | |
| 2004/0128618 A1* | 7/2004 | Datta | G06F 16/9574 |
| | | | 715/234 |
| 2004/0205149 A1 | 10/2004 | Dillon et al. | |
| 2005/0010870 A1 | 1/2005 | Gu et al. | |
| 2005/0015387 A1 | 1/2005 | Sassi et al. | |
| 2005/0015442 A1 | 1/2005 | Olaughlen et al. | |
| 2005/0027820 A1 | 2/2005 | Olaughlen et al. | |
| 2005/0033747 A1 | 2/2005 | Wittkotter | |
| 2005/0044242 A1 | 2/2005 | Stevens et al. | |
| 2005/0131903 A1 | 6/2005 | Margolus et al. | |
| 2005/0154781 A1 | 7/2005 | Carlson et al. | |
| 2005/0193096 A1 | 9/2005 | Yu et al. | |
| 2006/0047804 A1 | 3/2006 | Fredricksen et al. | |
| 2006/0075068 A1* | 4/2006 | Kasriel | H04L 67/56 |
| | | | 709/217 |
| 2006/0101514 A1 | 5/2006 | Milener et al. | |
| 2006/0112264 A1 | 5/2006 | Agarwal | |
| 2006/0116926 A1 | 6/2006 | Chen | |
| 2006/0149826 A1 | 7/2006 | Rooney | |
| 2006/0184960 A1 | 8/2006 | Horton et al. | |
| 2006/0253444 A1 | 11/2006 | Otoole et al. | |
| 2006/0277257 A1 | 12/2006 | Kromann et al. | |
| 2006/0288072 A1 | 12/2006 | Knapp et al. | |
| 2006/0294112 A1 | 12/2006 | Mandato et al. | |
| 2006/0294223 A1* | 12/2006 | Glasgow | H04L 67/56 |
| | | | 709/224 |
| 2007/0033408 A1 | 2/2007 | Morten | |
| 2007/0050338 A1* | 3/2007 | Strohm | G06F 16/951 |
| 2007/0101074 A1 | 5/2007 | Patterson | |
| 2007/0111713 A1 | 5/2007 | Silverbrook et al. | |
| 2007/0116151 A1 | 5/2007 | Thesling | |
| 2007/0133554 A1 | 6/2007 | Ederer et al. | |
| 2007/0143484 A1 | 6/2007 | Drouet et al. | |
| 2007/0156845 A1 | 7/2007 | Devanneaux et al. | |
| 2007/0174246 A1 | 7/2007 | Sigurdsson et al. | |
| 2007/0220303 A1 | 9/2007 | Kimura et al. | |
| 2007/0226320 A1 | 9/2007 | Hager et al. | |
| 2007/0256021 A1 | 11/2007 | Prager et al. | |
| 2007/0260653 A1 | 11/2007 | Jaffri et al. | |
| 2007/0288518 A1 | 12/2007 | Crigler et al. | |
| 2008/0005086 A1 | 1/2008 | Moore | |
| 2008/0066182 A1 | 3/2008 | Hickmott et al. | |
| 2008/0082509 A1 | 4/2008 | Bessieres et al. | |
| 2008/0091711 A1 | 4/2008 | Snodgrass et al. | |
| 2008/0114773 A1 | 5/2008 | Choi et al. | |
| 2008/0115125 A1 | 5/2008 | Stafford et al. | |
| 2008/0144713 A1 | 6/2008 | Kimmich et al. | |
| 2008/0155614 A1 | 6/2008 | Cooper et al. | |
| 2008/0163380 A1* | 7/2008 | Liu | G06F 16/9535 |
| | | | 726/28 |
| 2008/0175239 A1 | 7/2008 | Sistanizadeh et al. | |
| 2008/0201331 A1 | 8/2008 | Eriksen et al. | |
| 2008/0201332 A1 | 8/2008 | Souders et al. | |
| 2008/0205396 A1 | 8/2008 | Dakshinamoorthy et al. | |
| 2008/0229021 A1 | 9/2008 | Plamondon | |
| 2008/0235594 A1 | 9/2008 | Bhumkar et al. | |
| 2008/0235739 A1 | 9/2008 | Coebergh | |
| 2008/0256138 A1 | 10/2008 | Sim-Tang | |
| 2008/0263130 A1 | 10/2008 | Michalowitz et al. | |
| 2009/0006368 A1 | 1/2009 | Mei et al. | |
| 2009/0019153 A1 | 1/2009 | Sebastian | |
| 2009/0037393 A1 | 2/2009 | Fredricksen et al. | |
| 2009/0047937 A1 | 2/2009 | Zellner et al. | |
| 2009/0049469 A1 | 2/2009 | Small et al. | |
| 2009/0055471 A1 | 2/2009 | Kozat et al. | |
| 2009/0055862 A1 | 2/2009 | Knoller et al. | |
| 2009/0060086 A1 | 3/2009 | Kimmich et al. | |
| 2009/0100228 A1 | 4/2009 | Lepeska et al. | |
| 2009/0112975 A1 | 4/2009 | Beckman et al. | |
| 2009/0158318 A1 | 6/2009 | Levy | |
| 2009/0168795 A1 | 7/2009 | Segel | |
| 2009/0187673 A1 | 7/2009 | Ramjee et al. | |
| 2009/0228782 A1 | 9/2009 | Fraser | |
| 2009/0234809 A1 | 9/2009 | Bluger et al. | |
| 2009/0276488 A1 | 11/2009 | Alstad | |
| 2009/0313329 A1 | 12/2009 | Agrawal et al. | |
| 2010/0016836 A1 | 1/2010 | Makower et al. | |
| 2010/0017696 A1 | 1/2010 | Choudhary et al. | |
| 2010/0058430 A1 | 3/2010 | Jones et al. | |
| 2010/0083322 A1 | 4/2010 | Rouse | |
| 2010/0095220 A1 | 4/2010 | Kassab | |
| 2010/0146415 A1 | 6/2010 | Lepeska | |
| 2010/0169262 A1 | 7/2010 | Kenedy et al. | |
| 2010/0169313 A1 | 7/2010 | Kenedy et al. | |
| 2010/0177642 A1 | 7/2010 | Sebastian et al. | |
| 2010/0179984 A1 | 7/2010 | Sebastian | |
| 2010/0179986 A1 | 7/2010 | Sebastian et al. | |
| 2010/0179987 A1 | 7/2010 | Sebastian et al. | |
| 2010/0180046 A1* | 7/2010 | Sebastian | H04L 67/01 |
| | | | 709/234 |
| 2010/0185730 A1 | 7/2010 | Sebastian | |
| 2010/0191856 A1 | 7/2010 | Gupta et al. | |
| 2010/0228880 A1* | 9/2010 | Hunt | G06F 16/9577 |
| | | | 709/246 |
| 2010/0228963 A1 | 9/2010 | Kassab et al. | |
| 2010/0232431 A1 | 9/2010 | Sebastian | |
| 2010/0235579 A1 | 9/2010 | Biles et al. | |
| 2010/0312858 A1 | 12/2010 | Mickens et al. | |
| 2011/0029641 A1* | 2/2011 | Fainberg | H04L 67/02 |
| | | | 709/224 |
| 2011/0078124 A1 | 3/2011 | Ushiyama | |
| 2011/0238924 A1 | 9/2011 | Hampton et al. | |
| 2011/0246880 A1 | 10/2011 | Horton et al. | |
| 2011/0258532 A1 | 10/2011 | Ceze et al. | |
| 2011/0270959 A1 | 11/2011 | Schlusser et al. | |
| 2011/0295979 A1 | 12/2011 | Alstad et al. | |
| 2012/0060121 A1 | 3/2012 | Goldberg et al. | |
| 2012/0066586 A1 | 3/2012 | Shemesh | |
| 2012/0084516 A1 | 4/2012 | Iwuchukwu | |
| 2012/0136926 A1 | 5/2012 | Dillon | |
| 2012/0185505 A1 | 7/2012 | Borden et al. | |
| 2012/0239598 A1 | 9/2012 | Cascaval et al. | |
| 2013/0031459 A1 | 1/2013 | Khorashadi et al. | |
| 2013/0166634 A1 | 6/2013 | Holland | |
| 2013/0226837 A1* | 8/2013 | Lymberopoulos | |
| | | | G06F 16/9574 |
| | | | 706/12 |
| 2013/0226992 A1 | 8/2013 | Bapst et al. | |
| 2013/0297561 A1* | 11/2013 | Mizrotsky | H04L 67/00 |
| | | | 707/722 |
| 2014/0108503 A1 | 4/2014 | Haykal et al. | |
| 2014/0149850 A1 | 5/2014 | Khorashadi et al. | |
| 2014/0215001 A1 | 7/2014 | Tucek et al. | |
| 2014/0279851 A1 | 9/2014 | Rangarajan et al. | |
| 2015/0156194 A1 | 6/2015 | Modi et al. | |
| 2015/0271287 A1 | 9/2015 | Islam et al. | |
| 2015/0304384 A1 | 10/2015 | Lee | |
| 2015/0350370 A1 | 12/2015 | Lepeska et al. | |
| 2018/0246982 A1 | 8/2018 | Lepeska et al. | |
| 2018/0337972 A1 | 11/2018 | Lepeska et al. | |
| 2022/0138279 A1 | 5/2022 | Lepeska et al. | |
| 2023/0334110 A1 | 10/2023 | Lepeska et al. | |
| 2024/0160684 A1 | 5/2024 | Lepeska et al. | |

FOREIGN PATENT DOCUMENTS

| | | | |
|---|---|---|---|
| WO | 0161886 A2 | 8/2001 | |
| WO | 0184777 A2 | 11/2001 | |
| WO | 0241527 A1 | 5/2002 | |
| WO | 2007051079 A2 | 5/2007 | |
| WO | 2008070614 A2 | 6/2008 | |

(56) References Cited

FOREIGN PATENT DOCUMENTS

| | | |
|---|---|---|
| WO | 2010081160 A2 | 7/2010 |
| WO | 2017069735 A1 | 4/2017 |

OTHER PUBLICATIONS

"PCT/US2015/056375, "International Preliminary Report on Patentability", May 3, 2018, 7 pages", 6 pgs.

De La Ossa et al., , "Delfos: the Oracle to Predict Next Web User's Accesses", 21st International Conference on Advanced Networking and Applications (AINA '07), DOI: 0-7695-2846, May 2007, 8 pgs.

Frantzeskou, et al., ""Effective Identification of Source Code Authors Using Byte-Level Information" May 2006, pp. 893-896", Proceedings o he 28th International Conference on Software Engineering, vol. 1, May 2006, pp. 893-896.

Grigorik, Ilya , "Eliminating Roundtrips with Preconnect", https://www.igvita.com/2015/08/17/eliminating-roundtrips-with-preconnect, Aug. 17, 2015, 4 pgs.

Grigorik, Ilya , "High Performance Networking in Google Chrome", https://www.igvita.com/posa/high-performance-networking-in-google-chrome, Jan. 31, 2013, 20 pgs.

Grigorik, et al., "Resource Hints," W3C First Public Working Draft, https://wwww3.org/TR/2014/WD-resource-hints-20141021, Oct. 21, 2014, 10 pgs.

Grigorik , et al., "Resource Hints," W3C Working Draft, https://www.w3.org/TR/2016/WD-resource-hints-20160225, Feb. 25, 2016, 13 pgs.

Markham, "Mouseover Prefetch? Hacking for Christ", Available Online at: https://blog.gerv.nel/2009/05/mouseover_prefetch/, May 27, 2009, pp. 1-10.

Paul, et al., "Distributed Caching with Centralized Control", Computer Communications, vol. 24, Issue 2, Feb. 1, 2001, 1-13.

PCT/US2015/056375 , "International Application No. PCT/US2015/056375 International Search Report and Written Opinion mailed on Jun. 8, 2016", 4 pgs.

Selvakumar, et al., "Implementation and Comparison of Distributed Caching Schemes", Computer Communications, vol. 24, Issues 7-8, Apr. 1, 2001, pp. 677-684.

Souders, Steve , "Prebrowsing", https://www.stevesouders.com/blog/2013/11/07/prebrowsing, Nov. 7, 2013, 8 pgs.

Walsh, "HTML5 Link Prefetching", DWB, Jul. 7, 2010.

U.S. Appl. No. 18/932,161, filed Oct. 30, 2024, Pending, Peter J. Lepeska.

Deckers, Sebastiaan, "Cache Digests: Solving the Cache Invalidation Problem of HTTP/2 Server Push to Reduce Latency and Bandwidth", https://calendar.perfplanet.com/2016/cache-digests-http2-server-push/, 2016, 1-6.

Fielding, et al., "HTTP Caching", https://datatracker.ietf.org/doc/html/rfc9111, Jun. 2022, 1-38.

Grigorik, Ilya, "Chrome Networking: DNS Prefetch & TCP Preconnect", Jun. 4, 2012, 5pgs.

Hazout, Roei, "HTTP/2 Server Push", https://www.ioriver.io/terms/http-2-server-push, Jun. 12, 2025.

Wagner, Jeremy, "A Comprehensive Guide to HTTP/2 Server Push", https://www.smashingmagazine.com/2017/04/guide-http2-server-push/, Apr. 10, 2017, 1-21.

Wiese, Fili, "HTTP Caching", https://http.dev/caching, Jun. 13, 2025, 1-15.

* cited by examiner

Single object page load timing 2200

| 2202 | 2204 | 2202 | 2202 | 2202 |
|------|------|------|------|------|

Single object page load timing 2200

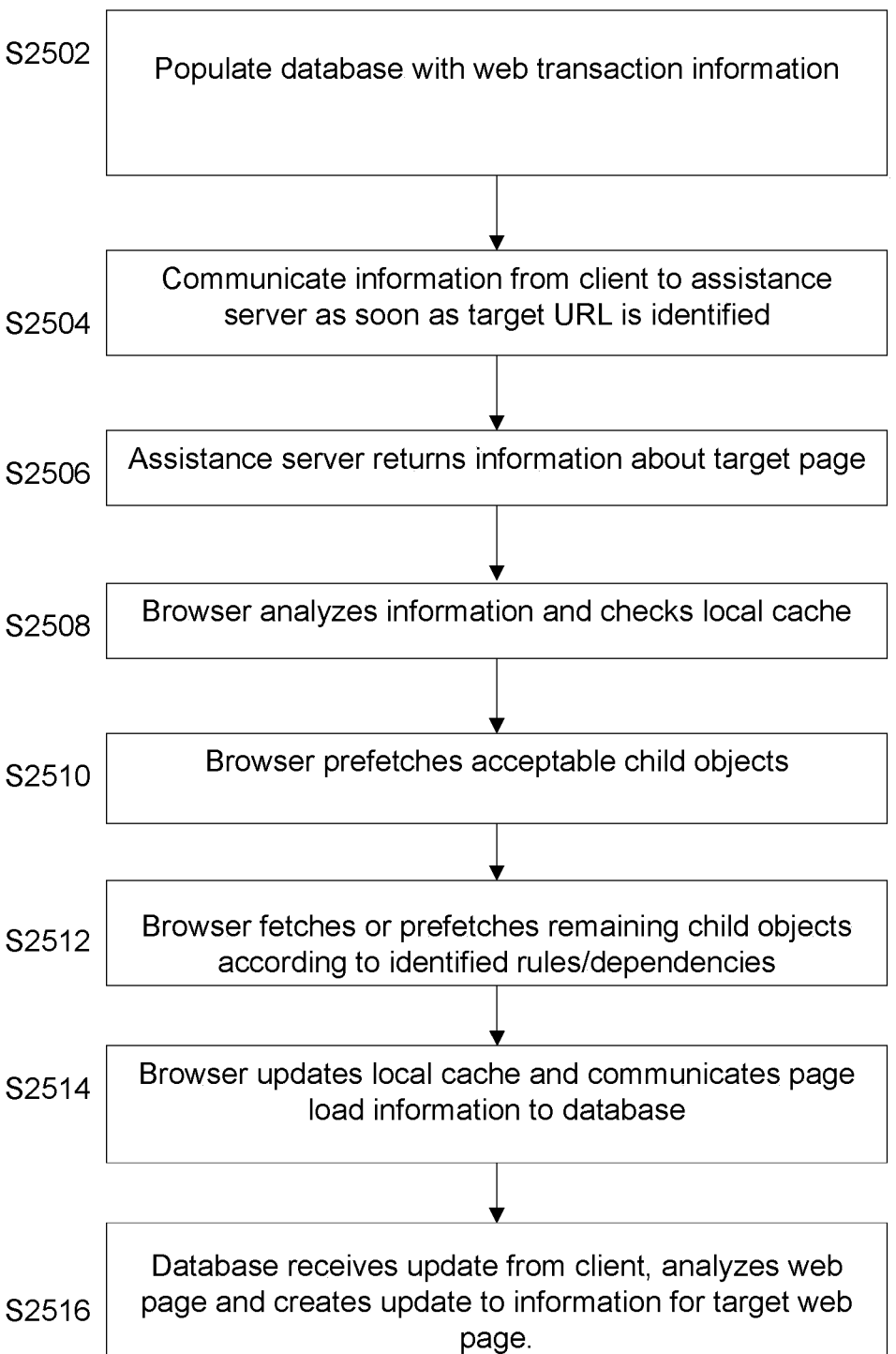

S2502     Populate database with web transaction information

S2504     Communicate information from client to assistance server as soon as target URL is identified S2506     Assistance server returns information about target page S2508     Browser analyzes information and checks local cache S2510     Browser prefetches acceptable child objects S2512     Browser fetches or prefetches remaining child objects according to identified rules/dependencies S2514     Browser updates local cache and communicates page load information to database S2516     Database receives update from client, analyzes web page and creates update to information for target web page.

FIG. 1E

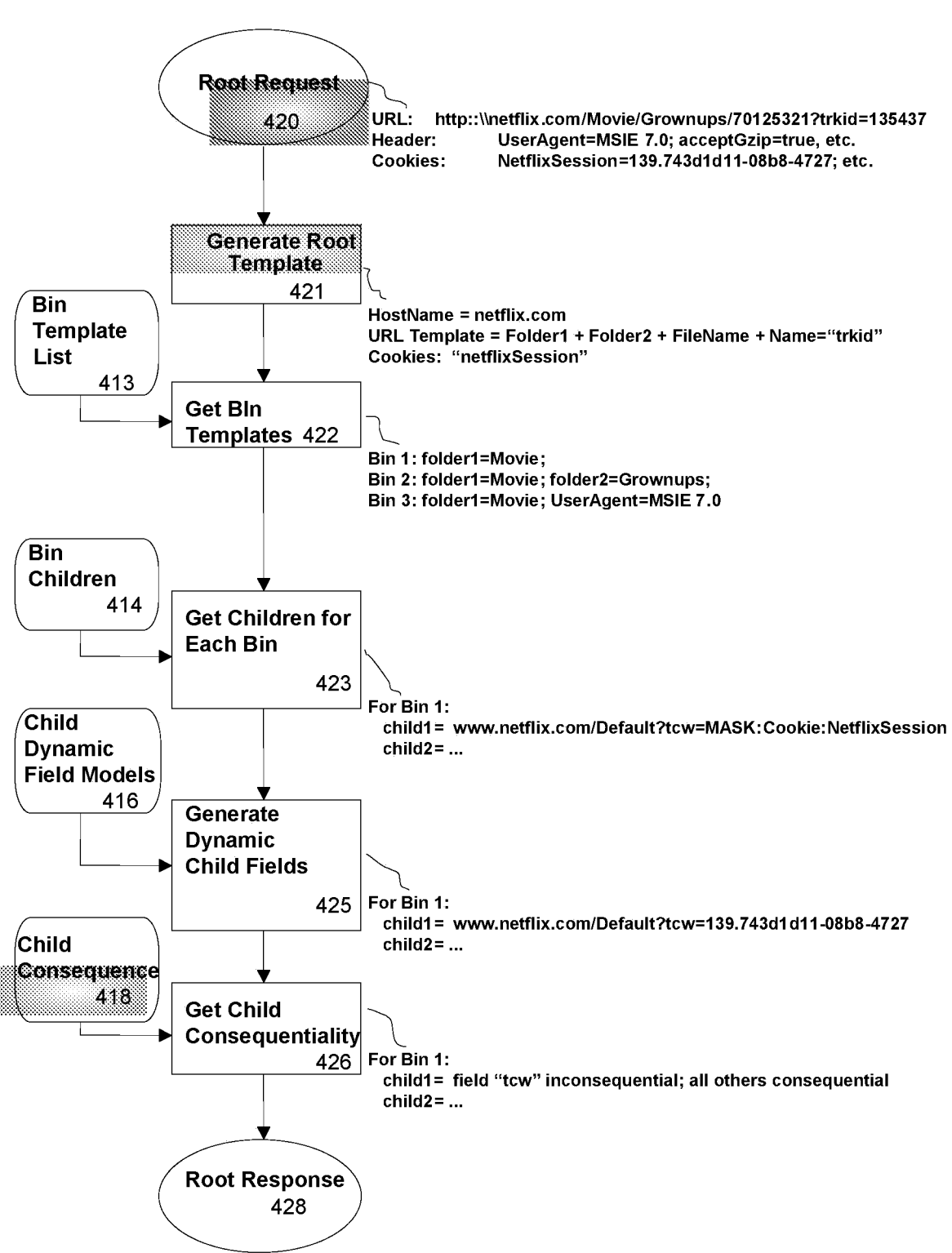

Root Request 420

URL:      http::\\netflix.com/Movie/Grownups/70125321?trkid=135437
Header:        UserAgent=MSIE 7.0; acceptGzip=true, etc.
Cookies:       NetflixSession=139.743d1d11-08b8-4727; etc.

Generate Root Template 421

HostName = netflix.com
URL Template = Folder1 + Folder2 + FileName + Name="trkid"
Cookies: "netflixSession"

Bin Template List 413

Get Bin Templates 422

Bin 1: folder1=Movie;
Bin 2: folder1=Movie; folder2=Grownups;
Bin 3: folder1=Movie; UserAgent=MSIE 7.0

Bin Children 414

Get Children for Each Bin 423

For Bin 1:
    child1= www.netflix.com/Default?tcw=MASK:Cookie:NetflixSession
    child2= ...

Child Dynamic Field Models 416

Generate Dynamic Child Fields 425

For Bin 1:
    child1= www.netflix.com/Default?tcw=139.743d1d11-08b8-4727
    child2= ...

Child Consequence 418

Get Child Consequentiality 426

For Bin 1:
    child1= field "tcw" inconsequential; all others consequential
    child2= ...

Root Response 428

FIG. 4

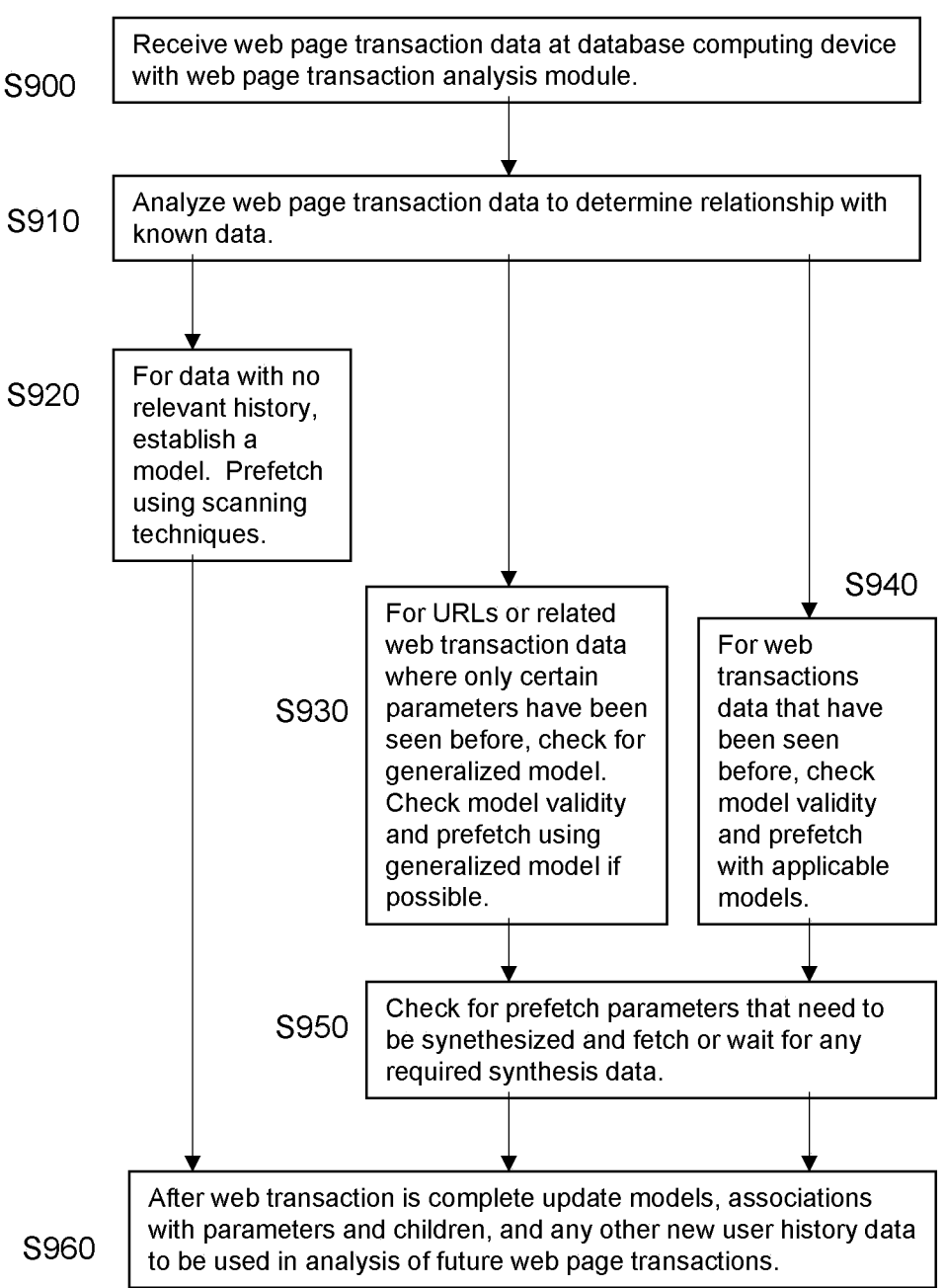

S900 — Receive web page transaction data at database computing device with web page transaction analysis module.

S910 — Analyze web page transaction data to determine relationship with known data.

S920 — For data with no relevant history, establish a model. Prefetch using scanning techniques.

S930 — For URLs or related web transaction data where only certain parameters have been seen before, check for generalized model. Check model validity and prefetch using generalized model if possible.

S940 — For web transactions data that have been seen before, check model validity and prefetch with applicable models.

S950 — Check for prefetch parameters that need to be synethesized and fetch or wait for any required synthesis data.

S960 — After web transaction is complete update models, associations with parameters and children, and any other new user history data to be used in analysis of future web page transactions.

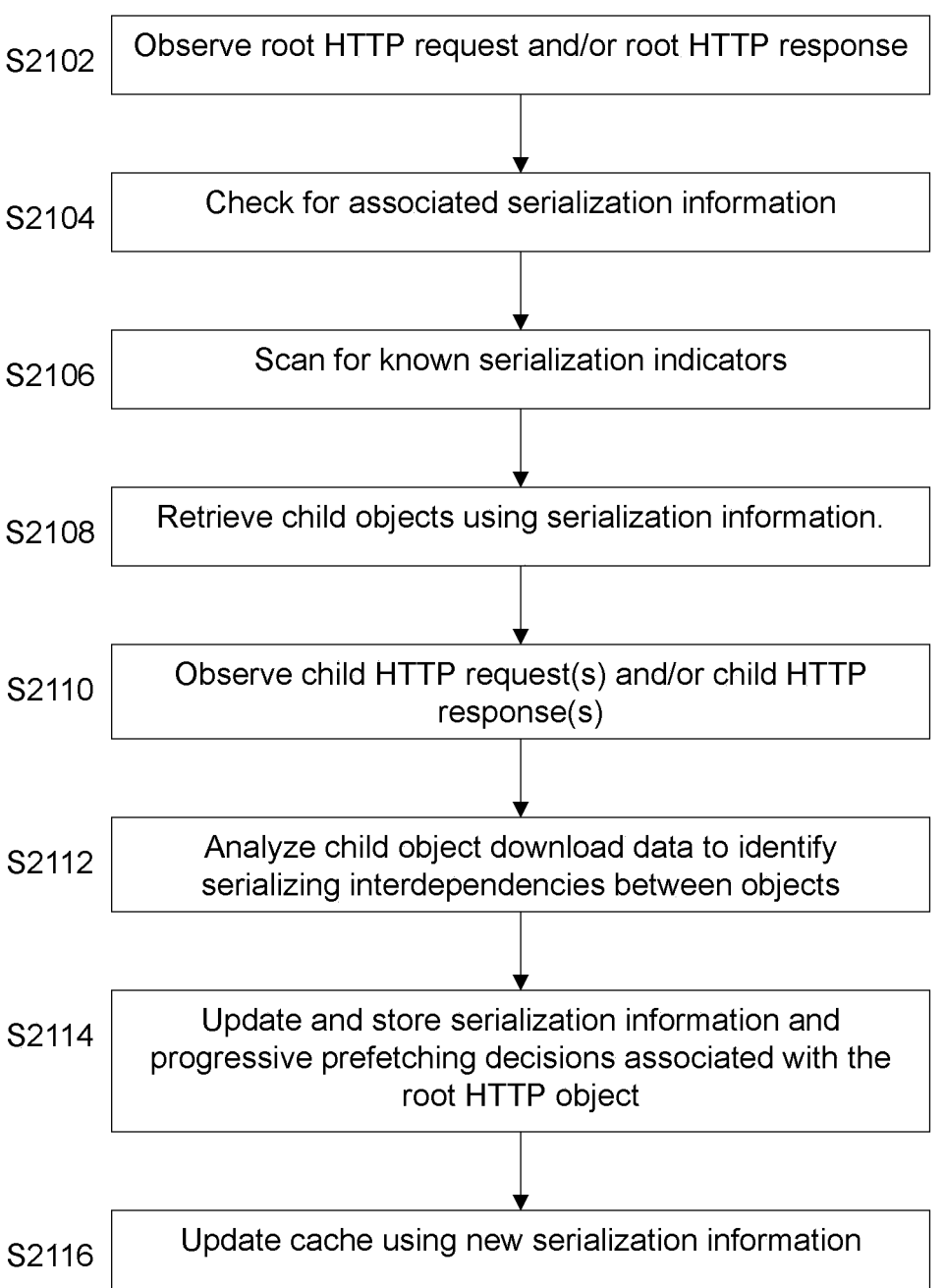

S2102    Observe root HTTP request and/or root HTTP response

S2104    Check for associated serialization information

S2106    Scan for known serialization indicators

S2108    Retrieve child objects using serialization information.

S2110    Observe child HTTP request(s) and/or child HTTP response(s)

S2112    Analyze child object download data to identify serializing interdependencies between objects S2114    Update and store serialization information and progressive prefetching decisions associated with the root HTTP object S2116    Update cache using new serialization information

FIG. 19

BROWSER BASED FEEDBACK FOR OPTIMIZED WEB BROWSING

CROSS-REFERENCE TO RELATED APPLICATIONS

This application is a continuation of U.S. patent application Ser. No. 17/499,255, filed Oct. 12, 2021, entitled "BROWSER BASED FEEDBACK FOR OPTIMIZED WEB BROWSING".

U.S. patent application Ser. No. 17/499,255 is a continuation of U.S. application Ser. No. 16/502,688, filed on Jul. 3, 2019, entitled "BROWSER BASED FEEDBACK FOR OPTIMIZED WEB BROWSING", now U.S. Pat. No. 11,176,219 issued on Nov. 16, 2021.

U.S. patent application Ser. No. 16/502,688 is a continuation of U.S. application Ser. No. 14/789,271, filed on Jul. 1, 2015, entitled "BROWSER BASED FEEDBACK FOR OPTIMIZED WEB BROWSING", now U.S. Pat. No. 10,372,780 issued on Aug. 6, 2019.

U.S. application Ser. No. 14/789,271 is a continuation of U.S. application Ser. No. 13/372,347, filed on Feb. 13, 2012, entitled "BROWSER BASED FEEDBACK FOR OPTI-MIZED WEB BROWSING", now U.S. Pat. No. 9,106,607 issued on Aug. 11, 2015.

U.S. application Ser. No. 13/372,347 claims the benefit of priority to: U.S. Prov. App. No. 61/550,296, filed on Oct. 21, 2011, entitled "ANALYZING REAL USER USAGE DATA TO PREDICT OBJECTS IN WEB PAGES"; and U.S. Prov. App. No. 61/442,119, filed on Feb. 11, 2011, entitled "WEB BROWSER ACCELERATION AND APPLICATION ANALYSIS".

Each of the foregoing patent applications and patents is hereby expressly incorporated by reference in its entirety for all purposes.

Further, applicants also hereby expressly incorporates by reference in their entirety for all purposes: U.S. application Ser. No. 13/371,374, filed on Feb. 10, 2012, entitled "PRO-GRESSIVE PREFETCHING", now U.S. Pat. No. 9,912,718 issued on Mar. 6, 2018; U.S. application Ser. No. 13/372, 299, filed on Feb. 13, 2012, entitled "ASSISTED BROWS-ING USING HINTING FUNCTIONALITY", now U.S. Pat. No. 9,037,638 issued on May 19, 2015; and U.S. application Ser. No. 13/372,397, filed on Feb. 13, 2012, entitled "BROWSER OPTIMIZATION THROUGH USER HIS-TORY ANALYSIS", now U.S. Pat. No. 9,456,050 issued Sep. 27, 2016.

BACKGROUND

Web page transmission, in which a user selects web page content and receives objects, is a core part of the Internet experience for Internet users. While the experience of users is typically a single selection followed by the viewing of a web page that is presented on the screen, the process of presenting the web page on the screen can involve a large number of objects and multiple request/response round trip communications from the user system to a system that is providing the web page.

One method of improving the performance of web page transmission and presentation is HTTP prefetching. HTTP prefetching typically involves pre-requesting content on behalf of a client or browser before a request for that content is actually generated as a typical HTTP request and response in the course of a typical web page transaction. Certain prefetching embodiments involve pre-requesting content based on predictions about a future user selection without any actual action or selection by the user. Other HTTP prefetching systems involve pre-requesting content in response to a user action or selection as part of a web page transaction. In such systems, when content is prefetched it may become possible to satisfy the request for that content locally (with regard to the client or browser) or at a location with a lower latency to the user, thereby negating the need to transmit the request and wait for the response from a content server. For example, in cases where there exists high latency between the client generating the request and the server which responds with the context requested, each negated request/response may avoid the penalty for such latency, thereby potentially reducing the total time required to satisfy the entire series of requests for the client. This may result in an accelerated end user experience.

In some prefetching systems, the system may have a set of metrics for determining when a file should or should not be prefetched. An ideal goal of a prefetcher may be to identify and prefetch all objects relating to a particular requested webpage, and to avoid prefetching objects which are not later requested by a user. For example, when a user requests a web page, the prefetcher may request (e.g., as a proxy for the user) various objects embedded in the webpage in anticipation of those objects being ultimately requested. Under certain circumstances, however, incorrect objects may be prefetched repeatedly based on incorrect models or difficult to quantify exceptions to a rule, resulting in resources being wasted to prefetch an object that will never be used. In certain cases, a prefetcher may miss objects that are embedded in a web page, and it may be difficult to determine which objects associated with a web page will ultimately be requested, or how an object seen at a proxy server relates to other objects. Such circumstances may result in slower performance and increased wait time for a user while a system fetches an object that was missed by a prefetcher.

Additionally, many web browsers function with a system to parse ahead in the container files they download in an attempt to identify objects that will be requested when the web page is rendered. This speculative function by a web browser only involves parsing static files and obtaining candidate child URLs. Fundamentally this approach suffers from the main architectural problem of web sites with respect to performance, which is that they are "nested", and such systems need one object to construct another object so that the system is limited in which objects it may operate on and the improvements that may be gained.

HTML5 has a feature called the Application Cache that uses manifest files to attempt to address issues. A web site developer can put a list of all the files that will be needed for the given web page in the manifest file and then put a reference to this manifest file at the top of the top-level html file so that when rendering the page the browser can down-load first the top level HTML, and then the manifest, and then any files listed in the manifest. This allows for improved parallelism but is limited by the fact that the files in the manifest can only be those found on the same domain as the top-level html. Such a system is also dependent on the web site developer maintaining the list. Lastly, as with simple speculative prefetching, the HTML5 manifest only lists static URLs and contains no provision for prefetching URLs that are dynamically generated via script code executed at runtime.

BRIEF DESCRIPTION OF THE DRAWINGS

The present disclosure is described in conjunction with the appended figures.

FIG. 1E illustrates a method for improved web page transactions in accordance with the innovations presented herein.

FIG. 4 describes a method for improved prefetching in accordance with one potential implementation of the present innovations.

FIG. 9 describes a method for improved prefetching in accordance with one potential implementation of the present innovations.

FIG. 19 is a flowchart describing one potential method of improved web page loading in accordance with the innovations presented herein.

DETAILED DESCRIPTION OF SOME EMBODIMENTS

The present invention relates, in general, to network acceleration and, more particularly, to enhancing web page transaction and web page load operations in response to a user action with dynamic tracking of web page transactions.

Various embodiments described herein relate to systems, apparatus, and methods for enhancing prefetch operations by analyzing real user actions with dynamic tracking of web page transactions. While various aspects and descriptive examples embodiments of the invention are discussed above and throughout the present application, the following detailed description illustrates embodiments in further detail to enable one of skill in the art to practice the invention. In the following description, for the purposes of explanation, numerous specific details are set forth in order to provide an understanding of the present invention. It will be apparent, however, to one skilled in the art that the present invention may be practiced without some of these specific details. In other instances, structures and devices that are non-limiting examples of embodiments are shown in block diagram form as illustrations. Several embodiments of the invention are described below and, while various features are ascribed to different embodiments, it should be appreciated that the features described with respect to one embodiment may be incorporated with another embodiment as well. By the same token, however, no single feature or features of any described embodiment should be considered essential to the invention, as other embodiments of the invention may omit such features.

Figure 1A:
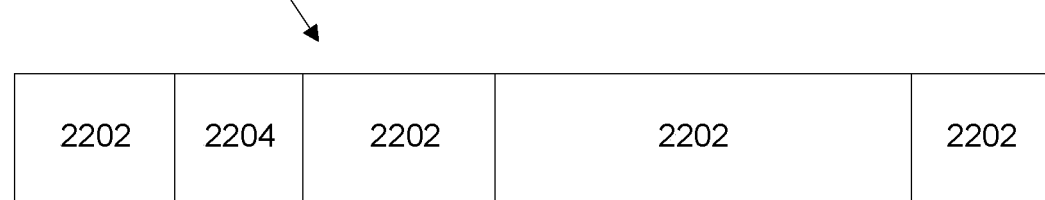
FIG. 1A illustrates one example of web page load data for use with a system in accordance with the present innovations.
Figure 1B:
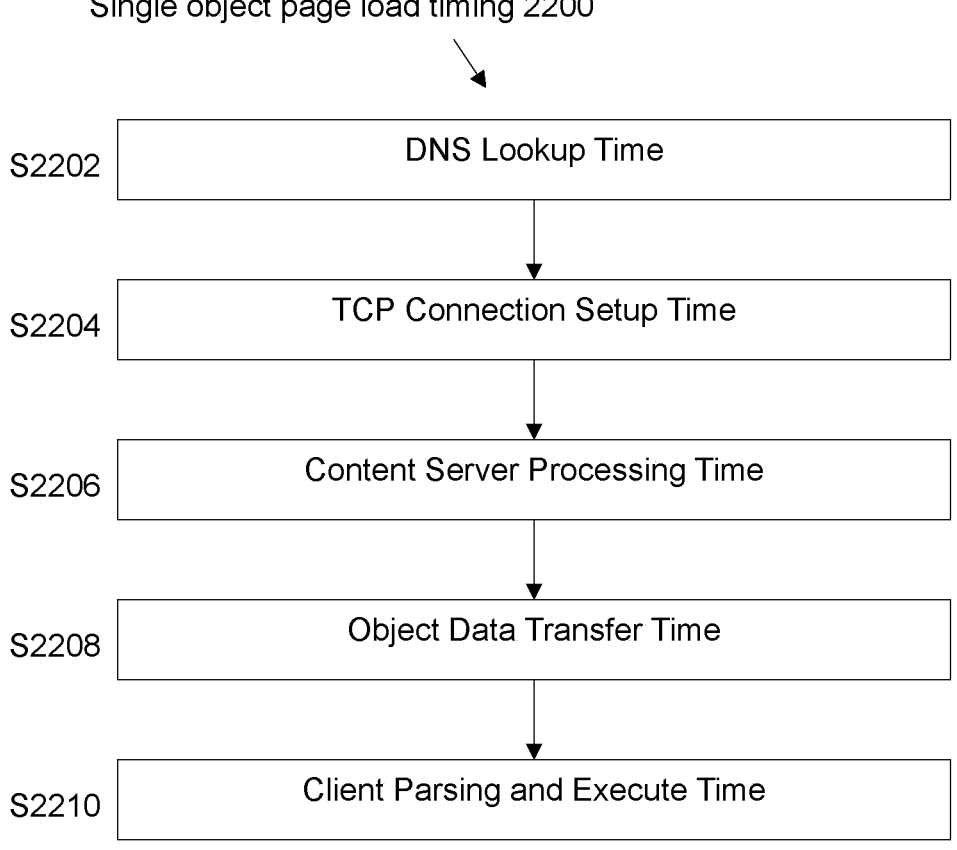
FIG. 1B illustrates one example of web page load data timing for use with a system in accordance with the present innovations.

In a web page transaction that functions according to certain embodiments of the present invention, the transaction is made up of one or more object transactions such as single object page load timing 2200 of FIGS. 1A and 1B, where the objects make up the content of the web page. Individual objects in a web page transaction have several components that may add to a time associated with getting the object from a content server to a user that has requested a web page. FIGS. 1A and 1B illustrate one potential example of an object transaction timing that includes DNS (Domain Name Server) lookup time 2202, TCP connection setup time 204, content server processing time 2206, object data transfer time 2208, and client parsing and execution time 2210. While this particular set of object timings may occur as a series of steps in a process as shown by steps S2202 through S2210 in FIG. 1B, any step and object timings for object transfer may be understood to function with the innovations described herein. In a typical object transaction, a DNS lookup time 2202 may be in the order of 30 ms for a terrestrial broadband system, a TCP connection setup time 2204 is typically on the same order of magnitude unless the server is slow to make the connection. A content server processing time 2206 and an object data transfer time 2208, however, may vary greatly depending on the server, the type of request, the size of the object, and the connection bandwidth.

For a simple content server processing time 2206 on a fast server, the timing may be measured in milliseconds, but for a slow server or a complex database query made to a slow or very large database, the server processing time may be seconds, minutes, or longer. Similarly, for a large file being downloaded over a connection where the bandwidth is not large compared to the file size, the transfer time may be much longer than single or double digit millisecond timings.

Figure 1C:
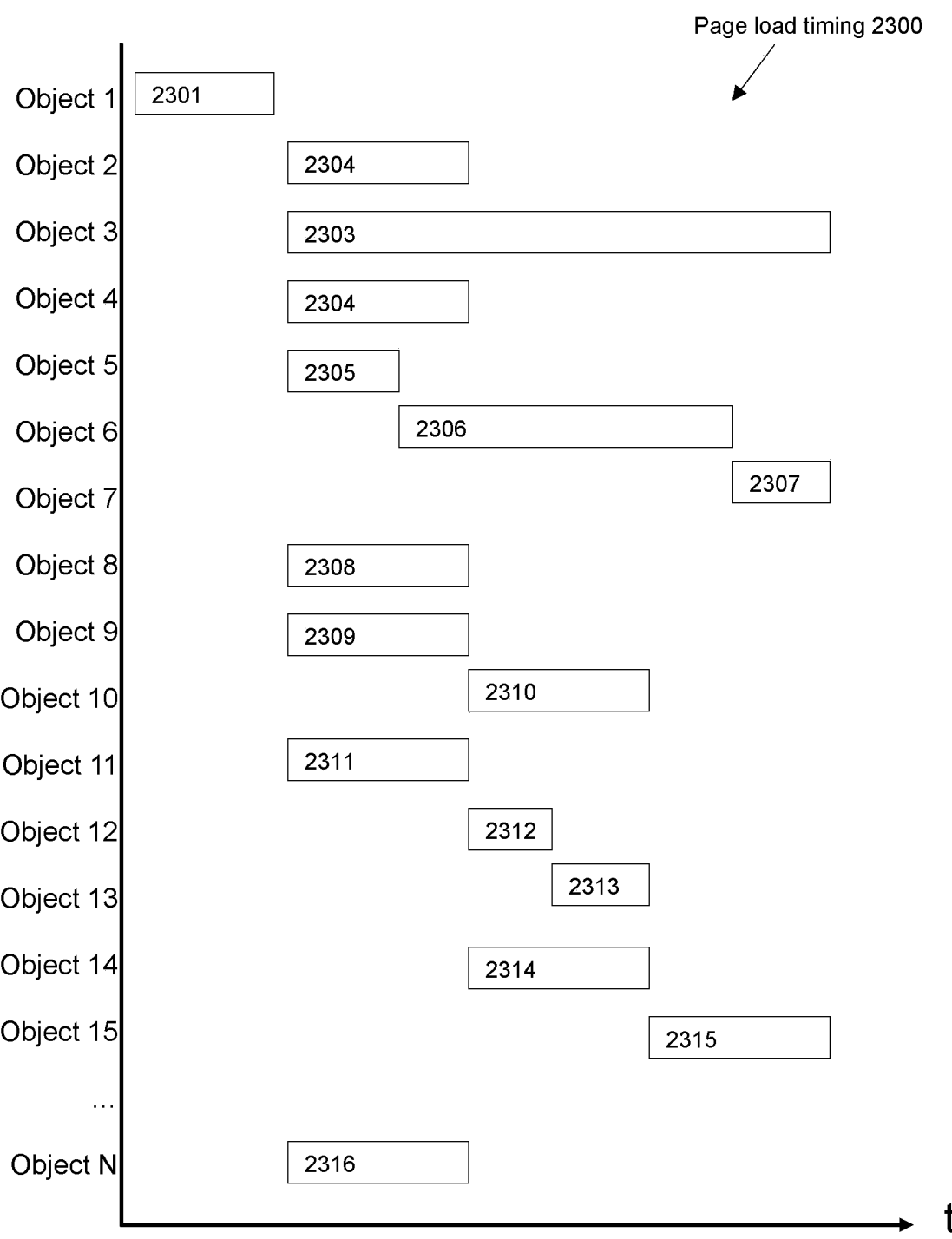
FIG. 1C illustrates one example of web page load data timing for use with a system in accordance with the present innovations.

For an entire web page, multiple objects that must be downloaded serially thus repeating the object timings listed above may further add to a timing for rendering of an entire web page. An entire web page transaction, then, may be made up of a single object transaction, or a very large number of object transactions, where each object transaction may be similar to the object transaction of FIGS. 1A and 1B, or where a variety of different types of object transactions occur. In FIG. 1C, a page load timing 2300 is shown having objects 1 through N, labeled as associated object timings 2301 through 2316. A page load timing such as page load timing 2300 may begin when a selection is made at a user computer and a DNS lookup request is sent from the user computer, and may end when a final object is parsed and executed by a user system browser and the entire web page is finally rendered.

Additionally, the "render time" for a web page may be used as web page load timing information for web page objects. Render time is the time that the object is actually used by a browser. For instances where a system needs to prioritize objects, render time may function along with dependency information, download time, content server response time, and any other information that impacts a final page load to prioritize object fetching within an acceleration system.

This overall timing for a web page, then, is determined by the longest chain of timing factors. As shown in FIG. 1C, this longest chain may be caused largely by single objects such as object 2303 that have a long timing for the reasons listed above. The longest chain may alternately be caused by a chain of objects which each have relatively short timing, but when dependencies between the objects or created in some fashion during the web transaction process cause them to be transferred serially, create a chain that increases the overall page load timing.

Prefetching systems which use proxies that intercept communications between a user and content server, such as those described in Ser. No. 13/089,250, filed Apr. 18, 2011, and entitled "WEB HIERARCH MODELING" (004010US), now U.S. Pat. No. 9,307,003 issued Apr. 5, 2016, which is hereby incorporated by reference, may be used to shorten some of the above discussed page load times. Such proxies may be used in conjunction with the innovations described below, but proxy prefetching by itself suffers from a lack of knowledge about what is occurring within a browser, especially for interdependencies in objects in a web page transaction.

Alternatively, some user systems include accelerating systems that may prefetch using scan ahead systems, local caching, or other user-based acceleration, but these suffer from a lack of overall information related to server function and web page structure as well. Because of this lack of information, these systems need to download the root object or first object of a target web page and any intermediate child objects in order to speculate on what other objects may be downloaded, and thus these systems suffer from the nested nature of web pages.

Figure 1D:
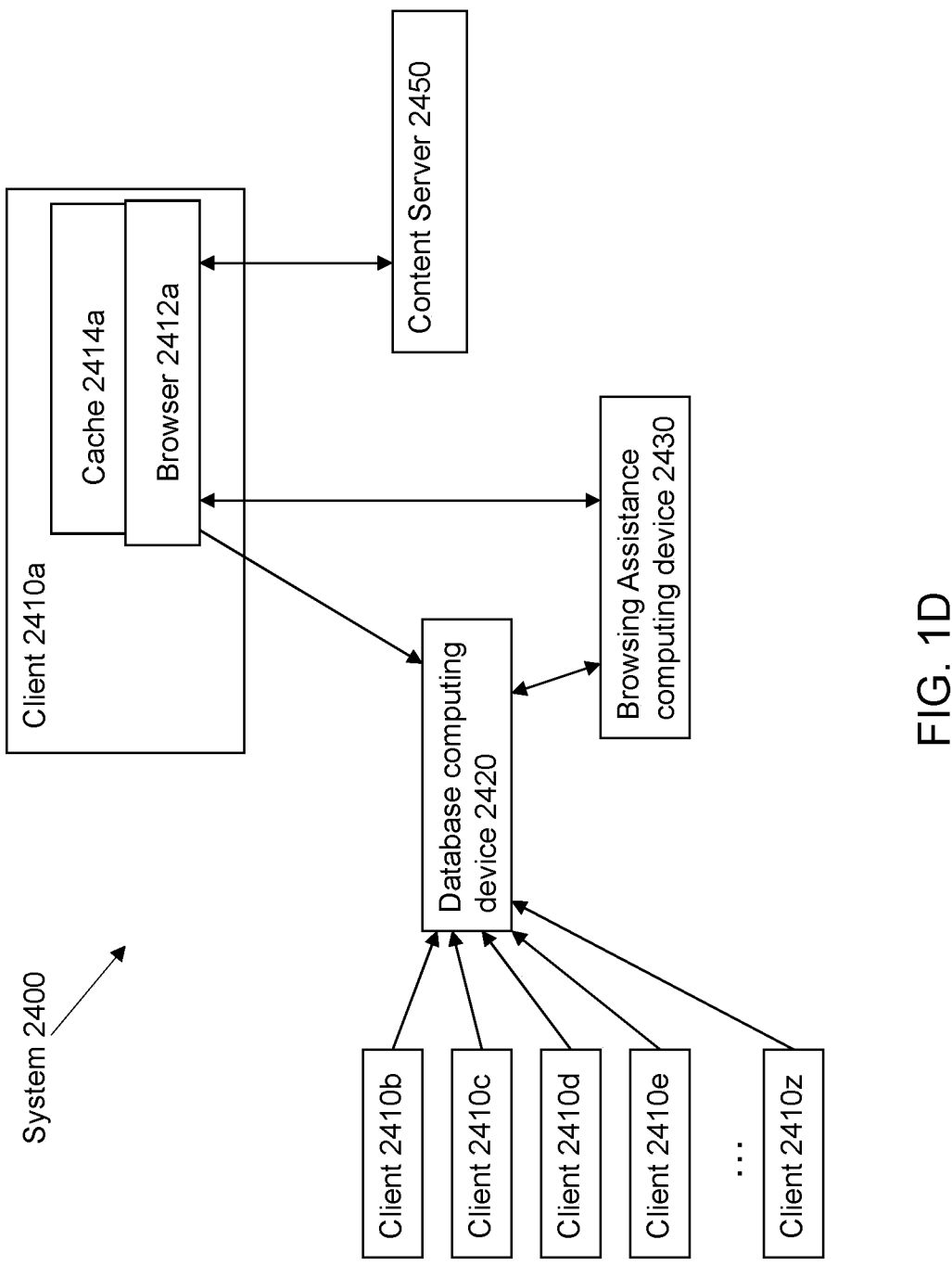
FIG. 1D illustrates a block diagram of one potential implementation of a communications system in accordance with one potential embodiment of the innovations presented herein.

FIG. 1D describes a prefetching system architecture for assisted browsing, where a browser operating on a client system may receive assistance. The assistance in this system is from a third source independent from and outside of the communication path between the client and a content server that the client is requesting web content from.

System 2400 includes clients 2410a through client 2410z, content server 2450, browsing assistance computing device 2430, and database computing device 2420.

The system is shown in FIG. 1D as functioning with a large number of clients, though in certain embodiments, assistance functionality may be implemented with only a single client. Further, in certain embodiments, a single client may operate with the database analysis and hinting functionality all operating from within the client such that the client contains all the elements of the system. Such a single client system may include data from outside sources, or may simply operate using the history from the single client. All clients in system 2400 will operate a browser system or module such as browser 2412a operating on client computing device 2410a for receiving and rendering web pages on a display of the client system. Embodiments of a client may additionally include a cache memory that stores web objects based on certain criteria that will also be described below.

Content server 2450 functions to interact with a client system as part of a web page transaction, and operates in a fashion similar to standard content servers that operate in web transaction systems that have only a client and a content server. Database computing device 2420 and browsing assistance computing device 2430 function together to provide browsing assistance information to a client system. In certain embodiments, database 2420 and browsing assistance 2430 may be embodied as a single server system. In alternate embodiments, each may be multiple server computers, virtual computing resources, or any other acceptable resource.

FIG. 1E describes the operation of an assisted browsing system according to one potential non-limiting embodiment of the innovations presented herein. As part of step S2502, at some point prior to a client system 2410 using the browsing assistance server 2430, database 2420 is populated with information related to web pages and/or root objects. An analysis is performed using the information, and browsing assistance information for particular root objects or target web pages is placed on browsing assistance server 2430.

A client 2410 then identifies a target URL, and the target information is communicated from the client 2410 to assistance server 2430. Identification of the target URL may be a user selection or click of a hypertext link indicating the URL. Alternatively, the target may be identified by a hover with a mouse indicator over a hypertext link. Further, any other acceptable indication that a URL has a sufficiently high probability of being selected by the user may be used to identify a target. In step S2506, the assistance server 2430 then returns "hint" information to the client. This hint information may include information such as a list of all objects expected as part of the web page transaction, any formulas for generated child URLs, such as where to find the information necessary to determine the generated child URL, and any timing or cookie related dependencies that require object order requests to be followed. This information may be structured as a dynamic manifest file, as described below. This information may also be coupled with any other information, or with any information in any format that allows the client system to improve web page load times. Examples of additional information include information regarding the maximum allowable number of connections at a server, so that the client may request objects in a way that is optimized for the allowable connections, and avoids overloading or making unnecessary numbers of object requests to the server.

In step S2508, when the list of objects is received at the client 2410 the browser 2412 may check cache 2414 for available objects that may be served from cache. Based on the hint information from assistance server 2430, client 2410 may then prefetch all objects for which there is no specific reason not to prefetch the object in step S2510. In certain embodiments, for child objects that may be obtained from multiple servers, the manifest may indicate characteristics of the object sources such as which is closest to the client from a network latency perspective or which source has a lower average response time. The manifest may therefore not only identify the object, but also the preferred source of the object for a particular client or group of clients. In step S2512, remaining child objects may be fetched according to identified rules or dependencies from the information, or may simply be fetched as they are identified as being requested by other child objects that are received at client 2410.

At this point, in the absence of any error, the web transaction has completed and the web page has been rendered. As part of the system, the client 2410 stores information related to the web page transaction such as hit, miss, and fail information, target identification information, individual object timings, and any other information that may be consistent with any embodiment described herein. This information may be used to update local cache 2414, and may also be communicated to database server 2420 as part of step S2514. Finally, in step S2516, the database server 2420 receives the update information from the client, performs any additional analysis using the updated information from the client, and may create an update for information that is sent to assistance server 2430 to update future hint information that will be sent to clients requesting the same or related web objects.

Figure 1F:
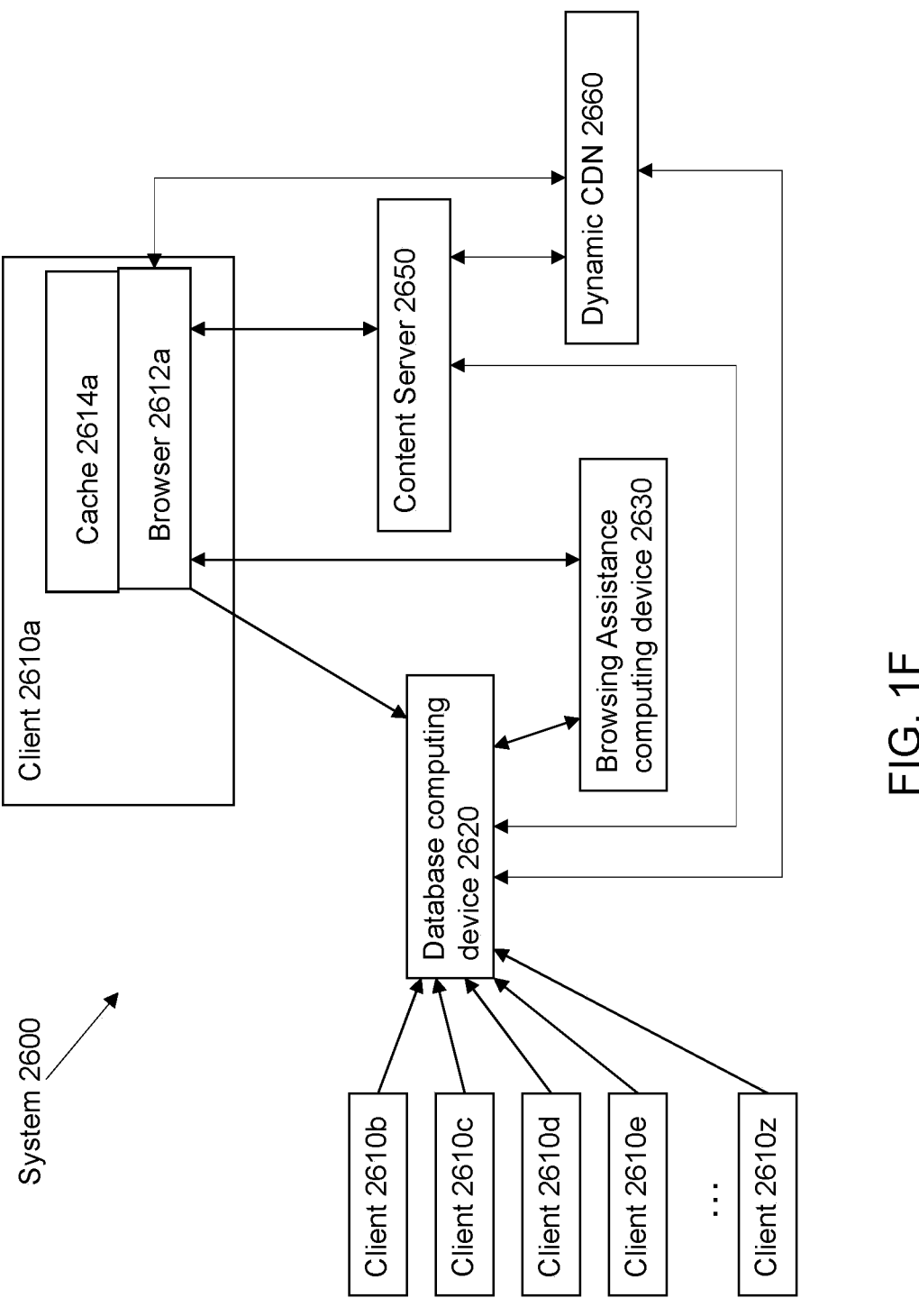
FIG. 1F illustrates a block diagram of one potential implementation of a communications system in accordance with one potential embodiment of the innovations presented herein.

In FIG. 1F, an alternative system 2600 is presented for assisted web browsing. System 2600 includes clients 2610a through 2610z, content server 2650, browsing server 2630, database server 2620, similar to system 2400 of FIG. 3, and also similarly, client 2610a includes browser 2612a and cache 2614a. Differences, however, are in additional communication routes for the database and the presence of dynamic CDN 2660.

A content delivery network or content distribution network (CDN) is traditionally known as a system of computer containing copies of data placed at various nodes of a network, such that access to the cached data is improved by increasing bandwidth and reducing access latency. In system 2600, database 2620 may identify that objects requested from particular content servers are regularly serializing objects, or objects that increase the overall load time of a page due to slower server speeds. This may be due to server processing times, limited server connections, limited server bandwidth, or any other identified result that causes the content server to slow load times. In certain embodiments, this may be associated with particular times or days when the server experiences high use, or the system may identify transient issues, where a server has suddenly and perhaps unexpectedly experienced a spike in use that trails away. When such a server delay is identified, copies of objects from the slow server may be cached at dynamic CDN 2660 by system 2600. As the value of that cache to reducing load times for key web pages changes, the caching instructions for the CDN changes.

Further, when an assistance server sends hints to a client, the hints may include a location for the object at the dynamic CDN. Such a hint requires the client browser to be able to trust the assistance server to provide an acceptable replacement location in a way that is secure. This allows improved performance by replacing a slow content server with a faster CDN server, which essentially functions as a second level cache. This then essentially allows a first level cache at the client to place greater priority on objects that are limited by last mile bandwidth considerations to be place on the client where cache space is limited to a single user and may be more limited, and allows objects that are impacted by server speed but not by last mile issues to be placed at the CDN with limited impact on overall page load time.

Figure 1G:
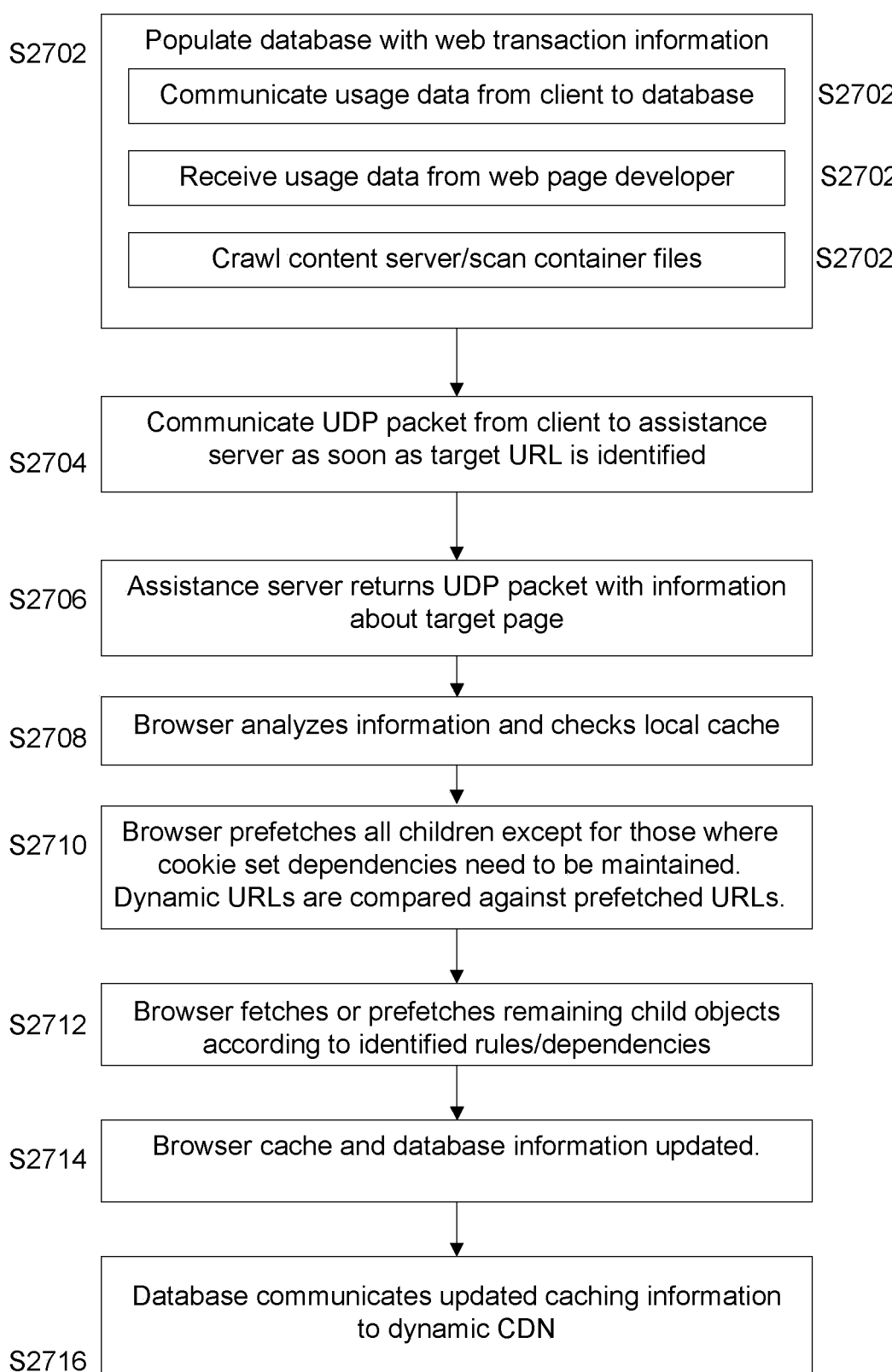
FIG. 1G illustrates a method for improved web page transactions in accordance with the innovations presented herein.

FIG. 1G describes an alternative embodiment of a function for a system of assisted browsing. In step S2702, database 2620 is populated. Multiple population methods may be used. In step S2702c, client information is used as described above in FIG. 4. In step S2702b, a web developer may directly provide database 2620 with information related to the construction, dependencies, and web hosting for objects in a web server. The developer may select specific options for enabling assisted browsing for specific web pages, and may further receive information from the system regarding client usage of the developer's web pages.

Additionally, database 2620 may collect information directly from content servers by scanning container files from the content servers or "crawling" the content servers to obtain web page transaction information in step S2702c. In certain systems such as satellite systems where latency from a user to a content server may be much larger than latency from a database server to a content server, this may enable hints to be created and used after a client has identified a target for web pages that have not been seen before by the system. Additionally, when a user selects a page that is hosted via HTTPS, the browser can send the HTTPS root URL to the assistance server and the server can download the secure page to identify child objects and send those back to the client as hints. The client browser may then securely prefetch the HTTPS client objects. This then allows prefetching of secure HTTPS web sites that have little or no other observed data in the database of the system. This data is difficult to obtain otherwise because the use of observed data may require using and timing info from secured or encrypted sessions, and such data functions to undermine the secured/encrypted status of the sessions.

In step S2704, when browser 2612 identifies a target URL, a UDP packet is sent from client 2610 to assistance server 2630 identifying the target, and in step S2706, a UDP packet is sent from assistance server 2630 to client 2610 with hint information. In various embodiments, multiple copies of packets may be sent, or other techniques may be used to optimize both speed and likelihood of transmission success. In certain embodiments, a client system may record and analyze user traits such as average mouse hover time over a link before selection, and use that recorded information to dynamically determine how and when a request UDP packet, TCP packet, or other packets are sent.

In step S2708 the browser uses the hint information with local cache to identify usable cached objects. In certain embodiments, the hint information may include cache information about each child object such as checksums, sizes, and mod times of the most recent version of the object. In certain embodiments, this hint information may provide object update information to the client sufficient to eliminate the need for the browser to communicate "if-modified since" requests for cached objects. In step S2710, all children are prefetched except for those objects where cookie set dependencies need to be maintained. For dynamic children where the formulas for URL generation were known and the dynamic URL prefetched, a comparison is made between the dynamic URL that was used to prefetch and a dynamic URL created using the children as they would have been used to create the dynamic URL without prefetching hints from the assistance server. If a match is found, the prefetched object from the dynamic URL is used, otherwise the URL from the other children that conflicts with the assistance server must be requested, and the result used instead of the prefetched object.

In step S2712, the browser fetches or prefetches the remaining child objects according to any identified dependencies. Then in step S2714, the browser caches objects based on a web page load time, such that objects that have the greatest overall impact to improve web page loading time are prioritized. Such a weighting may be as simple as (web page load time improvement)×(expected number of page loads per time period). Alternatively, in additional embodiments other factors may be considered such as % speed improvement per web page, expected time to next web page selection, user privacy elections, or any other weighting factor incorporating page load time. The client then sends the updated information to the database. In step S2716, the data is communicated to dynamic CDN 2660, which may perform a similar analysis, or may use alternative weights different from the weights used by the user cache. For example, CDN 2660 may weight different customers by overall system use, payment level, or customer group characteristics. CDN 2660 may also use client cache information from individual users to decide not to cache objects frequently cached at client devices.

In the fifth revision of the hypertext markup language standard (HTML5), the ability is provided to create a cache manifest that identifies a list of web addresses or uniform resource locators (URLs) required for a particular web application to be rendered. These addresses can be placed in a manifest file that may be updated by the author, indicating when the web application is changed by updating the list of URLs. This may further enable resources from the manifest file to be stored and accessed locally as part of a user or client system browser cache. In typical browser operation with a network connection, the browser sends a request for the objects, and receives them via the network. Without a manifest the browser may not know which files to use to operate a web application even when all of the objects are in the browser cache. With an HTML5 manifest, when the user or client system browser cache attempts to access the web application in the absence of a network connection, objects from the manifest file may be served from the local cache. As currently structured and used, this type of manifest file functionality is limited to merely identifying URLs and existing as a list of objects for a web application from a single domain.

In certain embodiments as described above, information related to a particular web page may be partially or entirely structured as an improved or smart manifest. In alternate embodiments, an HTML5 manifest may be modified with additional information to create a smart manifest. In one potential embodiment, a smart manifest is a file that includes all information required for a given root object or target web page. This information includes all URLs for children of the root and any decedents or children of children that are part of the entire web transaction. In contrast to the manifest files of HTML5, this further includes references with different domains and not only references from a single domain for a single web application.

Further, in addition to the object list and associated URLs, a smart manifest includes supplemental information associated for certain objects in addition to the URL. One potential example of this may include server performance data for certain URLs or domains frequently associated with an object. The smart manifest may include an average, median, or other statistical value related to a server limited object download time. Any acceptable structure may be used for storing such non-URL data in a smart manifest. In one potential example, a template may be created for an entire web transaction in a manifest file, with each object having an associated set of bins.

Another type of supplemental smart manifest data is an alternate URL. In certain embodiments, such as embodiments incorporating the dynamic CDN structure above, a smart manifest may include a URL for a copy of the object from a CDN cache that may be used as a substitute for the standard URL identified by the manifest, where the standard URL is the URL that would be used in a normal root-child processing of a web page transaction. In certain embodiments, a primary URL for an object may be identified with associated server performance data in a first bin of a smart manifest. A second bin for the object may include an alternate URL with server performance data for the associated CDN server. A browser may analyze a transaction during processing to determine if using the URL from the second bin will provide improved performance, and make a decision between URLs based on performance. In alternate embodiments, such an analysis may be done during creation of the smart manifest, and set such that a browser will not receive the server performance data, but will instead simply trust the smart manifest and always use the identified alternate URL.

For embodiments including dynamic children, which are described further below, the supplemental or non-primary URL data may be a URL template with missing information as well as information about where and how to determine the missing information in order to find the appropriate URL. Thus, in some circumstances, an object in a smart manifest may not have an associated URL, but only non-URL information that may be used to create the URL.

Further, the supplemental information may include a bin describing dependencies among objects, or cookie set actions associated with the web page. A bin may therefore flag one or more objects in a transaction as needing to respect certain fetching rules or order sequencing.

A smart manifest may be created in any manner described for hint information or web transaction information. As described above, this may include creation by a developer or content provider, automatic creation and revision using usage data from client/user system, creating using a web crawler analysis of content servers, or any manner of obtaining the information required to identify and improve performance for all objects of a web page transaction.

Additionally, in certain embodiments, the hints may not simply be for a specific target root object or a target web page, but may be for groups of web pages or for web pages associated with a particular domain. In one embodiment, a set of hints for an entire domain associated with a target web page may be sent in response to an indication that the target web page may be downloaded. Such an embodiment protects the specific browsing usage history of a user, while providing acceleration that is not compromised. The downside is an increased size of hint downloads, but the overall size of hint downloads may typically be very small compared to the size of target web pages, especially for web pages with video and other multimedia.

In additional further embodiments, other group sets other than single domains may be downloaded as a group, such as multiple related domains, or high likelihood domains based on user history, peer group history, or system history. Such systems may cache these hints for related domains for a particular period of time, a set activity session of the user, or any other known caching method to avoid round trip hint requests while providing fresh information to the user.

Further examples will now be presented to show alternative embodiments and various implementations of analysis of the structure of webpages for improved transaction efficiency and the creation of improved dynamic manifest files that may function as hint information. In one potential example of a web page transaction, if the first root HTTP request includes the path http://movies.com/actionmovies/movie1, and a child HTTP request includes http://movies-.com/templates/actionmovietemplate, then the system server may associate the parameter "actionmovies" from movies-.com with the URL http://movies.com/templates/action-movietemplate. Any time any URL is seen that includes the path http://movies.com/actionmovies, even if the full URL has not been seen before, the system may prefetch the same child URL. Subsequent web transactions including user selections including the paths http://movies.com/actionmovies/movie2 and http://movies.com/actionmovies/movie100 may confirm or deny the validity of the association. If the child HTTP request always occurs in association with the identified parameter, then the association is confirmed. If the child HTTP request only occurs sporadically with the parameter, additional parameters that impact the child HTTP request may be identified. Additional non-limiting examples of the present innovations are described below.

A "target web page" is a web page identified by an acceleration system as having been selected by a user, or having a high likelihood of being selected by a user. An identification that a user is hovering with an interface such as a mouse pointer over a hypertext link to a web page may be one example of a web page that has a high likelihood of being selected and is therefore a target web page. A "root" refers to an initial portion of a web page transaction that is initiated directly by a user selection or action. For example, a user clicking on a web page link initiates a root HTTP request for that link. The root HTTP response is the response directly responding to that root request. In various embodiments, target web pages and root objects may function identically as prefetch targets within a system, depending on the preferences expressed by particular embodiments. In alternative embodiments, an acceleration system may treat root objects differently from target web pages that are not root objects, such as the target web page in the mouse hovering example above.

"Child" requests and responses are then follow-on requests and responses that result from embedded or calculated references to objects in root objects or the initial object of a target web page. The child objects, requests, and responses are always one or more steps removed from the user action by a root that directly responds to the user action.

Figure 2A:
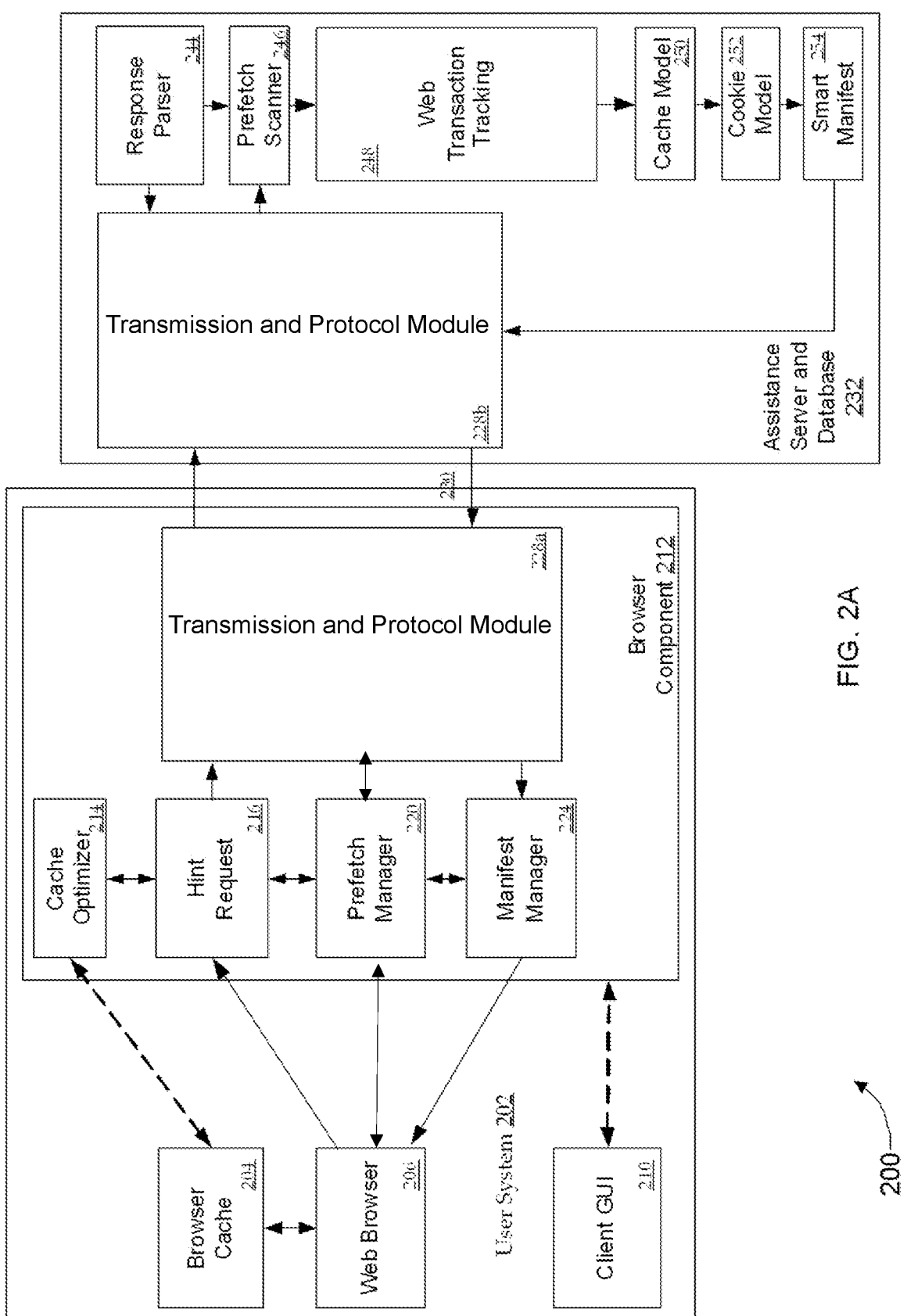
FIG. 2A illustrates a block diagram of one potential implementation of a communications system in accordance with one potential embodiment of the innovations presented herein.

Turning now to FIG. 2A, a system 200 that may be used as part of a system for acceleration web content from the Internet to a web browser is illustrated. In one embodiment, the system may include a user system 202, an acceleration browser component 212, which may also be considered a web browser plug in for web page acceleration, and assistance server and database 232, which in certain embodiments may be a combination of database computing device 2620 and browsing assistance computing device 2630 of FIG. 1F. The user system 202 may include a client graphical user interface (GUI) 210. Client GUI 210 may allow a user to configure performance aspects of the system 200. For example, the user may adjust privacy settings, content filters, and enable or disable various features used by the system 200. In one embodiment, some of the features may include network diagnostics, and error reporting.

A browser component for acceleration may have many different structures. In the embodiment of FIG. 2A, browser component 212 includes cache optimizer 214, hint request module 216, prefetch manager 220, manifest manager 224, and transmission and protocol module 228a. Cache optimizer 214 may interact with a browser cache 204 and may further interact with a dynamic CDN to manage or optimize browser cache 204. Hint request module 216 may manage hint grouping or hint requests based on user preferences, and may interact with prefetch manager 220 for responding to prefetch requests when objects are cached, and may further function to communicate tracking data to a database once the user system has completed a web page transaction. Prefetch manager 220 may function to manage prefetching that occurs within the user system. Manifest manager may manage caching of smart manifests or hint information from assistance server 232, and further manage how data from the smart manifest is communicated to the prefetch manager and the web browser for final presentation to a user.

Assistance server and database 232 may be an example of a hinting server or a database server described above. The example shown in FIG. 2A includes a transmission and protocol module 228b that assists in communication with the user system 202. Assistance server and database 232 may include a broad range of other modules for managing feedback on web page transactions from user systems, for modeling the web page transactions, and for providing smart manifests/hint information to user systems. Such functions may be implemented using a response parser 244 for examining URLs, prefetch scanning 246 which may independently request web pages in order to identify data for use in constructing smart manifests, web transaction tracking 248 that may function as a database for accumulating feedback information from user systems and from prefetch scanner 246, cache model 250 for identifying various interrelationships between cache, CDN, and content server functioning in individual user as well as overall system function, cookie model 252 that may function to analyze the dependent structures within tracked web page transactions based on cookie operation and updates, and smart manifest module 254 that may further serve as a database for web page smart manifests that may be served to client systems.

Figure 2B:
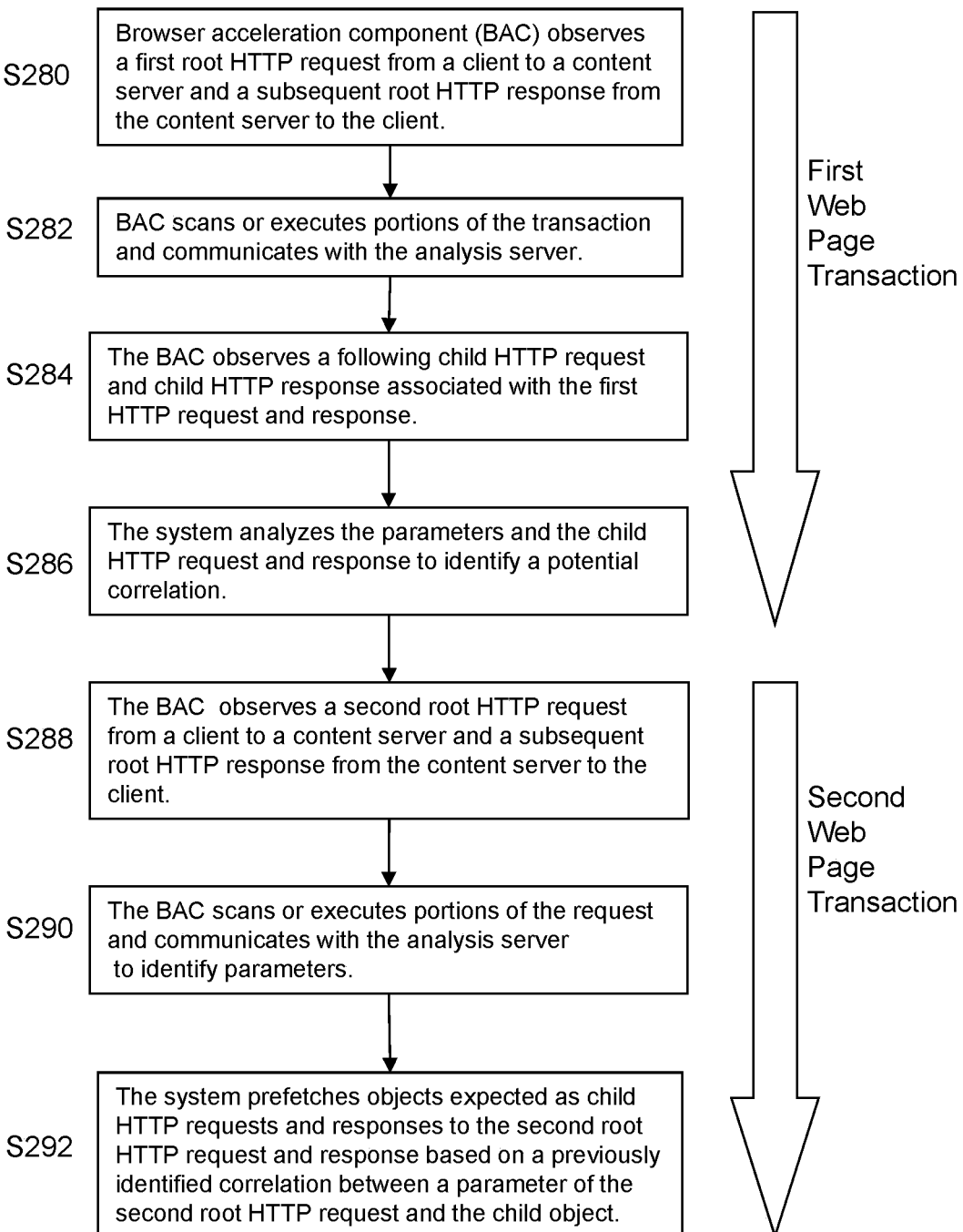
FIG. 2B illustrates a method for improved web page transactions in accordance with the innovations presented herein.

FIG. 2B, then, shows a basic method of improving prefetching using real user usage data to predict objects in web pages. In step S280 browser acceleration component 206a of FIG. 2B observes a first root HTTP request from a client to a content server and a subsequent root HTTP response from the content server to the client. In step S282, browser acceleration component 206a may communicate with a prefetch analysis server to receive hint information or any prefetching assistance. Browser acceleration component 206a may also scan the first HTTP request and the subsequent HTTP response or execute portions of the associated code to identify parameters. In step S184, the system observes a following child HTTP request and child HTTP response associated with the first HTTP request and response. In step S186, the system analyzes the parameters and the child HTTP request and response to identify a potential correlation. In certain embodiments, because the browser acceleration component is directly observing the code of the web page transaction the correlation may be significantly higher than any correlation identified by a system. The correlation functions as an error check in such systems rather than a means for inferring the code, since in certain embodiments the browser component has the actual executed code that may be accessed directly.

Figure 2C:
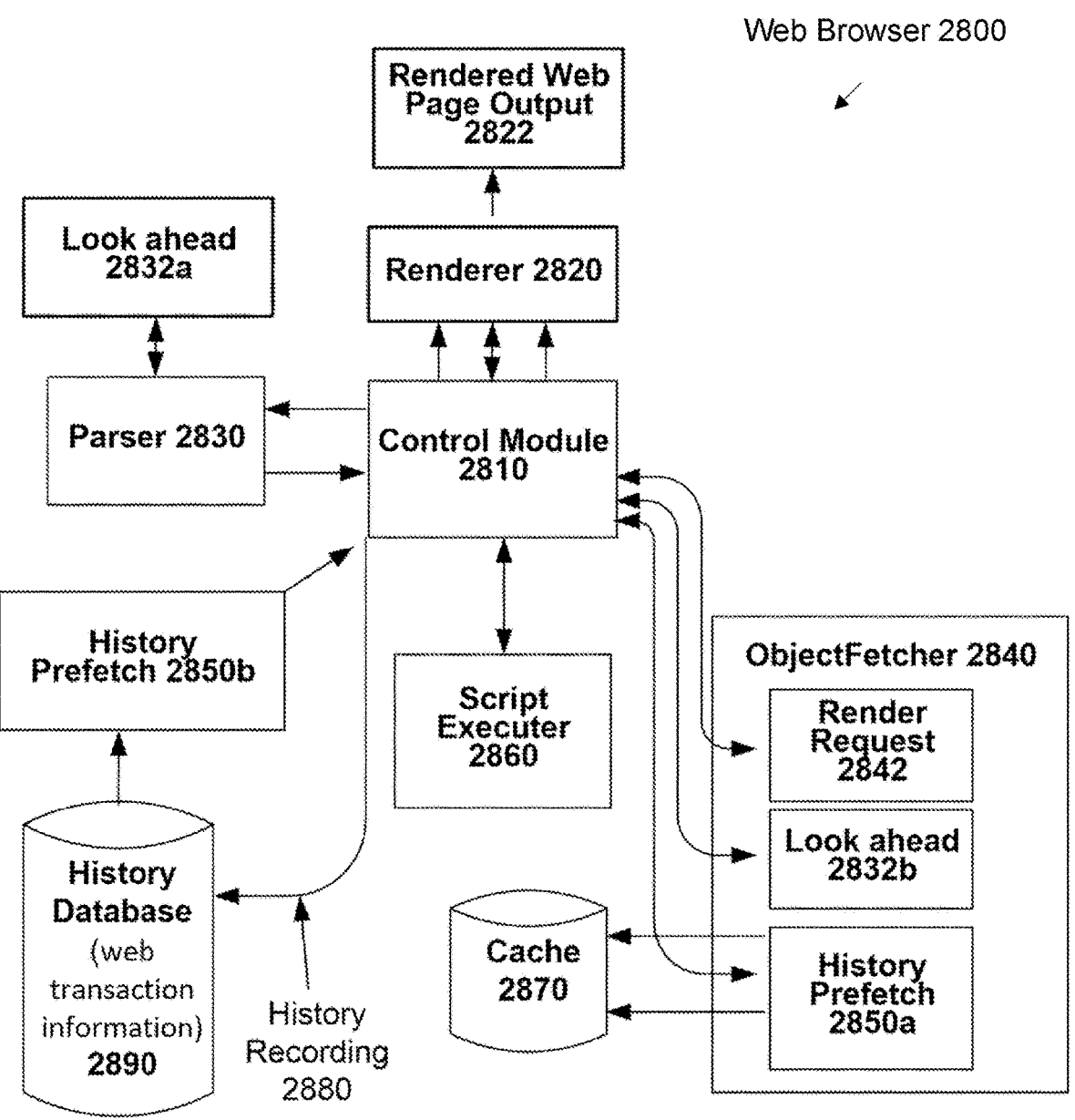
FIG. 2C illustrates a web browser including aspects in accordance with embodiments of the innovations presented herein.

FIG. 2C discloses an alternative embodiment that includes aspects of the present innovations in a web browser with integrated improved prefetching. Such a web browser may be used as a stand-alone system for implementing any of the methods for improving web transactions described herein, or that may be used in conjunction with other systems and components to implement an improved web transaction system. FIG. 2C shows web browser 2800 that includes control module 2810, renderer 2820, rendered web page output 2822, parser 2830, look ahead module(s) 2832a and 2832b, object fetcher 2840, render requested fetcher 2842, history prefetch module(s) 2850a and 2850b, script executer 2860, cache 2870, and history database 2890. FIG. 2C also particularly shows history recording path 2880, which will be described in detail below.

As part of web browser 2800, control module 2810 manages the requests and responses for root and child objects, as well as the communication between different elements of the web browser. Object fetcher 2840 may manage the communication requests as they are made to and from a content server, including handling caching of objects in cache 2870. Script executor 2860 executes code that may be part of a web object, parser 2830 parses through web objects, and may include look ahead 2832 that functions to perform a first level of prefetching for objects in a web page transaction. History database 2890 and history prefetch 2850 may create and use data from previous web transactions to perform an additional level of transaction optimization through prefetching and/or cache management. Renderer 2820 renders the web page for output to rendered web page output 2822, which may be a computer display, a phone display, or any other suitable output for a web browser operating on a computing device.

In one potential example, web browser 2800 may function to download and present a web page having a root:

www.latestnews.com and 4 child object URLs:

1. LN-main.gif
2. LN.styles.css
3. LN.js
4. 1.gif&rand=96759

In an initial step as part of a transaction for such a web page www.LatestNews.com is communicated to a content server when a user that is using a computing device that is operating browser 2800 makes a selection with a mouse click, a keyboard entry, or any other appropriate action. When the HTTP response to the request for www.latestnews.com is received by the browser, it is passed to parser 2830 and renderer 2820. The HTTP response in the example may be as follows:

```
<!DOCTYPE HTML>
<html lang="en-US">
<head>
<title>LatestNews.com - News, Weather, & </title>
<meta http-equiv="content-type" content="text/html;charset=utf-8"/>
....
<img src="http://LatestNews.com/global_news//LN-main.gif"/>
...
<link type="text/css" rel="stylesheet"
href="http://LatestNews.com//LN.styles.css"/>
...
<script>
<script src="http://LatestNews.com//homepage/1064/js/LN.js">
</script>
...
    </body>
</html>
```

For such an example HTTP response, parser 2830 may parse through the response and identify child object URLs 1, 2, and 3. Depending on the rendering status, child objects 1 and 2 may either be requested by renderer 2820 such that a message from render request module 2842 communicates with a content server to request the objects. Alternately, if renderer 2820 is delayed in requesting child objects 1 and 2, look ahead 2832 may identify the child object URLs from parser 2830, and prefetch the objects via a request from look ahead module 2832b to the content server. The objects may then be prefetched either to cache 2870 or to the renderer 2820 in various alternative embodiments.

Child object 3 LN.js, however, is script, and is therefore sent to script executer 2860 rather than to parser 2830. Script executer 2860 executes the child object, and communicates any output to renderer 2820. In the example of www.latestnews.com presented here, the result of LN.js may pass instructions for requesting child object 4 using 1.gif&rand=96759, where 1.gif&rand=96759 is the URL for child object 4 that is output from script executer 2860. Renderer 2820 will then request child object 4 from a content server via render request module 2842.

In an alternate embodiment, however, history database 2890 may include web transaction information, hint information, or a smart manifest file for www.latestnews.com. When www.latestnews.com is initially selected, history database 2890 may be informed of the selection, and a history prefetch module 2850b may execute prefetch requests based on the information in history database 2890. For the above example, history database 2890 may include information that www.latestnews.com includes a dynamic child URL number 4, along with a record that dynamic child URL may be generated using the function or instructions root+images/1.gif+rand. Alternatively, the instructions may include a bin template and bin instructions for each bin in the template. The history prefetch module 2850 may then request child object 4 from the content server, and send the child object to cache 2870 or renderer 2820. When all of the children have been retrieved and rendered, the complete web page is sent to rendered web page output 2822.

As described by FIG. 2C, then, history database may include detailed information directly from the browser operation as part of history recording 2880. Parser 2830 or look ahead module 2832 may communicate parsing results to history database. Script executer may communicate by history recording 2880 child URLs identified by executing child objects, or may further identify formulas, instructions, or functions used to generate child URLs, along with the location or means for retrieving any input required for generating the child URL. Further, renderer 2820 may communicate specific details of the rendering process, including lists of child URLs, rendering times and timings for individual child objects, and complete rendering times. Further, object fetcher 2840 or any element of object fetcher 2840 may communicate date used in history recording 2880 to create web transaction information 2890. History database may further record frequency of object selection for using in caching decisions. Such information may be presented from any module of browser 2800. History database 2890 may further interact with an analysis device or remote analysis server to create statistical models using web transaction information 2890. Such models may predict future object use, or be used in managing local or remote caches.

Although FIG. 2C shows one potential embodiment of a web browser in accordance with aspects of the current innovations, alternative web browser are consistent with these innovations. For example, while web browser 2800 includes history database 2890, in alternative embodiments history database may be external to the web browser, or operating on a completely different computing device from the web browser. Similarly, the web browser may use multiple history databases, multiple caches, or multiple implementations of any element shown in FIG. 2C, and the various elements may be remote from the computing device operating the web browser. Any of the elements may be integrated as part of the core function of the web browser or coupled with any other element. Alternatively, in certain embodiments elements of the web browser shown in FIG. 2C may function as a plug-in module that works in conjunction with a web browser.

Figure 3:
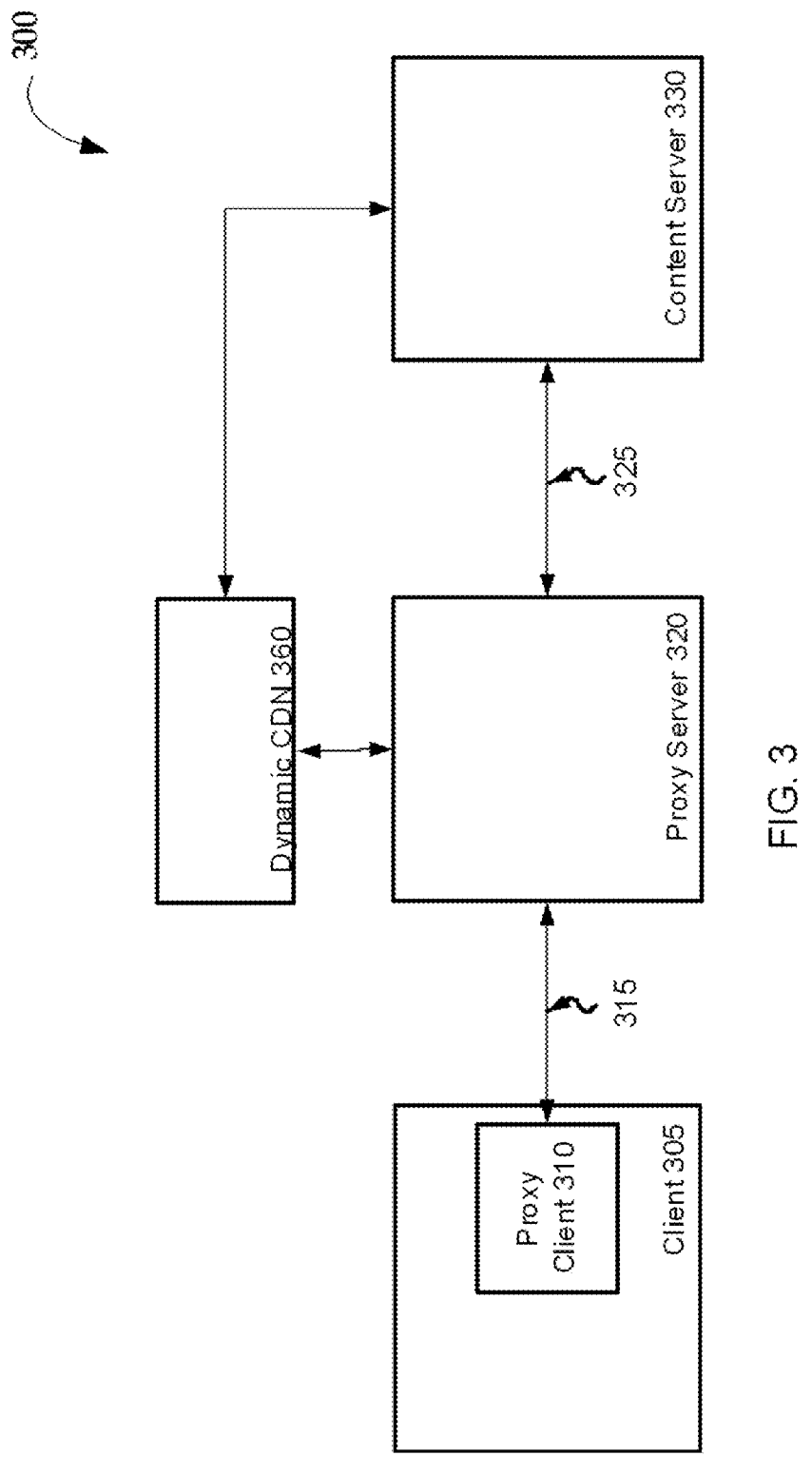
FIG. 3 illustrates a block diagram of one potential implementation of a communications system in accordance with one potential embodiment of the innovations presented herein.

As mentioned above, the systems of FIGS. 1D, 1F, and 2A, are examples of a hinting server architecture that may serve hints and smart manifests to a user system, and a variety of other specific implementations may be used. FIG. 3 shows one further example of an architecture that may integrate the functionality of a database computing device 2420, browsing assistance computing device 2430, or assistance server and database 232 into a proxy server. In further embodiments, systems that include both proxy servers and assistance servers may operate to share information and to function together as part of a system to provide improved web page transactions.

In FIG. 3, a system 300 for providing network acceleration is illustrated. Client 305 may generate requests for content from content server 330. Proxy server 320 may intercept web page requests from client 305 and may also receive and respond to hint requests from client 305 just as described above for other embodiments. In one embodiment, content server 330 may be a web server, a file server, a mail server, etc., and the content request may be for a file, a webpage, an email message, etc. Dynamic CDN 360 may function as an extended cache for client 305 such that for certain requests by client 305, either the proxy server 320 or a prefetch module within client 305 using a smart manifest may redirect the client request from content server 330 to dynamic CDN 360 to provide improved or accelerated web transaction performance.

Proxy client 310 may be configured to intercept the content request from client 305 and transmit the request over high latency link 315 to proxy server 320 on behalf of client 305. In one embodiment, high latency link 315 may be a satellite link, a cellular link, a wireless link, etc. In one embodiment, the content request may include references to prefetchable content. Accordingly, proxy server 320, while prefetching objects for network acceleration, may utilize the prefetch systems and methods.

In a further embodiment, communications between proxy server 320 and content server 330 over low latency link 325 are sufficiently fast that acceleration is not needed or would not provide sufficient benefit for the cost needed to accelerate. Hence, upon receipt of communications from content server 330, proxy server 320 accelerates the communications between proxy server 320 and proxy client 310 in order to accelerate communications over high latency link 315. The network traffic over high latency link 315 is accelerated while network traffic over low latency link 325 remains relatively unchanged.

The elements in FIG. 3 may in some embodiments function in systems with multiple proxy servers. In such embodiments described below, a system may include multiple of any component such as multiple clients operating proxy clients, and any client may communicate with any of multiple proxy servers depending on the system structure. In certain embodiments, proxy servers may share information, such that web transaction analysis performed on a first proxy server may be communicated to a second proxy server or to a database, for example, to improve the quality and amount of real user data for each proxy server that may be used to analyze web transactions and improve prefetch decision making. In other alternative embodiments, proxy servers may be organized into groups, such that certain groups share user data, and certain other groups of proxy servers do not share user data. Such sharing may be based on privacy access rights, user groupings, proxy server service provider information, or any other grouping scheme. In further embodiments, systems that include both proxy server and assistance server may operate to share information and to function together as part of a system to provide improved web page transactions. Still further systems may function with a web browser that operates in place of or in addition to proxy and assistance servers to provide improved prefetching and web transaction performance.

The following sections will now describe various methods of modeling and creating templates for target web pages and root objects in accordance with certain embodiments of a system for implementing web pages. In different implementations, such templates and models may function as hints or manifest information for a smart manifest file. The analysis described may be, for example, performed by a computing device such as database computing device 2420 of FIG. 1D, and may be incorporated into information sent to a client by a device such as browsing assistance computing device 2430 of FIG. 1D.

FIG. 4 is a chart of how one potential implementation of a system may identify parameters and correlations between parameters and child objects according to an aspect of the innovations presented herein, for use as hint or smart manifest information. While FIG. 4 presents one potential example using Netflix.com™, many additional permutations will be possible given the described system, and the methods are not particular to any given host or structure created underlying a particular host. As described above, the information received and used by the method of FIG. 4 may be from a plug in or component module of a web browser operating on a user system, or may alternatively be information observed by an acceleration system as requests and responses are routed between client systems and content servers.

In 420 of FIG. 4, an HTTP root request may be observed by a proxy server such as proxy server 320 of FIG. 3 or a web browser component such as component 212 of FIG. 2A. The following step 421 is to create a root template from this data. A parser may tokenize root HTTP request data into a series of key/value pairs. The root template may comprise a hostname and the keys for each of these pairs. Each unique root template may have a series of Bins, which are found in step 422. A Bin is defined by a set of values for some of the fields. In the example of FIG. 4, one Bin contains all the child URLs for this root template that would be downloaded anytime Folder1 has the value "Movies", which would be requested regardless of which movie might be selected. Another bin might cover the URLs specific to the movie 'Grownups', and another URLS that are only loaded when IE is downloading any movie page for the specific host.

Each Bin contains a list of child URLs 423 and the probabilities of their being requested, which control prefetch operations in a proxy server or a web browser prefetching module. These child URLs may include dynamic elements such as session IDs, user IDs, tracking information, and random values. Dynamic fields are represented by a mask value. The next step is to fill in the values for these fields at 425 with the values to use for this download. The Child Origin model 416 specifies how to get the values for these dynamic fields. In the example in FIG. 4, it might say that the value for the key "tcw=" can be obtained from the value of the cookie with the name "NetflixSession". In other cases, it might specify a value should be synthesized from the current time stamp or a value that would have been set in a previous download.

A special case occurs if a field is known to vary for each download, but not in a way that can be anticipated. If the field is download consequential, then there is no point in prefetching this URL: the prefetch URL will never match the browser request and the mismatched response cannot be used. In this case, the child URL may be left in the hint or manifest list with special marking so that it can be used to prevent the app requests from being added to the unrecognized model.

The final step is to determine the download consequentiality 426 of each field in each child URL. If a field is download inconsequential, it does not affect the response that will be delivered. The system can send the prefetched response to the browser if the browser request differs from the prefetched response only by inconsequential fields.

Figure 5:
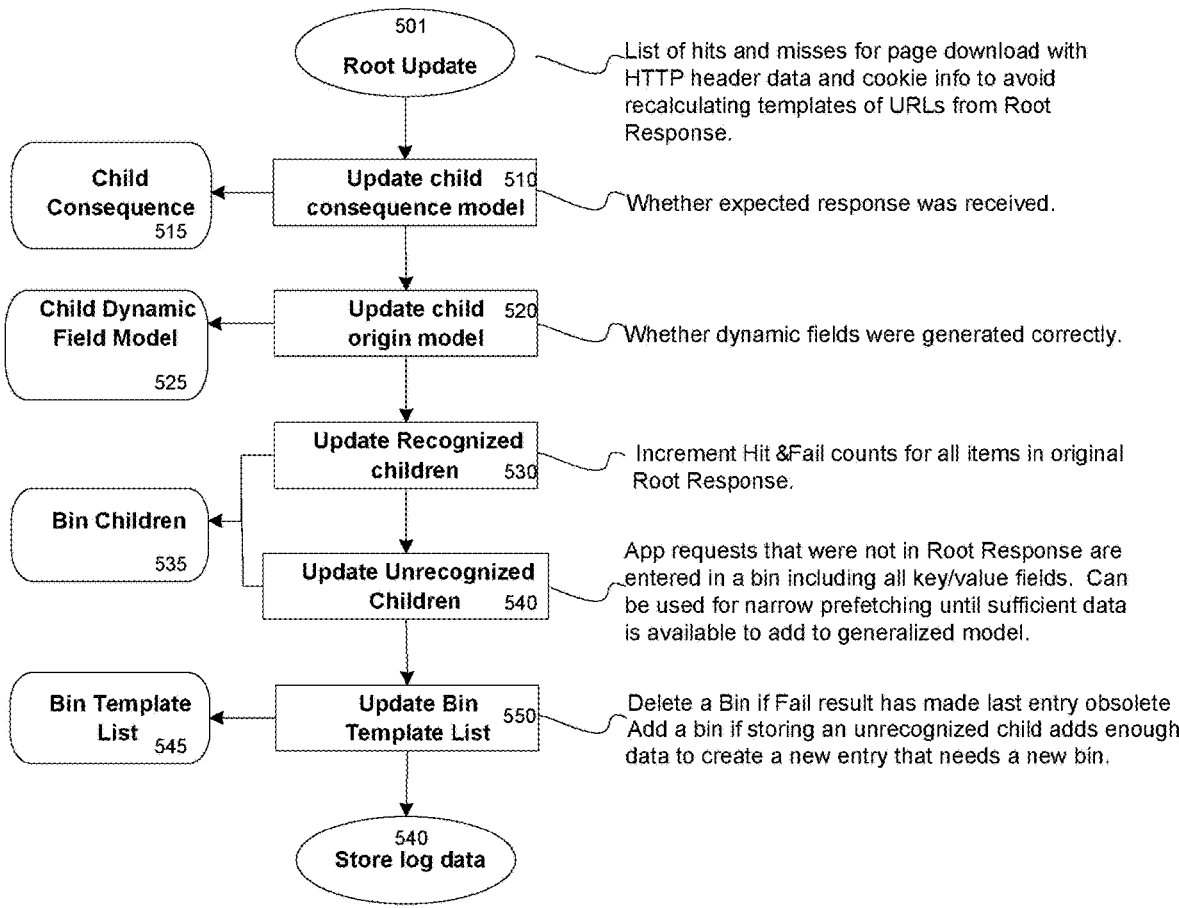
FIG. 5 describes a method for improved prefetching in accordance with one potential implementation of the present innovations.

FIG. 5 shows how a URL model may be updated in one potential embodiment that may work in conjunction with the embodiment described in FIG. 4. When a download is completed a tracker module updates a template that may be stored on an analysis server and used to create hints or smart manifest files. The template may include a report for child objects of the target web page or root including details of (1) hits indicating an object was prefetched and used, (2)

misses, indicating an object was requested in response to the root but not prefetched, and (3) fails where an object was prefetched, not requested in response to the root. A report as part of step 501 may also include HTTP header data and cookie information. To save CPU cycles, the templates for the root and child that are calculated when the web page request or target identification was processed by the prefetching system can be included in the report data. This hit, miss, and fail data may then be used to identify future parameters and correlations when selecting objects to prefetch in a web page transaction. For example, the system may have a percentage threshold above which a correlation is established. Alternatively, a prefetching score may be impacting by hit, miss, and fail percentages, such that a correlation based on the hit, miss, and fail data impacts the priority an object is given in a prefetch accumulator that utilized system resources for prefetching when the resources are available.

The child consequence model in step 510 checks whether the response to each child URL follows the model of field consequentiality as described above for FIG. 5. If a model already exists, the result can confirm or contradict the model. If the model is still being formulated, the new data can be added to the database. This may occur when the system decides, for reliability or other purposes, that a correlation has not yet sufficiently been established for an identified parameter.

The child origin model in step 520 checks whether the dynamic fields in each child were populated correctly. For a hit, all models can be affirmed. For a fail, the misses should be checked to see if a miss was due to an error in synthesizing a dynamic field. If so, the entry was handled correctly by the bin children and can effectively be considered a hit, but if the child origin model failed for that field and it may need to be adjusted. For a miss, the new data can be added to the URL model for this child URL.

Recognized URLs will either be Hits or Fails, so the appropriate bin children model for each URL may be updated at step 530. A hit may increase the probability for that URL in the model, while a Fail will decrease the probability of that entry.

A Miss is usually an unrecognized URL: one that is not yet part of the model. Until adequate information is available, the behavior of the system may treat this information as follows: (1) the child URL is added to a Bin that is defined by all values in the URL; the model applies only to exact copies of the root URL; (2) all fields in the child URL are assumed to be static, and for the next download the old values will be re-used; and (3) all fields in the Child URL are assumed to be consequential such that the prefetched response can only be supplied if there is an exact match with the browser request URL. Each of these behaviors may be controlled individually. A child consequence model may be available from other domains, client or user devices, proxy servers, templates, bins or database computing devices such as database device 2620 of FIG. 1F, so that it can be used before a good bin model is available. Conversely, a child URL can be added to a bin before sufficient data is available about its consequentiality. Additional details describing how models are created are discussed further below.

A miss can also be a recognized URL with a consequential but unsynthesizable dynamic field as discussed above. In that case, the bin model is affirmed, but the miss URL is not added to any new list, as there is no point in prefetching this URL in the future.

The updating of the models can cause a bin to be added or deleted at step 550. A new child URL may require creating a new bin defined by all the values. When enough data is available about the child, the child might be moved to a new bin that is defined by only a subset of the fields, such as the bin "Folder1='Movie'" in the example of FIG. 5. When all entries in a bin have failed or inactive too long, the bin or even the entire template can be removed.

Additional details will now be discussed for one potential implementation of template matching that may be used to identify parameters and correlations between parameters and objects when a proxy server or web browser observes a web transaction. The following system may be used with the systems and discussed above.

For the purposes of this description, a template is a sequence of fields specific to a domain and then defined by the path components and query keys in the URL. This system for URL modeling may create independent models for each unique template. This may simplify the analysis that has to be done to create the rules for predicting the children of a root URL or predicting the response of a child URL. An additional analysis in various alternative embodiments that is not restricted to template matches may discover other useful patterns to make these predictions. In certain embodiments, the extra analysis at the cost of system processing resources may have value, but in other embodiments, but this addition may not justify the extra processing complexity. In certain embodiments, the number of templates needs to be small relative to the number of sample URLs. If a web application involved with a particular web page transaction or set of web page transactions uses a large number of templates, then the restriction to evaluating within template matches may reduce the number of samples so that the predictions are less reliable for speculative prefetching.

One potential tokenization scheme according to one non-limiting embodiment of the present innovations follows the standard RFC1738. The protocol, hostname, path components, and query arguments are extracted from the URL. Each host name may be evaluated independently. The path components may be assigned keys based on their position: folder1, folder2, . . . , folderN, ending with the filename including any extension.

The next step is to identify key value pairs. The standard tokenization uses '&', ';' or '\' to separate the key/value pairs and uses a '=' to separate the key and value, such as:

```
http://ad.doubleclick.net/adj/lj.homepage/loggedout;a=1;r=0;w=0;c=se;pt=se;sz=
236x90;pos=t;tile=2
http://ar.voicefive.com/bmx3/broker.pli?pid=p68422230&PRAd=1858468&AR_C=
3970715
http://r1.ace.advertising.com/site=690966/size=728090/u=2/hr=13/hl=0/c=2/scres=5/
tile=1/f=2/r=1
```

In alternative embodiments, the system may analyze information from one or more URLs associated with a given host to find alternative or non-standard tokenization schemes to identify key/value pairs for that host.

The key for each key\value pair is considered part of the template, so that

HostName|Folder1|Folder2|Filename|size= . . . | tile= . . .

is a different template from

HostName|Folder1|Folder2|Filename|size= . . . |hr= . . .

where "size", "tile", and "hr" are all key names. However, for folders, the key is just Folder1 or Folder2 and the actual name in the field may be considered a value and not part of the template. This is because web applications sometimes use the "folders" in the path as query values. For similar reasons, FileName may also be used as the key for that field and the string in that field will be considered as the value and not as part of the template.

This embodiment of a template matching method may create a template key, such as a uint64 key, describing the template for a URL. The template keys can then be used to look up the models and data when processing a new URL for a known host. URLs for each host name are processed independently. In a distributed global processing system, the hash of the hostname can be used to select the server to process a URL when multiple systems are configured to share information as described above. Such an embodiment has the benefit of enabling parallel processing without duplicating resources, since the hash sorting enables each server to operate using a specific subset of data traffic.

In one potential embodiment described below, the system requires all fields to be present, but does not require named fields to be in order. In other alternative embodiments, various fields may be absent, or the system may require fields to be named in order. In the embodiment where all fields are present but not in order, the URLs:

```
http://ad.doubleclick.net/adj/2014;a=1;r=0
and
http://ad.doubleclick.net/adj/2122; r=11;a=97
have the same template, but these would be different because number of
fields has changed:
http://ad.doubleclick.net/adj/2014;a=1;r=0
http://ad.doubleclick.net/2014;a=1;r=0.
```

The order-independence for query keys can be achieved by sorting the query keys before creating the template key, or by using an algorithm for generating the template key that has the transitive property.

One potential embodiment may involve requiring all fields to be present. This simplifies the processing, but may miss many common cases not missed by other potential embodiments where all fields are not required to be present. Child URLs may be assembled by the browser by scripts that only add key/value pairs when a particular value such as a cookie is present. A long query with many pairs may differ only because an insignificant field is omitted. This may require two independent analyses to be run, where each operates with only part of the samples. Further alternative embodiments may examine the templates for each host and look for templates that should be combined. A translation table may then convert the template keys that should be modeled together into a common key for combined templates.

The child URLs that may be requested when a root page is downloaded may depend on values provided in the HTTP header other than the URL. Adding key/value fields into the template for the header data incorporates this data into the models. One of the most influential HTTP fields is the UserAgent, as web sites often supply different content to different agents. Other directives such as HTTP version, encodings accepted, etc. can also affect the child URLs that need to be prefetched. In certain embodiments, such standard directives may be excluded, however, other embodiments may deal with such standard directives by including them as default fields with every template. In such embodiments, if the directive is not included in the HTTP header, its value may be entered into the template as NULL. The same techniques used to correlate child requests with other template fields may then be used to deal with the directives.

Cookies may be complex header fields, which can also affect the child URLs that are ultimately requested as part of the web page transaction. Cookies therefore may have an influence on parameters and object correlations in a prefetching system according to the present innovations. Creating individual key/value pairs for each cookie name/value pair in the request may function in one potential embodiment to provide a straightforward means of the analysis of correlations between specific cookies and the URLs which are subsequently requested. However, since the storage and attachment of cookies can inconsistent, creating different templates for each combination of cookies would fragment the templates: and a large number of templates for each URL may result. Therefore, in one potential embodiment, the system may create implied fields for all cookies names ever associated with the template. If a new cookie name appears in a request, it is added to this list. Requests that do not include this cookie in such embodiments may have a value of NULL for the appropriate key.

In one additional embodiment, a structure may be created to deal with a relationship between cookies and folders. The standardized HTTP specification provides rules that can associate cookies with folders, so that different cookies can be placed in different folders. Such and embodiment may include a template structure that treats folder names as values, so that different folder names are part of the same template. All cookies in such an embodiment will appear in a single template. This will not impact the ability of the system to determine the children to prefetch: if a folder name is significant, its value will control the selection of children.

According to certain non-limiting embodiments of the present innovations, the identification of child URLs to prefetch for a URL template may be based on bins as described above. A bin may be defined by a set of specific values for some of the fields in the URL template. For each bin, a set of children may be defined that will be prefetched when a URL matching the bin value is encountered. The probability of individual children being requested in such an embodiment may be a function of whether they were requested for root pages matching this bin's values. These probabilities may then be adjusted such that probabilities increase for hits and decrease for fails, as described above. In various alternative embodiments, multiple other parameters and system resource considerations may be included in prefetch decision-making processes.

When a new child URL is encountered, it may be assigned by default to a bin that includes all fields in the model where the bin values are those of the root URL instance responsible for the download. As the same child URL is seen again, it may be moved to a bin defined by only a subset of the fields. This generalization process allows children to be prefetched for root URLs that have never been seen before, but where some of the fields match bin templates that are known to result in successfully prefetched items. In certain embodiments, child URLs in the bin list may be masked to remove dynamic elements, and then the masked values are replaced with values specific to a particular download of the root. This may enable the system to calculate dynamic values, in certain instances, so that objects associated with the dynamic values may be prefetched. In other embodiments, dynamic values may simply be associated with objects that are not prefetchable, and the system may account for this by identifying expected objects that are not prefetchable.

Figure 6:
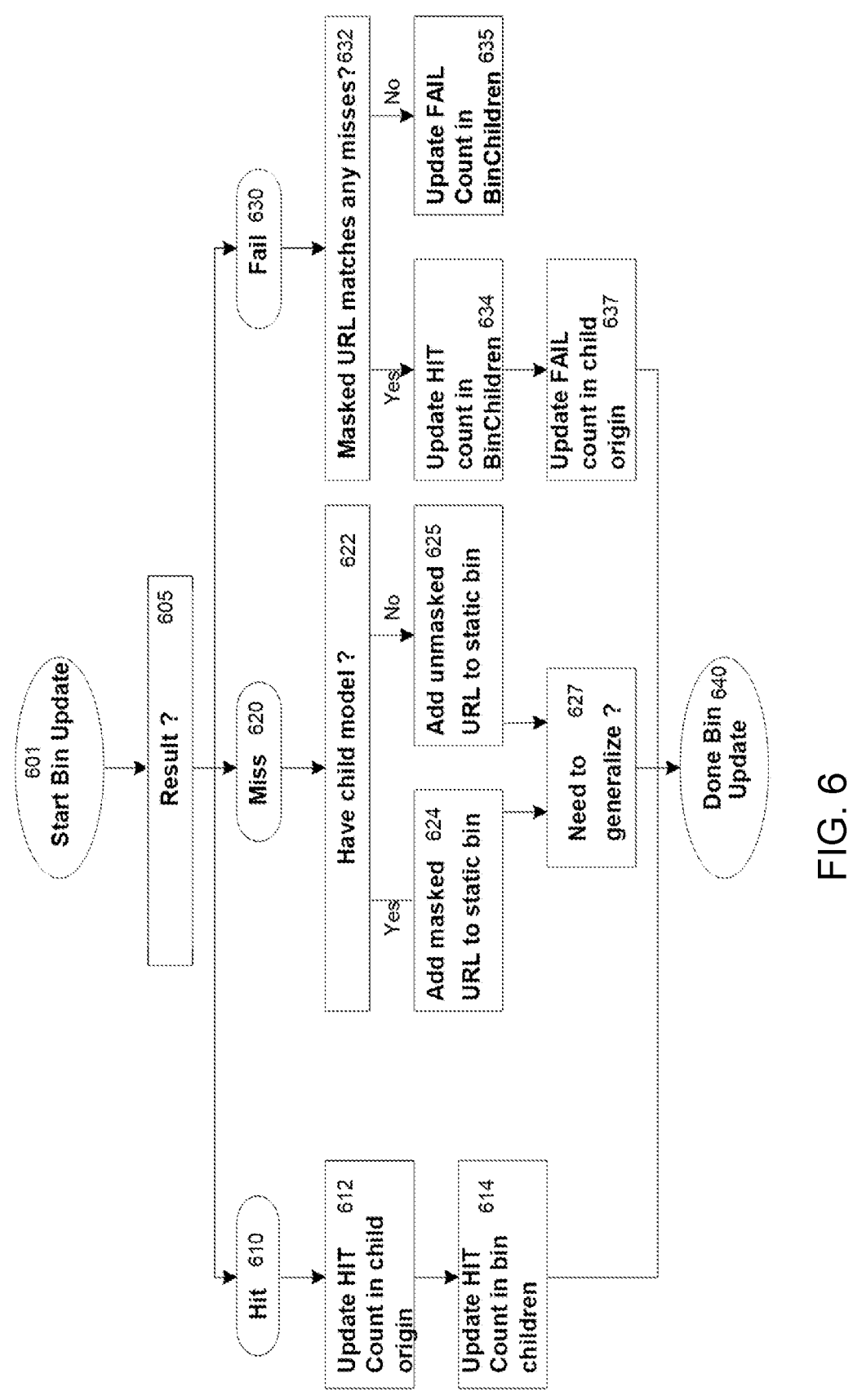
FIG. 6 describes a method for improved prefetching in accordance with one potential implementation of the present innovations.

FIG. 6, then, provides an overview of how the bin models are created and updated. The processing of each child depends on an identified result in step 605 of whether it was a hit, fail, or miss as reported by a system at the conclusion of a web page transaction.

If the child is identified as a hit in step 610, an associated hit count in the child origin model may be incremented in step 612. Then its hit count in the bin entry is incremented. The location of the bin entry may be supplied in the report from a system server, which receives this value when the root request model was generated as discussed above. As a result of this increase in the hit count, the prefetch probability for this child will usually be increased the next time a root matching this bin template is encountered.

A system according to the present invention may encounter dynamic URLs, where a child URL changes for each download. Certain embodiments may attempt to predict the dynamic portion of an anticipated child URL. Such attempts to prefetch URLs by predicting the dynamic portion may be incorporated into a child origin model that creates dynamic fields and places them in masked values in a child template as described below.

If the child was identified as associated with a fail in step 630, the missed children from the download are checked to see if any matches the child template that failed. If so, this indicates that the correct masked URL was prefetched, so the hit count can be incremented at step 634 in the same way as for a hit. A problem, however, may be identified in that the masked values were not correctly replaced by dynamic data, so a fail will be recorded in step 637 in the child origin model which was used to fill in the dynamic fields. When a dynamic field must be generated by the child origin model, the probability of the URL being requested is multiplied by the probability that the origin model has used the correct value, so the overall impact of this fail will be a reduction in the prefetch probability for this child in future downloads. If none of the missed items matched the template of the failed URL, then the bin model was incorrect and the fail count is incremented at step 635. This will also decrease the prefetch probability for that child in subsequent downloads.

In step 620 a miss may be identified for a child URL that was requested by an application or user as part of the web page transaction, but not prefetched. The same special case of errors in filling in the dynamic fields discussed above may also apply to this step. Otherwise, this URL may be treated as a new entry with new associated templates created. A model may have already been generated for the URL template of the child based on its use as a child in other bins, other templates, or other domains. If so, the masked URL will be entered into the model at step 624. When a new entry is added to the model, it may be placed into a default bin, which may be the most specific bin possible such that all fields in a subsequent download have the same values.

In certain embodiments, if no child model exists, the URL can be added in step 625 to the same default bin as above, but a backpointer may be kept to this entry in case a model for this child URL is subsequently developed. When that occurs, all instances of the unmasked child in all bins can be replaced with the masked value, which will allow the dynamic fields of the child URL to be synthesized correctly.

In alternate embodiments, additional generalization analysis may be done at the first identification of the new entry to identify subsequent downloads that may be generalized to the new object. When a new instance of this child URL is added to the default bin, the bin may be checked for previous instances of this child URL to see if any generalizations are possible. "Generalization" therefore as discussed here refers to using a bin that does not care about one or more of the values in the root URL fields. For example, the value of an ID in the root URL may have no impact on the children that will be requested. If generalization is possible, the child URL will be moved from the default bin to the more general one, so that the child will be requested for any root URL that has the values in the bin template. Greater details on how this generalization can be implemented in real time in certain embodiments is discussed below.

In certain embodiments, the goal of generalization is to identify a subset of fields in the root URL that are responsible for a particular child being requested. In addition to identifying a bin, this may also involve a need to determine the probability of that child being requested when a root matching that bin template is downloaded.

In certain embodiments, such a match may be developed over time based on a statistical correlation from observing hits, misses, and fails for a bin template. In alternative embodiments children may be moved from the default bin to generalized bins on a small amount of information. If the bin selection was too aggressive or generalized to quickly, the child will quickly encounter failures and be removed from the bin. In such circumstances an adjustment may be made to the object model to prevent repetition of the mistake. If the child is subsequently requested, it will start back in the default bin and a new attempt may be made to generalize upon it. In various embodiments, if the bin selection is too conservative, other instances of the URL will arrive as misses in response to template values that were excluded from the conservative bin. These new missed entries will be added to the default bin and a new attempt at generalization will be attempted. This attempt will have information about the other bin entries for this child, and may add the entry to a new bin that is a superset of the old. Selection on how quickly to move objects to generalized bins may therefore be based on available resources and system structures, and the costs associated with prefetching objects that are not subsequently used. If system resources are limited and costs are high, the system may generalize more slowly to conserve resources.

Figure 7:
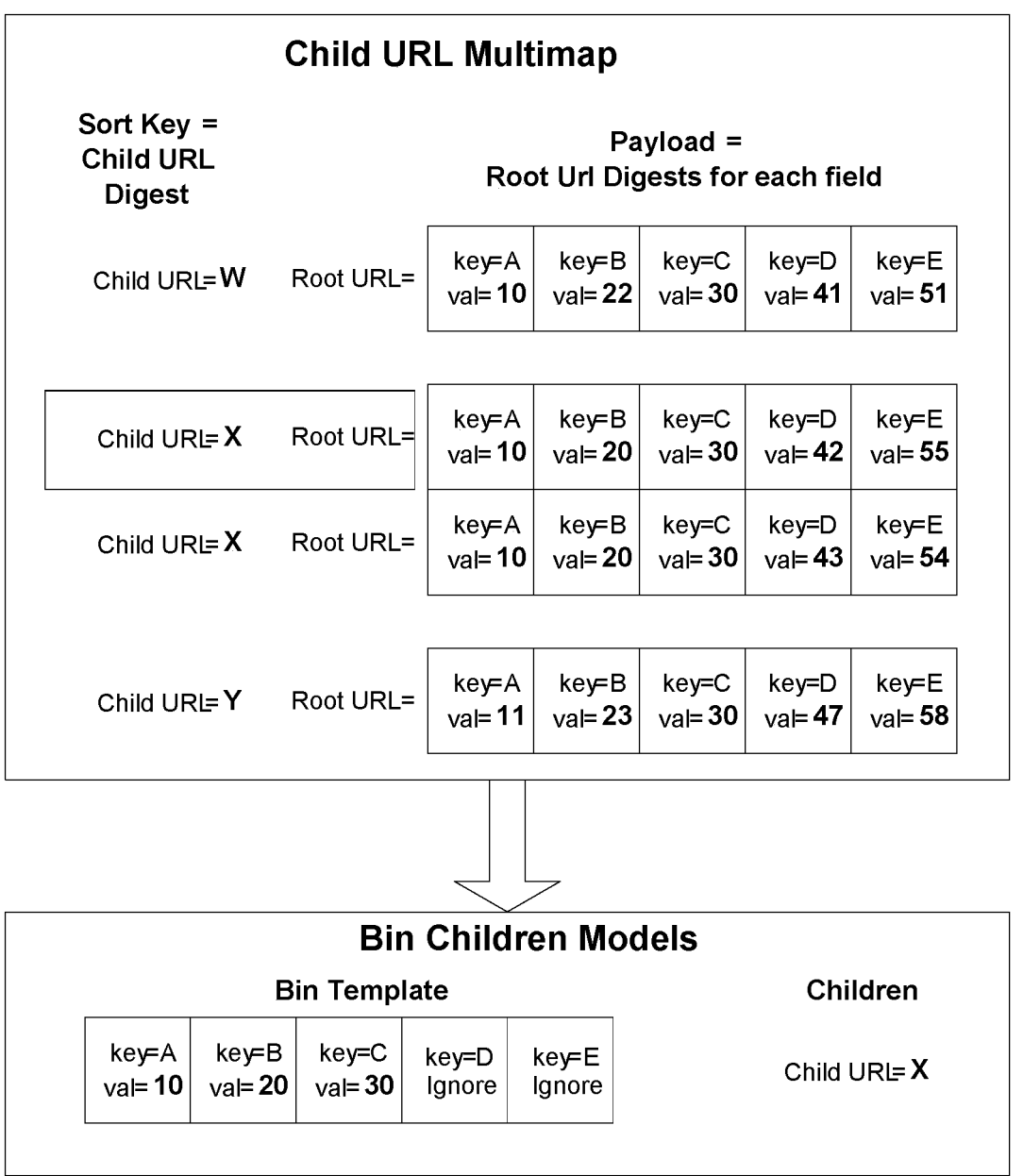
FIG. 7 describes a method for improved prefetching in accordance with one potential implementation of the present innovations.

FIG. 7 illustrates one potential view of how a multimap can be used to add a child URL to a bin. The child URL multimap of FIG. 7 is a digest of the child URL that was reported as a Miss by a system. The multimap is presented here for illustrative purposes to provide a clear explanation of one potential embodiment of a bin structure, and should not be interpreted as limiting. The payload structure described in this embodiment includes the values for each of the fields. All entries have the same number of fields, as they are all generated from the same root template as described above. For fast calculation, integer digests of the field values can be used instead of strings. When the highlighted new entry arrives with key value=X, it may be discovered that a previous entry exists, and the roots responsible for the entries have the same values for fields A, B, and C.

Such a pair wise method may try to generalize from this single pair of roots by assuming that only consequential fields are the ones in common, so this child URL may be added to a bin defined by this set of values for A, B, & C. This child URL will be prefetched from any subsequent root matching these three values, regardless of the values of the inconsequential fields D & E for this type of embodiment.

A bin count may describe how many requests for this bin have occurred since time T. As described above with respect to FIG. 7, a bin count can report how many entries have been received for the bin including those values of A, B, C since the earliest child with URL value=X was received. In FIG. 7 there are two roots that requested this child X. If these were the only entries in the bin ABC, then the generalization is acceptable, and a prefetch of child X would have a hit rate of 100%. Alternatively, if there were 100 roots reported with entries matching ABC during that time, then a hit rate for this model would be only 2%. This hit rate for children within a bin map closely hews to the probability value returned to the prefetcher for a child. The actual probability will be lower than the hit rate. There may have been 100% hits in the past, but the item might not be requested by the browser or may no longer be part of the page, or the web page may change.

In certain embodiments, then, a bin count may be implemented using a circular buffer containing timestamps when the root was requested. A sorted list can be used to find how many entries have been received since any arbitrary time T.

In additional embodiments, a bin count may also, or alternatively, be tracked once a bin is created. In the example of FIG. 7 again, the combination of ABC values for the bin may already have been used for other child URLs, so there may be a count for the bin that can be used to test whether to add child X to that bin. If this is a new bin, then it will not be possible to know the hit rate in advance, but the system may start using the model and then respond to the success rate that is actually achieved.

Various embodiments of the present innovations may deal with low hit rates in different ways. In one potential embodiment, a low hit rate may have two causes. The first is when the bin model with the low hit rate failed to include a consequential field. A field may be assumed to be inconsequential when it had multiple values in the instances where the child URL was requested, but it is also possible that several values in that field will produce that child URL, but other values will cause a different child to be requested. In the example of FIG. 7, it is possible that a value in field D of either 42 or 43 will cause child X to be prefetched, but any other value will not. In such a case, the correct solution would be to define 2 bins that have the common ABC, but different required values for D. In this case, the hit rate may be boosted by improving our model as described above.

In addition to the above-described low hit rate cause in the embodiment being discussed, a low hit rate can also be caused by randomly varying content. For example, the web server or content server may have 50 ads on a carousel, and randomly picks one each time each time it sees a root request matching those values for ABC. The ABC bin is the optimum model for such a situation, but the hit rate will never be better than 2%.

If the low hit rate is detected by the bin counts before child X is added to the bin, one potential embodiment can delay adding child X to the bin until we have more samples. If in the example, D was consequential and 42 was a value that triggered child X, the multimap would soon receive data for multiple instances of 42 for D. In that case, there would then exist a model ABCD to test. If the bin defined by ABCD had a high hit ratio, then the system may add child X to that bin. Children of roots with other values of D would continue to be treated as misses, but if D=43 also produced child X, the system would eventually discover this and add another ABCD bin where D=43.

If the bin ABC did not exist prior to this, the hit count will not be known in advance. In that case, the bin can be created and child X can be added. If fails are detected, the child can be removed from the bin, but the system may continue to track the bin count. Child X may go back to the default bin and a new model may be created from the multimap as described above, and the bin count will be available to make improved decisions.

If the multimap acquires a large number of entries for child X without finding a useful correlation for D or E, then the system may reach a decision threshold that this is randomly varying content. The system may then look at the hit ratio and see if the probability of X is high enough to justify a prefetch request. In other alternative embodiments, the object may simply be given a low prefetch score and placed in an accumulator to be prefetched if low-cost resources are available for the purpose. If the object is identified as acceptable for prefetching, the system may add X to the bin, with a note or tag that indicates that X is only expected for a lower probability, so that it should not be removed from the bin unless the hit rate drops below an expected level.

As discussed above, an initial model may have a correctable problem where the system may have an initial state where consequential fields are treated as inconsequential. In certain embodiments, a preliminary model can also have the opposite problem: it may have decided that inconsequential fields are consequential. In this case, the system may achieve a high hit ratio for this child in the assigned bin, but the system will also soon see more misses where the same child URL shows up from a root that matches some but not all of the consequential fields.

Figure 8:
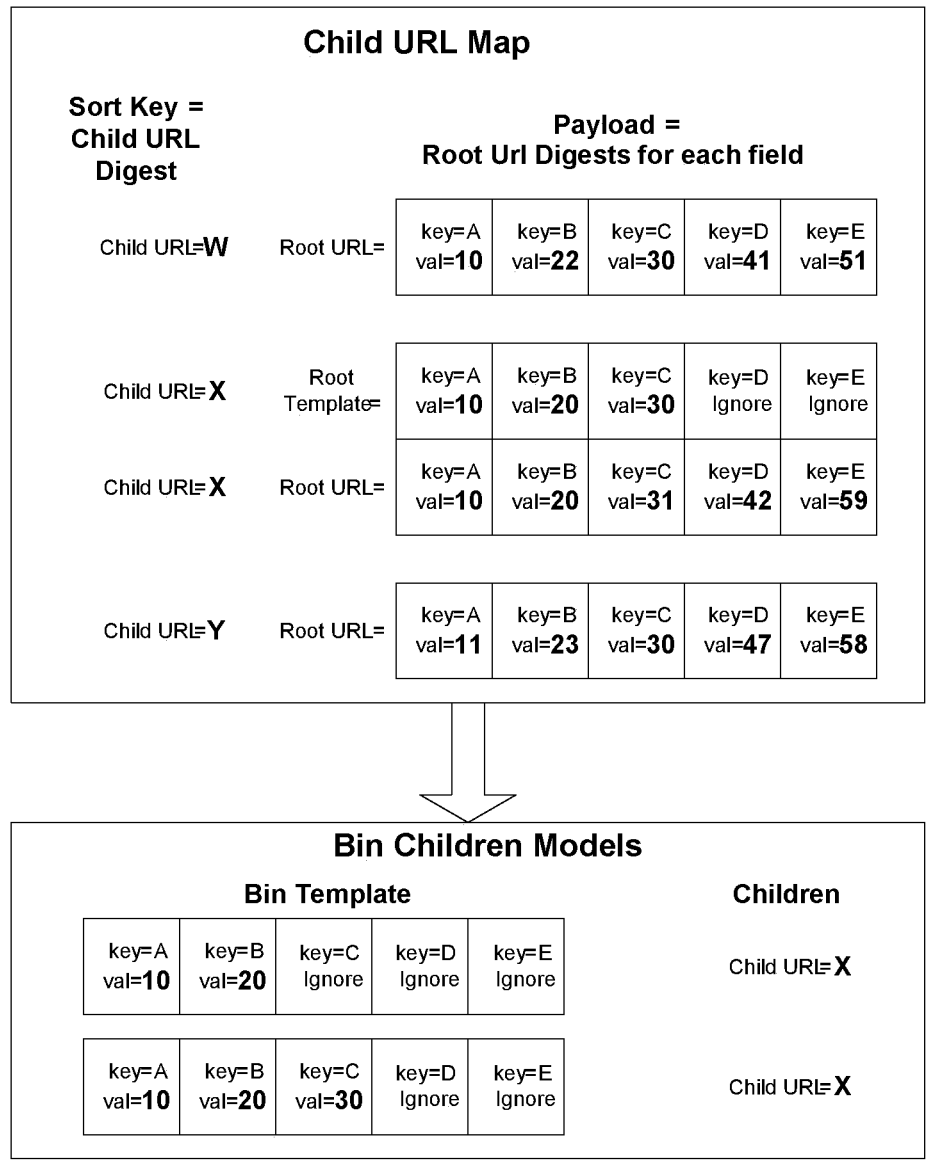
FIG. 8 describes a method for improved prefetching in accordance with one potential implementation of the present innovations.

FIG. 8 shows how this problem may be solved by tracking the bin assignments in a multimap. After child X was added to a bin defined by a set of ABC values, a root template entry is added to the map. If a new root is missed by this model because it had a different value for a consequential field, such as C=31 in the figure, then X can be added to a bin defined by only the AB values.

If the ABC model had previously had a high hit rate, it could be temporarily retained as shown in the figure. When the children of a new root are being collected, the highest probability for X would be used. If it matched the full ABC template, it might receive a higher probability than if it only matched AB. However, if the hit rate for AB is the same as for ABC, then C is inconsequential for X, and the entry for X can be dropped from bin ABC.

As discussed briefly above, in certain embodiments a child URL that is a potential candidate for prefetching may include dynamic fields or parameters. In certain web page transactions, these fields may not be synthesizable, and so the child URL may not be prefetched. In other web page transactions, these fields may be calculated or synthesized from a large variety of sources. In the models above, the dynamic portions that are known to be synthesizable are masked as part of the modeling operations, and then may be synthesized during the web page transaction when the appropriate information becomes available to the system. This improves the ability of the prefetch to anticipate the URLs that will be requested by the browser, as the values in the masked fields may be different for each download. If the fields are synthesized correctly, the prefetched URL may match a browser request even though the URL string has not previously been seen. The information needed to synthesize these fields may be based on either child-specific and root-specific models.

For embodiments utilizing child-specific classification, the child-specific classification may be based upon all instances of the child URL template, which may be from many different root templates, even those from different systems. The classification may specify whether the field is dynamic, how often the values change, have changed in the past, and/or are expected to change in the future, and the classification may further provide "hints" which function as information relating to where to find the values needed to synthesize the dynamic parameter of the URL. In certain embodiments, having such a global model may be useful when the system is building root models as the information suggests where the system may look for values or how the system may build models.

For other embodiments utilizing root specific classifications, the root-specific classification may use information from a specific root template to identify where values for the dynamic fields can be found. For example, for a particular web page transaction a session ID needed for a dynamic URL parameter might be found in a particular cookie value, while for a different web page transaction using a different root template, the session ID needed for a dynamic URL parameter might only be found by looking at previous URLs. The root-specific model may provide information on how to get each dynamic field for each child URL associated with that root.

In embodiments that attempt to prefetch child URLs with variable parameters, the goal of the process is to be able to synthesize the values of fields in the child URLs based on data which is available either at the time the root is requested or at an early enough point in the page download that the prefetching is still beneficial. Some values will be effectively random, so that the system will never be able to synthesize the same value that will appear in the browser request. Knowing that the value is random is also useful, so the system does not waste time prefetching URLs that will never match or otherwise adjust the prefetch strategy. The following is a description of some potential classifications for dynamic fields, and methods that may be used in certain embodiments for handling the various types of dynamic fields.

In some embodiments, dynamic fields may derive values supplied from cookies. A unique value appearing in a URL from the browser may have been supplied via a HTTP set cookie directive on the response to a different request URL that was part of the same page download. When the root page is updated, a list of the cookies that were set in the download can be provided so that it is available for this purpose when the model of the template for each child URL is updated. In order to take advantage of this data, the prefetch request may need to be delayed until the object setting the cookie is downloaded. In certain embodiments, such a system may provide a benefit to a system that does not want to use cookie values that are out of date and may produce the wrong response.

In some embodiments, dynamic fields may derive values supplied from web text. A unique value appearing in a URL may have been supplied in the web text data such as HTML, JavaScript, CSS, or other such formats in a way that could be discovered by the prefetch scanner or by the web plug in module observing the executed results of the web text. If an associated acceleration web browser module is unable to identify the appropriate information from the executed web text data, additional analysis may be performed. In some cases, a standard prefetch text parsing scanner may always find the full Universal Resource Locator (URL). The target web page or root page results may indicate which URLs were found by the scanner and in which web text files. A tracking model can then incorporate this data into the prefetch strategy. For example, a fresh copy of the web text file might be downloaded in embodiments where the object is not subject to an If Modified Since command and scanned even if the item is expected to be served from browser cache. Also, the tracker may be structured to wait for the scanner rather than use a low-probability rule for fields in the URL.

If a dynamic field affects many child URLs for popular target web page or root templates and no effective rules are found to synthesize it, then it might be beneficial to run a special scan of the web text files. When the target web page or root page is requested, the tracker can specify that it would like more information about a particular dynamic field that has been a problem in previous downloads of this template. The tracker module can provide a template to identify this field in the child URLs that will be requested by the browser, as these children are not currently prefetchable due to this problematic field.

In this case, the prefetch scanner or other similar functional module may save copies of all web text files when downloading the target web page or root. In various alternative embodiments, the analyzer may issue requests for URLs when it needs to run this analysis. This accomplishes the same goal, without requiring the system to collect the web text during the prefetching. When the download is complete, the scanner may use the template to identify the current value of this dynamic field in the child URLs for this web page transaction, and then scan for this value in all the web text files that were downloaded before the first child URL containing this value was requested. If a match is found, the preceding bytes may be scanned to see if there might be a Java operator such as "var SessionId=" that could be used to find this value in future downloads of the target web page or root. The bytes after the value may also be recorded so that the system may find the correct end to a string. The next time this target web page or root page is downloaded, the tracker can supply this prefix string and end delimiter to the scanner to use during this download. The scanner adds this to the list of tokens for which it scans when processing the web text file where the value is expected. When it finds this value, it uses it to complete the synthesis of the child URL(s) that depend on this dynamic value and to prefetch those children.

In certain embodiments then, this procedure can thus allow the scanner to be used in constructing URLs containing dynamic fields even though the full URL does not appear in the scanned text file. The system may still miss cases where the entire field value does not appear as a literal in the web text, but may capture some cases that currently elude both systems without such an embodiment.

In some embodiments, dynamic fields may derive values supplied from another URL. While a dynamic parameter value may be unique to the current template, it may have been appeared in another URL that was part of the same page download. In certain embodiments, the URL may even be from a separate web page download or transaction. When a template for a child URL is being updated, the modeler can have access to the list of all child URLs relevant for that download and the order in which they were requested. The prefetch of URLs needing that field can be delayed until a URL containing that field is requested or identified. For example, when the HTML or a JavaScript is parsed, the scanner might identify a URL to prefetch that contains a field that has the correct value. URLs from templates that contain that field can then be prefetched. In some cases, the system may wait on a browser request for the template that contains the first instance of the field, and then prefetch the objects that need this value. In certain embodiments, a special case may occur when an entire URL appears as part of a previous URL, which occurs in some redirection schemes. In such an embodiment, the entire URL may be treated as a dynamic parameter and prefetched when the parameter becomes available.

In some embodiments, dynamic fields may derive values supplied from session specific data. Session specific data refers to a value that is used for multiple page downloads by a single client, such as when a user logs onto a web site that creates a shopping cart that is maintained across multiple page requests or multiple web page transactions that are considered part of a single session. Since a session specific value appears across multiple requests, the client session may be able to find this value from a field in an earlier request. This allows the synthesized URL to be prefetched immediately when the target web page or root is requested.

In some embodiments, dynamic fields may derive values supplied from user specific data. This may operate in a fashion similar to session specific information as discussed above. A user specific value may appear in multiple downloads by a single client. The only difference is that with user specific data the ID or relevant data may be more persistent, so that an ID value from a previous day could be used in a new prefetch request. For the modeler to detect these cases, it needs to have access to a long-term history for the individual user. This might involve data from a system net session database. In alternate embodiments, the prefetching system may expand on web transaction models to incorporate a user-specific indexing of the global database.

In some embodiments, dynamic fields may derive values supplied from configuration specific data. A configuration specific value may have different values for different groups of users, but each user may have the same value over a period of time when the user does not change user system configurations. The bin children model described above may handle configuration values that are specified in the HTTP headers or cookies. Those configuration parameters may be treated as key/value pairs, which may be discovered to be consequential, and a different set of child URLs will be produced that differ only by this 'configuration specific' value. Some configuration settings may not be discoverable in the HTTP headers, but rather are generated when the browser uses Java scripts or other parameters to query its local environment for parameters such as display resolution, support for plug-ins, or other user configurations. The handling of this field may thus be similar to the user specific fields. The primary difference in many embodiments is that it might be possible to predict the value even when no history is available for this value for this user. In such an embodiment of the system, some correlations might be established between groups of users and the value of this field, and the value for this user be synthesized based on membership in such a group.

In some embodiments, dynamic fields may derive values supplied from a date method. Certain embodiments of the system may include a detector for this detecting such dynamic fields based on comparing the field value with the date value returned by the operating system. The date method is a randomizer used for randomizing URLs, and detecting its use can improve system performance. In some embodiments, this is determined using a clock from a user modem, where the optimizer does not share the same system clock as the browser. If a date( ) field can be positively identified, it might be marked as inconsequential to both uploads and downloads, as the synthesized date is equally valid as the one synthesized by the browser.

In some embodiments, dynamic fields may derive values supplied from a rotating value. A rotating value typically has a finite set of values that appear across all users at various frequencies, but cannot otherwise be correlated with other fields, configurations, or other elements of the model. For a system operating with a browser component, if the correct object is identified in the executable code, the correct object may simply be identified within the browser component. However, if the object that is rotating comes from a child in a manner determined by the content server prefetching system or smart manifest may assign probabilities to each value and enable a prefetching system prefetch multiple URLs if the probabilities are large enough to justify the prefetch resources. In such an embodiment, the extinction probabilities could be modified, so that a Fail does not terminate prefetch attempts as readily as it might with static URLs.

In some embodiments, dynamic fields may derive values supplied from a random browser number. If the browser plug in is able to identify the code creating the random element in the URL, the system may model this element as inconsequential. Otherwise, the system may need to perform a more detailed analysis to identify if the element is truly random and inconsequential. In such embodiments, the random browser number may be an integer that does not appear in any field of any URL from any template for this host. In addition to the uniqueness of the values, the use of this method can be detected by the values of individual digits, which will be evenly distributed across all possible values. The uniqueness across large sample sets and the digit variance patterns form a more reliable detection within the system if the code cannot be identified. As with the date( ), rand( ) parameters in dynamic URLs, values that are positively identified as using a random browser number might be marked as inconsequential in both directions in certain embodiments. A value for a field may seem random to all the tests in the prefetching system such that it changes for each download to an unpredictable value and also doesn't meet the profile suggesting it is coming from the rand( ) method, so the synthesizer has no idea what to put there. For parameters in URLs that are random beyond the ability of the prefetching system to detect, however, the system may simply label the dynamic child as not prefetchable.

The purpose of the above-described classifications is to be able to synthesize the dynamic field values when a child URL with the same template is requested in different downloads of the target web page or root. In such embodiments, the first step is to match the templates of each child against the templates of children during previous downloads. This uses the same template matching strategy used to identify target web pages or root pages described above.

In some cases, more than one child URL will have the same template, such as:
cnn.com\ads\junkMail?sessionId=34534
and
cnn.com\moreAds\junkCtrl.js?sessionId=37865.

Initially, the system may only develop a single model for the template and assume that every use of this template will follow the same procedures for generating the value for "sessionId". In alternative embodiments a system may use different classification models based on some of the other field values, such as for Folder1="ads" versus Folder1="moreAds". In some embodiments, however, the default model is to assume that a field is static, which means it probably has the same value as in previous instances of URLs for the template. If so, the classifier may not need to spend resources looking further. Also, a field that periodically changes to new value, stays at that value for many downloads, and never returns to the old value can also be considered as a static value, as the success rate will be suitably high to justify prefetching using the known values that are considered static by the system.

When a field or URL parameter changes dynamically, the classifier or web page analysis module of a system device may attempt to see whether the parameter matches any of the types defined above in the discussion of parameter classifications. If this field has previously been classified and the classification or origin has been determined, then the value may be checked against the classification model. If the value confirms the model, then in certain embodiments the system may halt further analysis. In alternative embodiments, additional classification checks and model updates are verified before expending system resources, such as using network bandwidth and processing resources to prefetch child URLs based on this model in response to future requests for the target URL or root URL.

If a model for a dynamic field in a child URL is not available, the system may begin the process of constructing a model by performing a search to see if the field occurs in the other places in the web page or other web page transactions, such as fields of other URLs in the same page instance, cookies, instances of the same template and field in previous downloads of the page by the same user. In certain embodiments, the system device may use a strategy of creating a map for each download where the key is the field value and the payload is a rule specifying where the value appeared. A separate permanent rule map spanning multiple clients and downloads may have the field name as the key and the rule as the payload. The download value map may be used to look up all places the value has occurred in the target search areas for this web page transaction. For each match, an entry in the permanent rule map is either added on first time rule has been seen or updated with, for example, an increment the count of the number of times this rule was valid.

In certain embodiments, the value of a rule is based not just on its statistical probability, which may be defined as a percentage of times the rule was valid, but also in its usefulness to the prefetcher. The most useful data is that data which is available when the target web page or root page is requested, such as fields or cookies in the original target URL or root URL as well as data from previous downloads. Data that requires other children to be downloaded first may be less useful, but may be the only way to synthesize fields such as download IDs that appear in multiple children, as described above. Performance benefits may be achieved even if the system must wait for the browser to request one of these URLs before the other URLs may be prefetched.

As discussed above, consequentiality is an important characteristic of parameters in web page transactions. A parameter that is consequential has an impact on a subsequent object in a web page transaction, and impacts the ability of a prefetching system to prefetch child objects, especially if a value of a consequential parameter is not known. An inconsequential parameter is a value that does not impact selection of a subsequent object in the web page transaction. Inconsequential parameters may thus be ignored when making prefetching decisions. In certain embodiments of an improved prefetching system, one of the main goals of the URL modeling may be to determine the impact of each template field on the application. For child URLs, two questions for determining consequentiality are whether a field affects the response that the application will receive, known as download consequentiality, and whether the field is important to the application server, known as upload consequentiality. For target URL or root URLs, the question is how each field affects the child URLs that will be requested by the browser when this page is downloaded.

An example of a download-inconsequential child URL field is a statistical update to which the server always responds with the same response packet. The data is meaningful to the web server, so that a URL with the correct value needs to be uploaded to the server. However, the prefetcher may be able to improve performance by taking advantage of the DL-inconsequentiality by serving a response to the browser without waiting for the response from the web server.

An example of an upload-inconsequential child URL field might be a random value inserted into the URL, as is common for cache-busting reasons. Since the value is randomly generated each time, replacing it with a synthesized value in a prefetched request will not affect the application. The response to the synthetic request can be supplied to a browser even if the browser request had a different value for the upload-inconsequential field.

Download-inconsequential child URL fields can be detected by analysis of the URLs and response checksums, where checksum refers to any method allows fast checking of whether two responses are identical. If a field is download-inconsequential, URLs that differ only by this field always result in identical response checksums. Statistical methods described below may identify download-inconsequential fields and determine whether the model is strong enough to allow delivery of a cached response without waiting for a response from the web server.

Upload-inconsequential fields are more difficult to detect, as the server may derive meaning from a field even if the value of the field is download-inconsequential. The most common case is when the URL field is generated by the java rand( ) or date( ) methods. Techniques described below show how these cases may be identified and how the model strength may be determined. The optimizer may then use its own implementation of date( ) or rand( ) in synthesizing requests.

In embodiments where a system device has a cached copy of the response that it expects to receive for a child URL with download-inconsequential fields, server may implement prefetch handling is as follows. Initially, the server optimizer does not prefetch anything. The server optimizer sends to a client optimizer a URL with the inconsequential fields masked and the cached response. The client optimizer provides the cached response if a URL matches this template. The client optimizer uploads the browser request URL to the server optimizer. The server optimizer issues a web request for the URL. The server optimizer uses the web server response to update the model at the system device, and finally, the server optimizer does not send the web server response across the network link, which in some embodiments is a high latency satellite link. In such an embodiment, the web server will receive the same request as it would without prefetching, so it does not matter whether any fields in the URL are upload-consequential.

Conversely, in embodiments when there is no cached copy, the system embodiments may perform an alternative analysis. Since a cached copy may not be available if a download-consequential field is different from previous requests, the only way to save the round-trip time (RTT) is for the server optimizer to issue a prefetched request for the URL. If a field is upload-inconsequential, then the server optimizer can synthesize a value for the prefetch request and the client optimizer can serve the response to the browser even if this field is different from the URL requested by the browser.

If a requested object differs from a prefetched URL only by download-inconsequential fields, the prefetched response can be served to the browser and the RTT will be saved. However, if those fields are not known to be upload-inconsequential, a trade-off exists between two options. In one potential embodiment, the browser URL may be ignored. The web server received one request for the item as expected, but the difference in the download-inconsequential field in the prefetched URL from the browser's URL could affect the application in the future in ways not known to the system device when the embodiment ignores the fields/parameters. In alternative embodiments, a second request may be uploaded to the web server containing the browser URL. This ensures that the web server obtains the correct request URL, but now the web server has received 2 requests from a sequence a standard web page transaction would only include one, and the web server may be impacted by receiving two requests where the web server expected one. The extra request may have a worse impact, such is interfering with the hit count for the object at the web server, than getting the correct field value.

From the standpoint of the web server or content server, the second embodiment described just above is identical to any other prefetch miss. In such an embodiment, the server receives an incorrect prefetch request followed by the browser URL. The only difference is that the prefetch benefit for the client or user was achieved because the mismatched fields were known to be download-inconsequential. A third embodiment may use a system method that is not to prefetch in these cases. In such a third alternative embodiment, prefetch performance would be poor for service to the client if misses were never allowed. The selection between these three embodiments may can be guided by other preferences, and in certain embodiments may be incorporated as different options within a single embodiment that are selected with information such as indicators that the download-inconsequential field may also be upload-inconsequential.

The follow one potential embodiment of aspects of the present innovations related to determination of download consequentiality. X may represent a result sample which includes the URL that was requested and the response that was received. The response can be expressed as RX, which may be the value of a checksum of the response data. The URL can be represented as a series of key/value pairs. The value for key=i for the URL associated with sample X can be expressed as $V(X,i)$. Two URLs X and Y are considered identical if $V(X,i)=V(Y,i)$ for all key value pairs.

The impact of a field k might be determined by looking at pairs of URLs that are identical except for the value of k:
$V(X,i)=V(Y,i)$ for all keys except i=k
$V(X,k) \neq V(Y,k)$ If RX $\neq$ RY, the field is likely to be consequential, as the change in the value of k produced a different response. It could be a coincidence: the content may change over time and the switch to new content had nothing to do with the value of k.

Similarly, if RX=RY, the field is likely to be inconsequential, as the same response was produced even though the field had different values. A large number of positive samples are needed to provide the level of certainty required before a response can be delivered to the browser where the browser URL differs from the prefetched URL by the value of k.

One potential non-limiting implementation for running such a test on a large sample set is to compute a hash value Hi for all URLs in the sample, where H is a digest of the values for all fields except i=k. Hi is used as the primary sort key for the samples. To count the number of consequential samples, the list can be subsorted by V(x,k), and then by Rx. A count of samples where k was consequential can be generated by iterating through the sorted list and counting the number of different values of Rx for each V(x,k) bin. The number of inconsequential samples can be determined by using Rx as the second sort key and V(x,k) as the third. This may simplify counting of the number of cases where Rx was the same even though V(x,k) was different. This process can then be repeated so as to check the consequentiality of each field.

This implementation above, however, may not handle covariant fields very well. For example, if fields k and j are both inconsequential, but they both vary for each download, then we will never detect any inconsequential cases. We would never find multiple samples where:

$$V(X,i)=V(Y,i) \text{ for all keys except } i=k$$

because V(X,j) is always different from V(Y,j). An alternative embodiment may incorporate a test for covariance on a small subset of samples, so that the cost of testing multiple combinations is reduced. Once a candidate list of all inconsequential fields is created, it can be tested against the full sample set. For example, if j and k are the only fields identified as being inconsequential, the system exclude both fields from the hash used for the first sort key:

$$V(X,i)=V(Y,i) \text{ for all keys except } i=j \text{ or } i=k$$

A combined hash can be created for values of the j & k fields, which can then be used as the secondary sort key. The counts can then be computed as described above.

The system then may be able to detect inconsequential fields in URLs for which the responses change over time. For example, the URL http://cnn.com/worldPage.htm?rand=376485 may change value during the day, producing samples where both the value of rand and the content have changed, making the value appear consequential in the previous algorithms. This result may be avoided by sorting first by the fields determined to be consequential, such as fileName=worldPage.htm in the example. Then the system may perform a secondary sort based on the sample time. If the content is linearly time dependent, multiple copies of the same response value will appear consecutively, followed by a new value. The old value will not reappear once it has become obsolete. Bins can be created for each of these blocks of consecutive samples with identical response values, and then subsorted by the inconsequential field values, such as "rand" in this example. The checks described above can then be run to see if the rand URL field value is consequential.

In certain embodiments, the processing speed might be optimized by combining all samples where both the URLs and responses are identical. A count can be stored for the combined samples so that the sample strength in various tests can reflect all the contributors. In particular, a URL like cnn.com\images\leftArrow.gif would combine into a single entry, so that CPU may not be used for sorting or otherwise processing static URLs.

Additionally, various embodiments of the present innovations may need to respond instantly to new data so as to detect when a model fails, add new models as new templates are encountered, and update models when the number of samples makes the correlation strong enough to use in the prefetch list decisions.

Embodiments incorporating real-time updates may use a store for the entries in lists sorted in two ways to verify the current model. During run time, real time embodiments of the system may check whether a model has been broken by identifying new samples that indicate an inconsequential field in the current model is actually consequential. The system may also identify and whether the statistical correlation of the consequentiality is strong enough to use in a prefetch list. In both cases, the data can be sorted using three sort keys made up of a hash of all values for URL fields determined to be consequential, a hash of all values for URL fields determined to be inconsequential, and response checksums.

To detect violations of the current model, the system may first sort by the hash of the consequential field values. The system may then subsort by the hash of the inconsequential values and finally then by the response checksums. As each new entry is added to the sorted list, the system may check the values before and after each entry is made to see if the same inconsequential field values produced different results. If so, the value may be consequential and a prefetch list may need to require matches for this field.

To detect affirmations of the current model, embodiments of the system may reverse the order of the last two subsorts discussed just above. As each new entry is added to the sorted list, check the values before and after to see if the new sample adds a different set of values for the inconsequential fields that produce the same response as another set. If so, the model has been strengthened and may be ready for use by a prefetch list.

In some embodiments, the systems and methods for dealing with consequentiality require sufficient memory to store two sets of pointers and the values for the 3 hashes described above. If the system uses 64 bit hashes, this requires ~40 bytes per URL. Alternative embodiments of the system may also include a 3rd index sorted by time, so that obsolete entries can be periodically removed.

In certain embodiments, the detection of inconsequential fields may only be useful when the system has enough samples to create a high level of statistical certainty, as defined within the context of the costs, system resources, and/or contract limitations provided by the system device service. Consequently, a large number of samples may be collected and stored before the system device may reach a threshold to analyze the data. When that threshold is reached, the analysis can be run as described above to determine consequentiality. In certain embodiments, temporary sorting for this analysis might be done using a fast radix sort. If the preliminary analysis and model finds one or more fields to be inconsequential, the maps can be created as needed to use inconsequential parameters in real-time analysis and operation of the service.

FIG. 9, then may provide a basic outline for every HTTP request or HTTP response moving through a system device with an improved prefetching system. In step S900, the system receives web page transaction data. An analysis module such as web transaction tracking module 248, in conjunction with parsers that may be internal or external to the module, such as parsers 244 and 216, all of FIG. 2, may perform analysis in step S910. Such analysis may be performed on any portion of a web page transaction, including target web page or root requests and responses, and child requests and responses. When the data has been parsed, the analysis in step S910 may also determine if any, all, or none of the parameters discovered in parsing have been seen previously. In step S920, if no parameters have been seen previously, the system may simply establish a new model, as described above with respect to the Netflix.com™ example, with bins established for various parameters or the entire data portion. In step S930, for web transaction data where only certain parameters have been seen before, the system device may check stored history data for a generalized model that matches the parameters and host. Such a generalization technique is described above, along with various characteristic models that may apply.

In step S940, for web page transactions that have been seen before, the system may check the validity of the current model and prefetch with applicable models. For web transaction data that is partially or fully matched, the system may also include a check for parameters that need to be synthesized. The system may search for required synthesis data, or wait for the required data. A model for the parameters or transaction may include instructions for the system to either fetch or wait for the required data. Finally, after the web page transaction is complete, the system will have data for all children that were requested as part of the original target web page or root request from the client. The system may then perform analysis for all data, checking for missed associations with models, checking new models for data not previously seen to see if any generalized models may be created or possible in the future, and updating statistics for hits, misses, and fails, as described above in detail for various embodiments.

Figure 12:
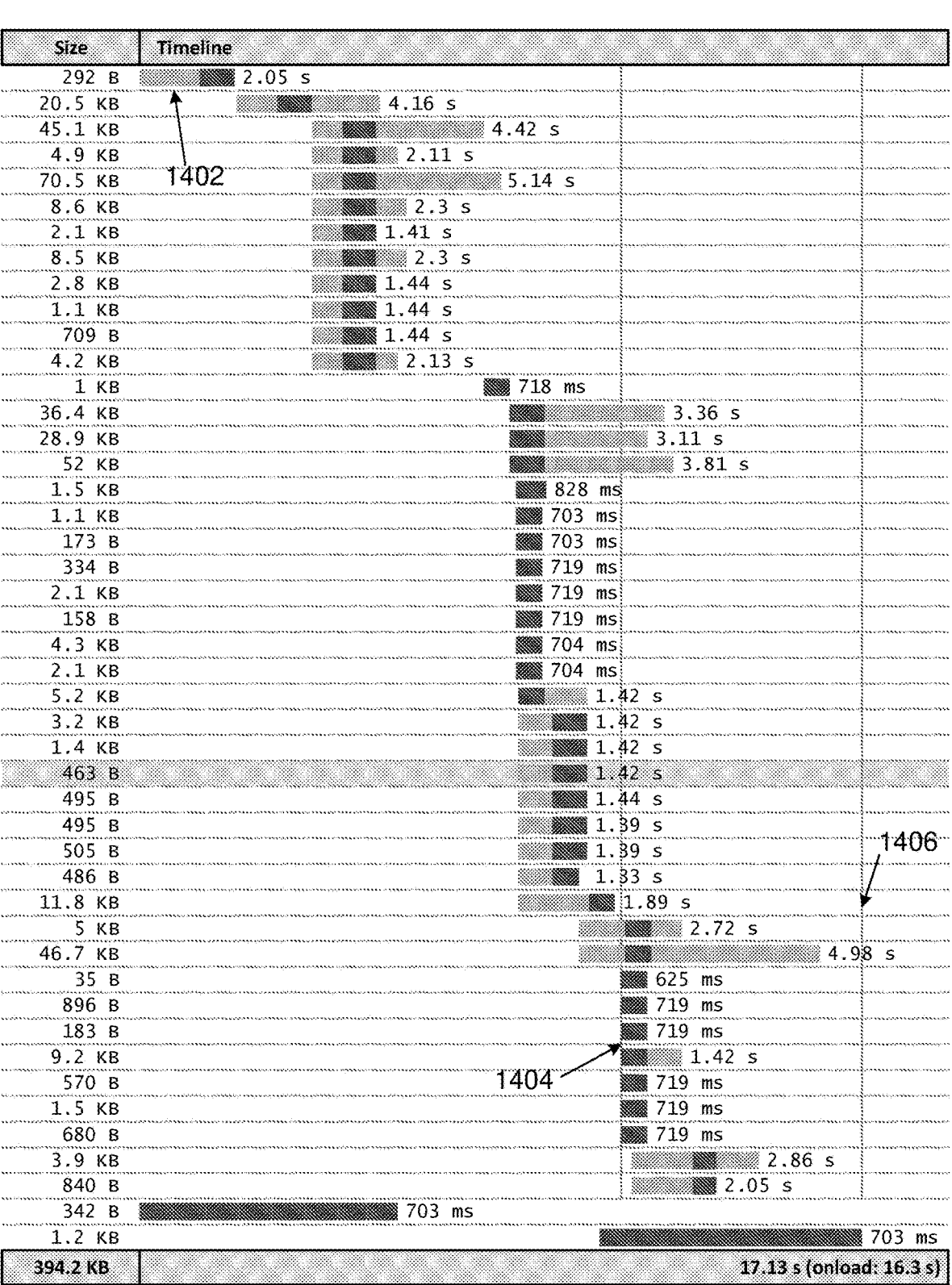
FIG. 12 illustrates one example of web page load data for use with a system in accordance with the present innovations.
Figure 13:
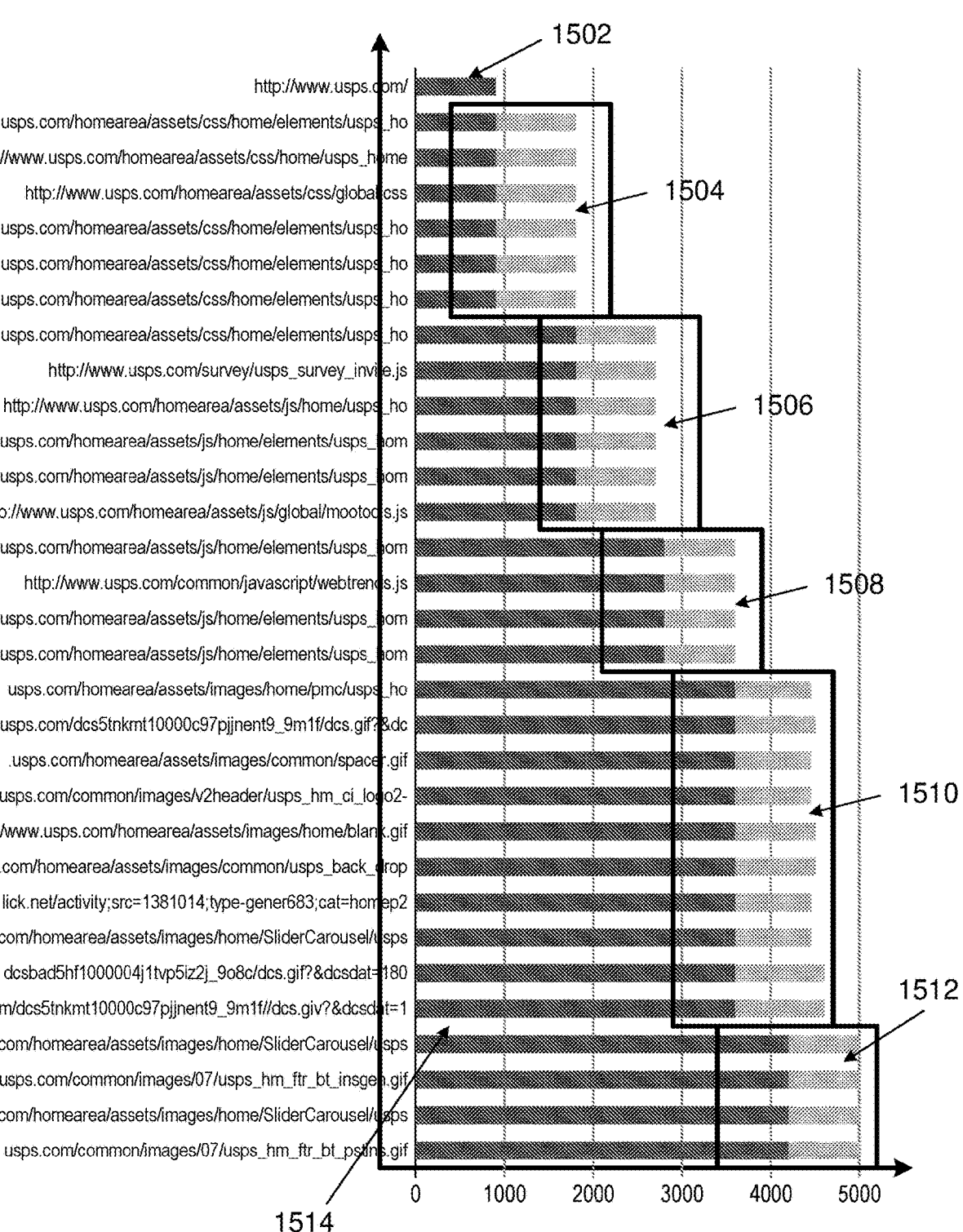
FIG. 13 illustrates one example of web page load data for use with a system in accordance with the present innovations.

FIGS. 12 and 13 show hybrid flow diagrams for one potential implementation according to the present innovations that also shows the location where steps in a process flow are performed. In FIGS. 12 and 13, the system includes a user application that may be operating on a client such as client 105 of FIG. 1, a client-side optimizer such as proxy client 110 of FIG. 1, a server-side optimizer that may run on system device such as proxy serve 120 of FIG. 1, and a content server such as content server 130 of FIG. 1.

FIG. 12 shows a process flow for a web page transaction where the system has limited or no prior information for the web page request, and where the system uses the real user data to create a correlation for use in future requests for the web page. In step 1, the user application requests a web page. Such a web page is typically requested in direct response to a user input or selection, such as a mouse click or key entry, but may also, in certain embodiments, be responsive to a macro or time-based selection operated by the application. The request is sent via the client-side optimizer, and in step 2, the system confirms that the requested web page has not been prefetched, and an upload request is sent to the server-side optimizer. In step 3, the upload request is received at the server-side optimizer, and is further reconveyed to the content server. In step 4, the content server responds to the web page request by communicating the response back to the server-side optimizer. In step 5, the server-side optimizer receives the response, and in step 6, the response is conveyed to the client. In step 7, the response is received at the client-side optimizer, and communicated to the user application. The response to the application request is received by the application in step 8.

In step 9, any child requests that are embedded in the initial response are identified by the user application, and the user application requests the child objects. Just as with the initial request, in step 10 the objects are verified not to be prefetched, and the request is sent to the server-side optimizer. In step 11, the request is communicated from the server-side optimizer to the content server. Unlike the previous request described in steps 1 through 8, however, in step 12, the system has prior information. In step 12, then, the system analyzes the initial request for a parameter that may be associated with one or more subsequent child requests. This may be done through the creation of an origin model as previously described, or through any other functional classification system or structure that associates the parameter with the child. Additionally, step 12 may be performed at any point in time relative to the subsequent steps. Step 12 may analyze and create a correlation immediately upon receipt of the child request, or at any later time when additionally processing resources are available or system use of the server-side optimizer is lower. Further, in various alternative embodiments, this analysis may be performed at a different server from the server-side optimizer, at the client, or at any other acceptable computing device. Finally, in steps 13 through 17, the child response is generated and communicated from the content server through the system to the user application.

FIGS. 12-19 refer to additional embodiments in which certain systems may identify web pages which include objects that must be fetched serially. Also described are methods that include multiple rounds of prefetching enabled for a single web page transaction to improve performance where these serializing objects occur. Additionally, the descriptions of identifying serializing objects and using this information to prefetch in a progressive manner may be instituted with any combination of the prefetching improvements described above. In certain embodiments, the fastest prefetch performance may be achieved if all children or as many children as possible can be requested as soon as the system sees the initial root HTTP request. In some embodiments, a portion of the system that tracks prefetching operation hits, misses, and failures to improve prefetching performance receives a copy of the root HTTP request as it is observed by the system. The tracking portion may then send back a list of child HTTP objects to prefetch. This type of system functions with a single prefetch list created upon observation of the root HTTP request.

A first issue that can cause problems and that may prevent a prefetching system that functions at the time of the target web page or root request from working for certain objects is when information needed to synthesize requests for children may not be available, but rather requires getting responses from the web servers or even additional requests from the browser. In other words, details required to make the appropriate child request are received during the course of a chain of requests and responses, and so the object cannot be prefetched at the beginning of the chain.

A second issue that can cause problems and that may prevent this from working occurs when responses during the download set cookies that affect the content delivered in response to subsequent child requests. Similar to the issue above, this is caused by appropriate information not being available at the time of the initial target web page or root HTTP request. Instead, the information comes in the form of a cookie that is set during the chain of requests and responses. The prefetch requests should not be issued until the correct cookies are available.

For the purposes of the present application, a "serializer" is any object, request, or response in a web page transaction that includes information that is required prior to a request or response for a later object. "Progressive prefetching" is any prefetching system or method that uses information about serializers in order to prefetch objects in a web page transaction while respecting the inter-object dependencies. In certain embodiments, rather than a single prefetch list created on observation of the target web page or root HTTP request, the tracking system may provide multiple prefetch lists, or a list that includes dynamic portions that will respond to information received during the course of the web page transaction.

The tracking system may detect these issues if the objects in the web page transaction or the updates after a download include indicators or data about the order in which requests were issued. The tracking system may also interact with the cookies attached to requests and dropped in responses. The tracking system may then build a model of the sequence of events that needs to occur when this root page is downloaded. In certain embodiments, the information required as part of the dependency may be considered a state change at the prefetching system, which allows creation of the desired prefetch request. Additionally, rather than generate a simple list of URLs to be prefetched, the tracking system may supply the prefetching system with a list of instructions as to the timing of requests and how information from responses and subsequent object requests during the page download can be used to synthesize dynamic fields in the child URLs.

In certain embodiments, then, the Bins described above for dynamic fields and child origin models, such as child origin model 416 of FIG. 4 may be further improved not only with information related to how to get the values for dynamic fields, but when the child may be prefetched within a chain of requests and responses as part of a web page transaction. While in certain embodiments, all prefetching may be initiated at the beginning of the web page transaction when the root request/response occur, other embodiments such as the embodiments described below may allow two or more rounds of progressive prefetching during a single web page transaction in order to deal with the chained nature of certain objects in the web page transaction. The list of child URLs 423 in FIG. 4 includes a child origin model 416 that specifies how to get the values for dynamic fields. In certain embodiments, a child origin model such as child origin model 416 may include details of when in the web transaction the required information will be expected, and when a prefetch operation may be made. In alternative embodiments, a record separate from the child origin model may be used for identifying prefetch timings. In any case, this process may therefore be considered to be progressive prefetching where instead of prefetching a simple list, the system may issue a sequence of prefetching requests that is shaped by events that happen during the page download.

In one potential embodiment, a prefetching system may enforce a maximum number of concurrent prefetch connections outstanding at any one time. In such a system, prefetches may be cued until there is an open slot below the maximum number concurrent threshold available for an additional prefetch connection. This limit on the number of prefetch connections may operate in conjunction with the prefetch sequence seen in a prior web page transaction, such that both the timing and order of the previously seen transaction is respected, as well as the limit on concurrent prefetching transactions.

FIG. 12 shows a timing chart for one potential real world example of a web page transaction that may be analyzed and accelerated in accordance with embodiments of the present innovations. The chart shows a list of objects, with a total timing and size at the bottom, and a position during the entire transaction when each object has an associated request and response. The root HTTP request of FIG. 12 is labeled as root 1402, with a 292 B size and a 2.05 second request/response time that begins at the very beginning of the web page transaction. The web page transaction includes a number of child HTTP requests and responses that are shown as beginning after the completion of the root HTTP response. The child requests and responses occur in several stages, with the final set of requests occurring at the time shown by the line indicated by timing 1404, and the final response ends roughly at the timing line indicated by timing 1406. At the time indicated by timing 1406, the web transaction is complete, and ready for complete display to a user.

FIG. 13 shows another timing chart for a potential real world example of a second web page transaction for "http://usps.com" that may be analyzed and accelerated in accordance with embodiments of the present innovations. The chart has a list of objects along the vertical axis and a time along the horizontal axis. The root HTTP request for http://www.usps.com is timing 1502. A first set of child objects that follows from the root is indicated by a box around object timings 1504. A second set of child objects that follows after the first set of child objects is indicated by object timings 1506. Similarly, third child object timings 1508, fourth child object timings 1510, and fifth child object timings 1512 are shown, each roughly following in a progressive fashion from the previous set of requests and responses. The area to the left of the labeled timing boxes, generally indicated by timing area 1514, is the delay from the beginning of the web page transaction for each set of child objects. Because of the progressive nature of the chart with later transmitted objects at the bottom, this may be considered or referred to as a waterfall chart.

Although the web page transactions illustrated in FIGS. 12 and 13 both appear to have groups of object timings that progress from one set of timings to another, there may not be an actual dependency from any later timing group on a previous group, and the design of a web page may vary in nearly any matter set by the creator of the web page. In order to determine if there is an actual timing dependency between objects, additional information or analysis is needed.

FIGS. 14-17 show simplified web page transactions to illustrate various real dependencies and a response that may be made by a prefetching system that uses progressive prefetching.

Figure 14A:
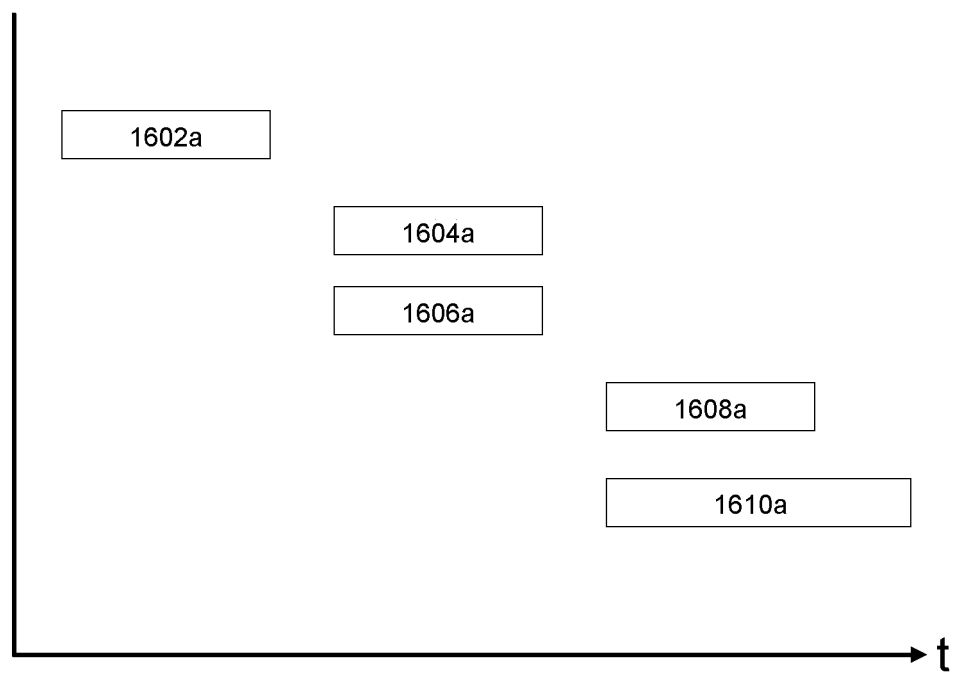
FIG. 14A illustrates one example of web page load data for use with a system in accordance with the present innovations.

FIG. 14A shows a web page transaction consisting of root object 1602 and child objects 1604, 1606, 1608, and 1610. For the purposes of FIGS. 14-17, boxes associated with the objects illustrate a timing from the beginning of the object request by a user system at the left side of each box to the completion of the object response to the user at the right side of the box, in a fashion similar to the charts of FIGS. 12 and 13. In a system without prefetching, the system has no knowledge or information about actual dependencies between objects. The system may simply have timings for the response and request. Although FIG. 14A includes a pattern of progressive requests and responses, the delay may be created not by a dependency, but by a caching limit, a connection limit, or some other limitation on the communication connection between a user and a content provider.

In certain embodiments, a system with progressive prefetching may implement systems to identify the actual dependencies between objects, and to distinguish these from limitations that are caused by some other means. Such a system may identify the serializers by scanning requests and responses for indicators that there is an interdependency. Such a system may also simply analyze timings after completion of a web transaction to identify serializers for use in a later transaction of the same web page. Additional details relating to the determination of the interdependencies is described below.

Figure 14B:
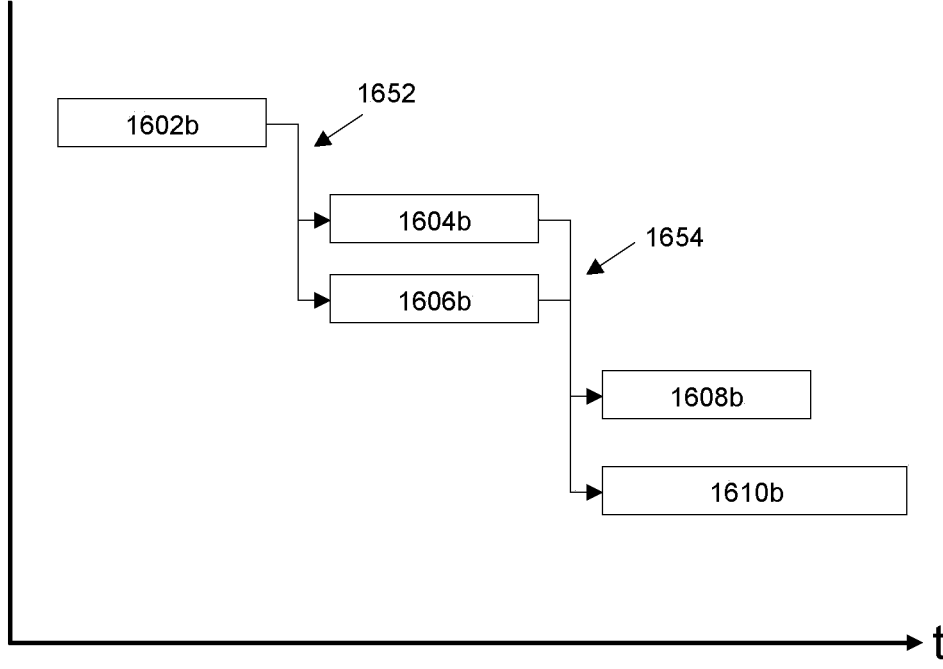
FIG. 14B illustrates one example of web page load data for use with a system in accordance with the present innovations.

In FIG. 14B, an embodiment of the system has analyzed the objects, and identified interdependencies 1652 and 1654. As illustrated, since both 1604 and 1606 depend on 1602, they may not be prefetched until after the request and response for object 1602 is completed. Similarly, both 1608 and 1610 depend on both 1604 and 1606, and so neither 1608 nor 1610 may be prefetched until the response for both

1604 and 1606 is complete. Given these dependencies, the relative order from the transaction shown in FIG. 14A must be maintained to respect the interdependencies during any progressive prefetching. Any later request for the same web page that uses prefetching will have a similar order of object retrieval due to the interdependencies between the objects.

Figure 15A:
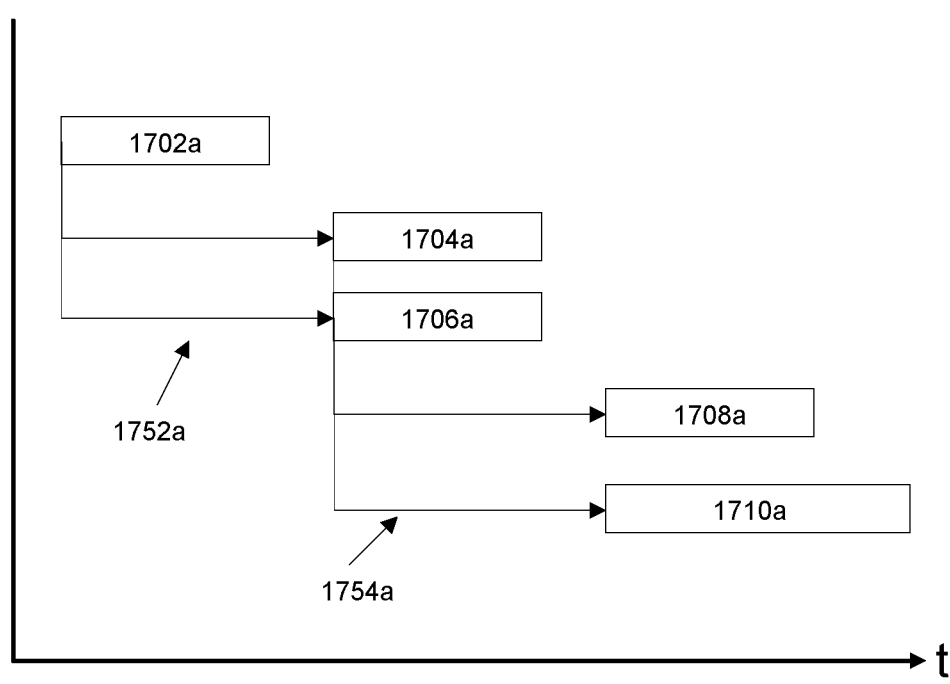
FIG. 15A illustrates one example of web page load data for use with a system in accordance with the present innovations.

FIG. 15A shows a similar web page transaction with objects 1702, 1704, 1706, 1708, and 1710. In FIG. 15A, however, the system has identified a different set of dependencies. Objects 1704 and 1706 depend only on the root HTTP request for object 1702 via dependency 1752. In other words, objects 1704 and 1706 do not require information from the root response that would be completed to the user at the time associated with the right-hand side of the box for object 1702. The same is true for objects 1708 and 1710, which have dependency 1754 which means the objects are requested based only on the request for objects 1704 and 1706, and there is no reliance on information from the previous objects.

Figure 15B:
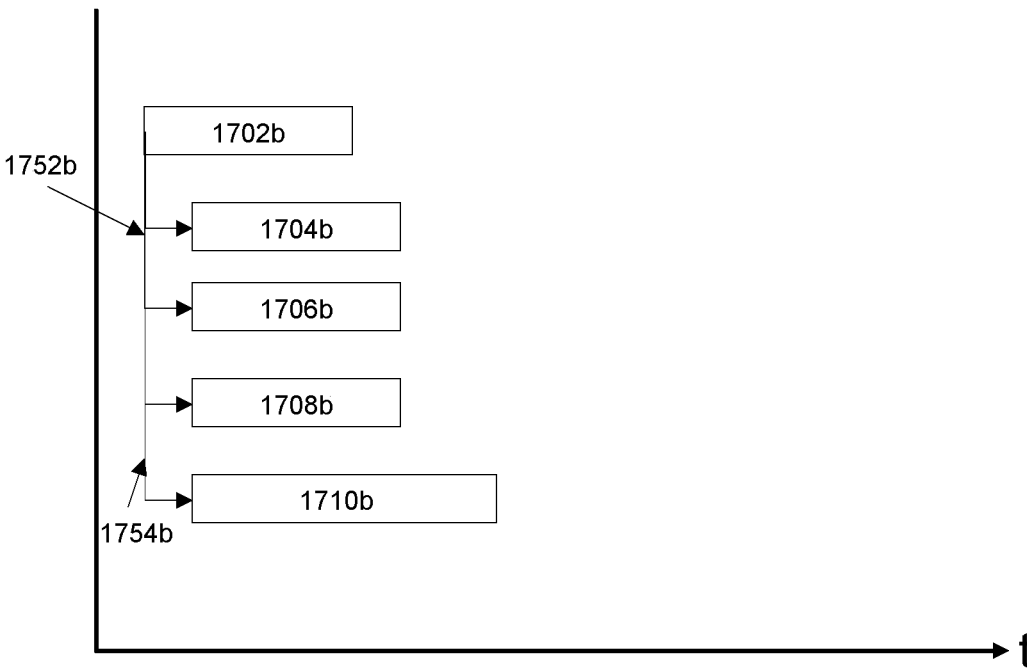
FIG. 15B illustrates one example of web page load data for use with a system in accordance with the present innovations.

FIG. 15B then shows a later request for the same web page as the web page of FIG. 15A. Because none of the child objects rely on information from any response, all of the objects may be prefetched as soon as the system sees the request for root object 1702. Because of the total lack of interdependencies, the example of FIG. 15B essentially shows an embodiment of a progressive prefetching system functioning as a prefetching system without utilizing any functionality for dealing with serializers.

Figure 16A:
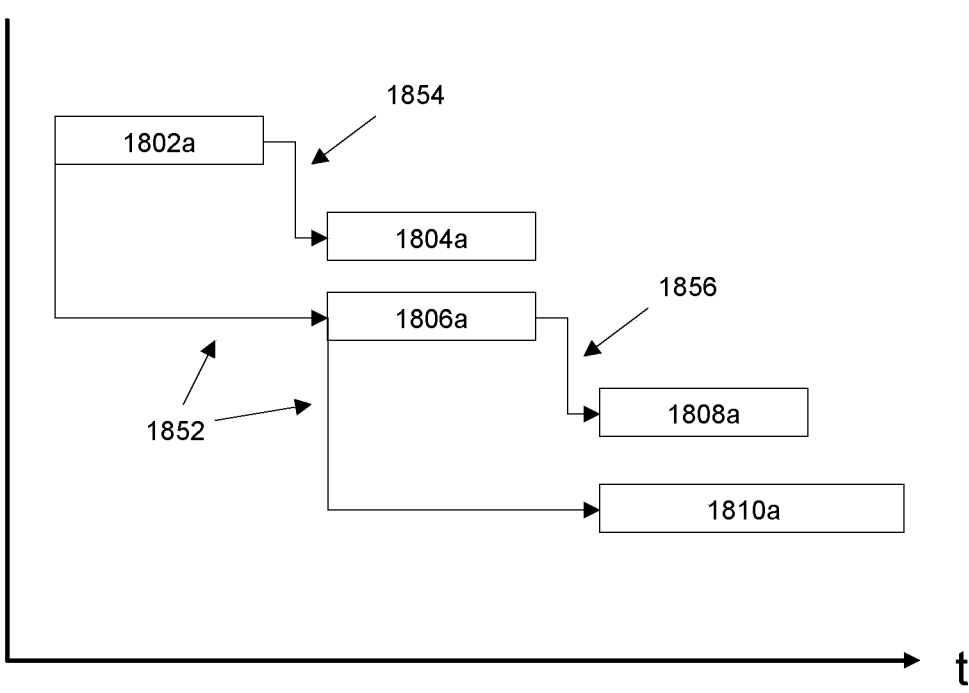
FIG. 16A illustrates one example of web page load data for use with a system in accordance with the present innovations.
Figure 16B:
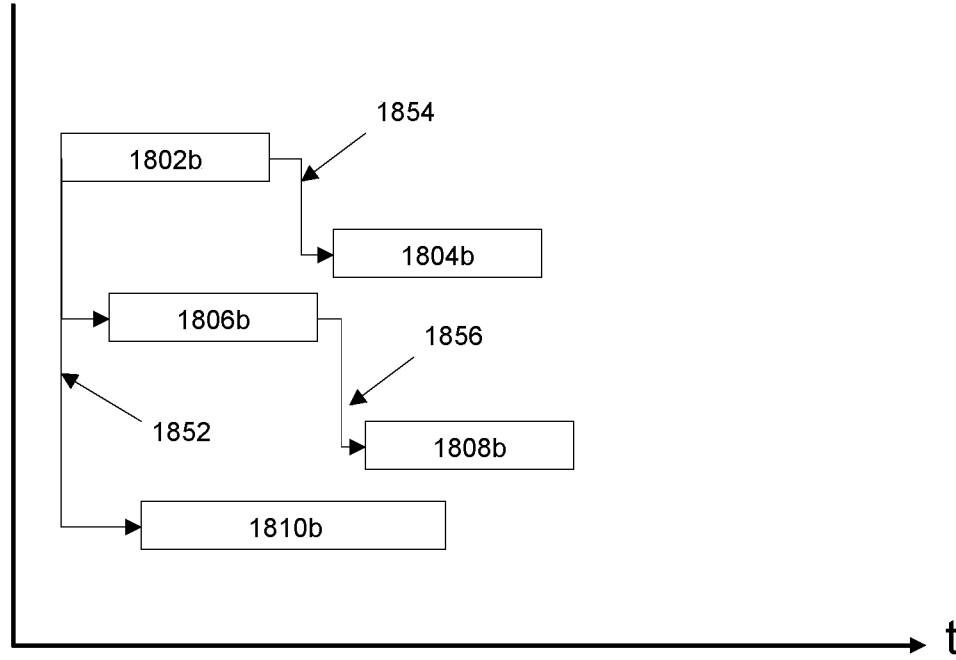
FIG. 16B illustrates one example of web page load data for use with a system in accordance with the present innovations.

FIGS. 16A and 16B again show another example of a web page transaction with the dependencies identified by one potential embodiment of a prefetching system. In FIG. 16, objects 1806 and 1810 do not rely on information from other requests and responses but only have a dependency or non-limiting association with the request as described above for dependency 1754. This does not limit the prefetching of objects 1806 and 1810 However, object 1804 depends on information from object 1802 via dependency 1854, and object 1808 depends on object 1806 via dependency 1856.

FIG. 16B shows a potential timing using prefetching, where objects 1606 and 1610 may be prefetched as soon as the request for root object 1802 is observed by the system. Object 1804 may not be prefetched until the appropriate information is received as part of the response for object 1802, and object 1808 may not be requested until the appropriate information is received from object 1806. This timing may be achieved as part of a prefetching system where a tracking system identifies the dependencies and passes the information to the prefetcher, which enables the new timing included the prefetching of objects at an earlier time in the overall web page transaction timing.

Figure 17A:
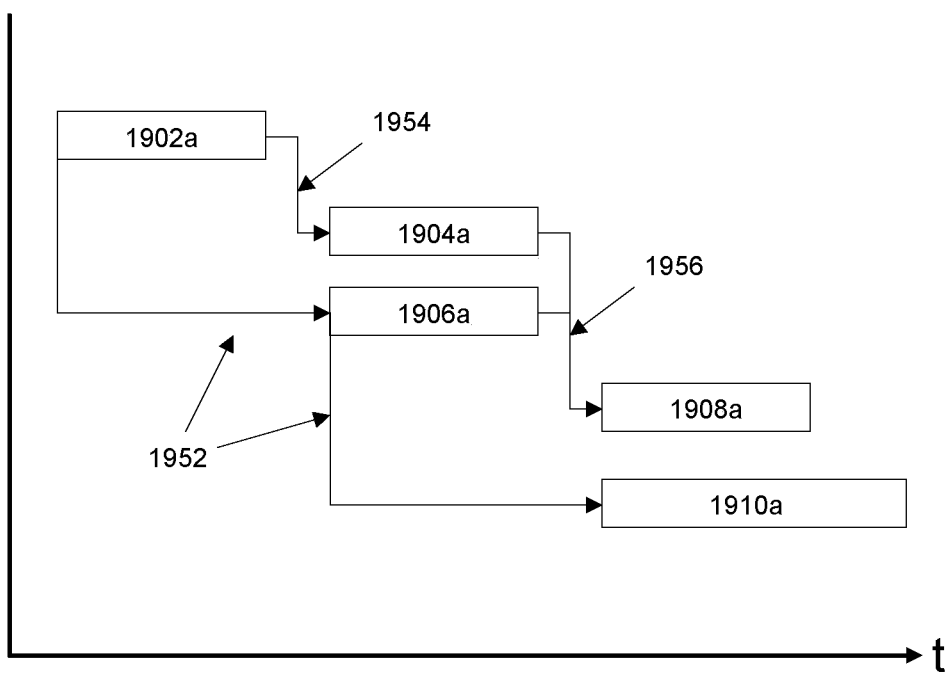
FIG. 17A illustrates one example of web page load data for use with a system in accordance with the present innovations.
Figure 17B:
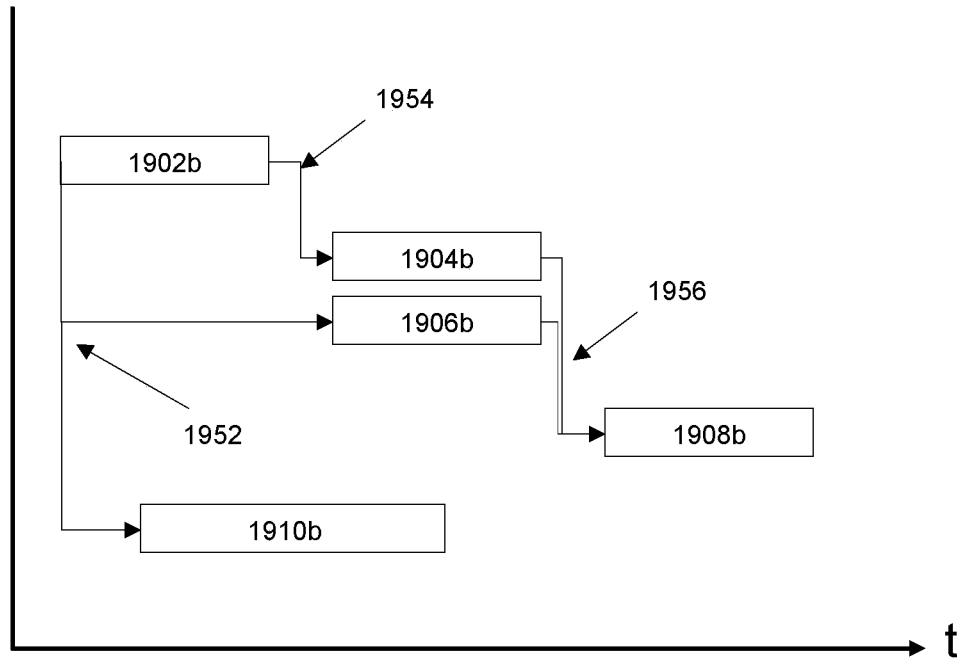
FIG. 17B illustrates one example of web page load data for use with a system in accordance with the present innovations.

Finally, FIGS. 17A and 17B show an additional web page transaction with a third set of dependencies different from those of FIGS. 14, 15, and 16 identified by the system. In FIG. 17, objects 1906 and 1910 have only root request dependency 1952, while object 1904 depends on information from root object 1902, and object 1908 depends on information from both object 1904 and object 1906. FIG. 17B shows a potential timing for a later transaction for the same web page as shown in FIG. 17A using prefetching.

In certain embodiments, the system may initially analyze a web page transaction to identify the dependencies. A system may further analyze various metrics including system resources, cost, user priority, domain priority, data type priority, or any other metric for prefetch decision making. One additional decision metric for prefetching is impact on overall page load time. In FIG. 17B, the system timing only shows object 1910 as having been prefetched in an order different from the request response order shown in the transaction of FIG. 17A. While object 1906 could be prefetched at an earlier timing due to the lack of dependency, such a prefetch would have no impact on the overall page load time, because the chain from object 1902 to object 1904 to object 1908 is the limiting factor in loading the page. Prefetching object 1906 would have no impact in the overall load time of the page.

By contrast, in FIG. 16B, if only object 1810 was prefetched, then the object 1808 would be the limiting factor on the page load time. In order to optimize total page load time, object 1806 is also prefetched to enable an additional second prefetch operation for object 1808 at an earlier time in the transaction, reducing the overall page load time as shown in FIG. 16B.

Figure 18:
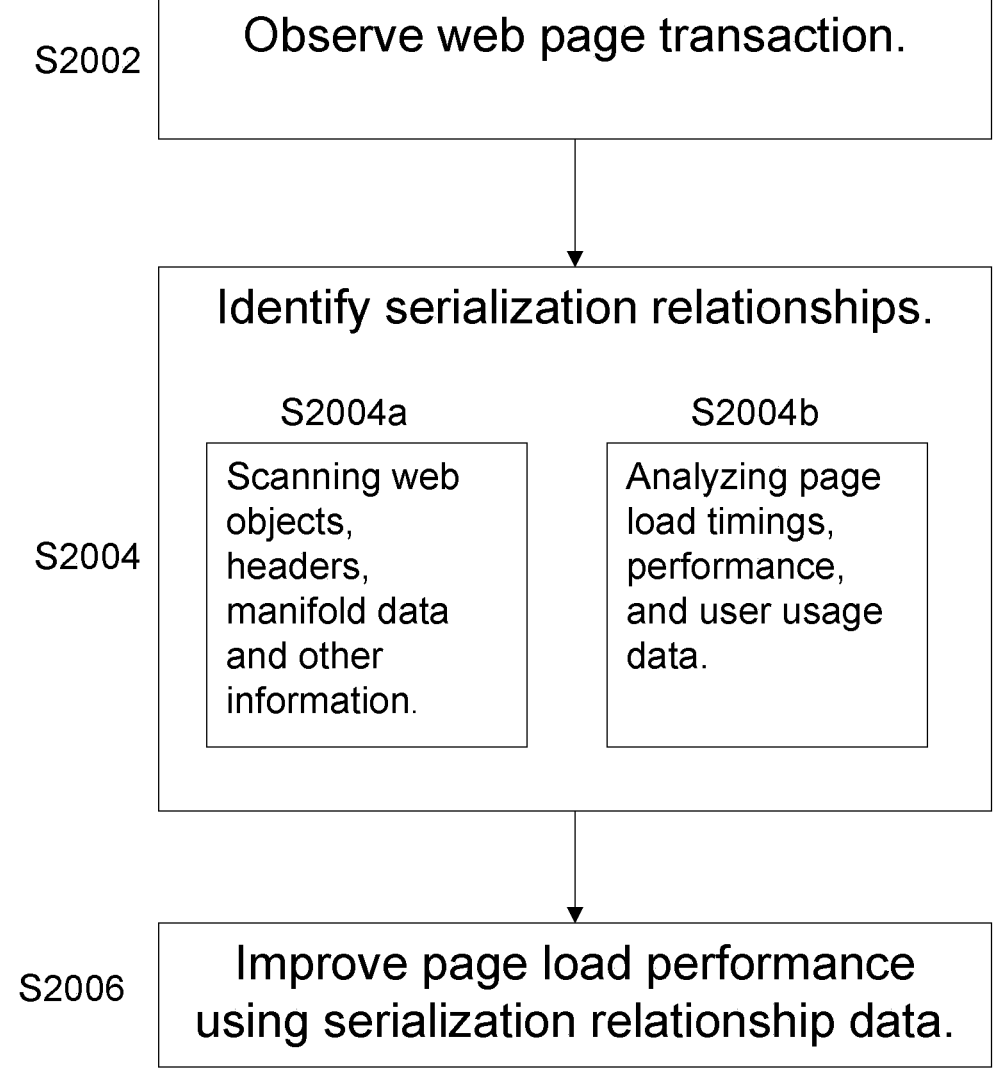
FIG. 18 is a flowchart describing one potential method of improved web page loading in accordance with the innovations presented herein.

FIG. 18 describes a basic method for progressive prefetching that may be incorporated into various embodiments of a prefetching system. In step S2002, a prefetching module or serializer identification module observes a web page transaction. Step S2002 may be performed in a proxy server such as proxy server 320 of FIG. 3. Alternatively, step S2002 may be performed in client such as client 105 of FIG. 1A, by a proxy client or by any other module within client 105 such as a web browser. Step S2002 may also be performed by a prefetch analysis server such as prefetch analysis server 121 of FIG. 1C.

In step S2004, the system identifies serialization relationships between objects. These are serialization relationships such as dependencies 1652 and 1654 of FIG. 14, dependencies 1752 and 1754 of FIG. 17, dependencies 1852, 1854, and 1856 of FIG. 16, and dependencies 1952, 1954, and 1956 of FIG. 17. Various different methods may be used to identify these dependencies.

In step S2004a, objects are scanned to identify dependencies directly from the contents of the object. The system may include rules for contents of an object, such that when a parser scans through an object and identifies content with an associated rule related to progressive prefetching, the system creates a dependency for the identified objects. For example, a first object that contains a particular type of call to a child object with a dynamic URL, where the dynamic URL requires an object response, may be identified by scanning an object. The scan may also identify these relationships not just from the direct object, but from headers, manifold data associated with the web page, information provided with the web page by the content provider, web page creator, or a third party. Any information available for scanning may be parsed for information related to object dependencies.

In certain embodiments, the scanning and prefetch decision making may occur in real time as the web page transaction is occurring, such that progressive prefetching decisions are made for a web page transaction that has never been seen before. In alternative embodiments, the scanning system may simply log the identified dependency for future use in later requests for the web page. As described above with similar prefetching decision making where usage data is recorded to improve future prefetching, the system may use this information on a universal basis for all users of the system, or in alternative embodiments, the system may use the information on a user, or group basis, or any combination of the above.

In step S2004b, the system analyzes page load timings, such as the timings illustrated in FIGS. 12-17, in order to identify potential dependencies. Although individual web page transactions will not provide definitive proof of dependencies, a system may infer a dependency based off of a single observation. For example, a system observing the web page transaction of FIG. 14A may infer the dependencies shown in FIG. 14B without risk of creating errors. If a second observation of the web page shows the same timings, the likelihood that the dependencies inferred as dependency 1652 and 1654 are more likely to be correct. This is even more true with many repeat observations. However, if the timing order changes, the expected rules may be altered. For example, if over many observations object 1608*a* is sometimes requested before a response is received for object 1604*a* and object 1606*a*, the system may assume that there is no dependency for object 1608*a*, and alter the rule identified by the system. If the lack of dependency is later associated with page load errors, the dependency may be reinstated in a prefetching model.

In alternative embodiments, step S2004 may receive dependency information from a trusted outside source without first identifying or confirming the dependency. In such an embodiment, the system may simply incorporate the identified dependency into a prefetching model and prefetch based on the received information. Again, if the information received is later analyzed to be associated with misses, fails, or serialization based errors, the system may reject the information and adjust the model accordingly. The system may then automatically share information related to the errors with the original provider of the information.

In step S2004, any combination of the above methods, along with any other acceptable method that identifies serializing objects, may be combined. Just as with step S2002, step S2004 may be performed on a client, a web browser component, a proxy server, a prefetch analysis server, a database analysis computing device or any other computing device. In certain embodiments, the observation and/or identification may be done on a stand-alone basis, without any directly associated prefetching system that alters future web page transactions. In the embodiment described in FIG. 18, however, information from step S2004 is provided to improve page load performance.

Step S2006 accepts the information from step S2004. The information may be used in a variety of ways to improve page load performance. As described above for FIGS. 16-17, the system may identify serializers that impact overall page load performance, and adjust prefetching decisions or system resource allocation to improve performance based on the identification of the serializers and the associated information. The system of FIG. 18 may various prefetching methods, where individual objects may be prefetched or cached in a web page transaction. Such a system may further include a progressive prefetching system that uses the information from step S2004 to alter caching decisions. In a system that is cache limited, serializers and other objects that do not typically impact page load performance over a large number of observations may be given a low caching priority, and serializers along with other objects that do impact page load performance may be given priority in cache memory where possible.

FIG. 19 provides an alternative method for progressive prefetching for use with one potential embodiment of a prefetching system in accordance with the innovations presented herein. In step S2102, a computing system observes at least a portion of a web page transaction that includes a root HTTP request and a root HTTP response.

In step S2104, the system attempts to identify the web page transaction to see if it has been previously observed, and if there is information associated with the web page transaction. In certain embodiments this information may be structured as a root template as described above with respect to FIG. 4. A parser may tokenizes root HTTP request data into a series of key/value pairs. Each unique root template may have a series of Bins. Each Bin may contain a list of child URLs and the probabilities of their being requested, along with any associated dependencies for each child, and any dynamic elements that may be constructed using information for the dependency as part of child origin model. The child origin model specifies how to get the values for these dynamic fields and may additionally specify the timing of the availability for the values. The origin model or another model may use the timing information along with the dynamic URL creation information to make decisions on prefetching timings within a web page transaction.

Alternatively, step S2104 may use another information storage method or source, where timing information is stored or received from another computing devices.

In step S2106, the system may scan the root and subsequent child requests and responses for tags or indicators that are associated with expected dependencies. A parser may scan through requests and responses to identify indicators or commands that the system has associated with serialization. For example, when the parser tokenizes HTTP data, dynamic portions of the data may be flagged as associated with dependencies. Additional analysis may be done in real time, or flagged for further analysis by a separate computing device or when additional computing resources are available.

In step S2108, the system performs object prefetching during the web page transaction, if possible and indicated by the prefetching rules of the system in conjunction with the associated serialization information from step S2104 and any new scanned serialization indicators from step S2106. Concurrently with step S2108, in step S2110, the web page transaction is observed and data associated with the web page transaction is recorded.

In step S2112, the web page transaction information is analyzed to identify serializing interdependencies between objects. This may include timing analysis in conjunction with previous records for the same or similar web pages. The new information may then be updated in the systems tracking databases or in whatever way the system follows and models web page transactions in step S2114. In step S2114, if the web page was not seen previously, a new template may be created for the newly observed web page. Otherwise, the previous template may be updated. In certain embodiments where certain observed objects may be associated with identified key/value pairs, any dependencies identified for related objects may be updated in multiple web page transaction templates. In other words, if a subset of objects may be associated with multiple web pages based on the system models, the data may be abstracted to alter statistical models for all those associated web pages.

In step S2114, the system may also alter or make associations or weights for future progressive prefetching based on the information and analysis. For example, if a previously identified dependency is identified as having been incorrect, such that future prefetching timings may be altered to improve overall page load performance, a timing model may be updated so that the prefetching system will have the information in the future when the web page is requested by a user.

In step S2116, another system action may be taken in response to the identified and analyzed information. The system may identify objects which impact page load performance and adjust caching decisions. For example, continuing with the situation described above for step S2114, if a previously identified dependency is determined to have been incorrect, and an object may now be cached without causing dependency related errors, the system may analyze the impact of caching that object, and decide to alter a cache to include the object. Conversely, in alternative examples an object may be identified for removal from cache based on serialization timing data that indicates that caching a certain object has limited or no impact on overall page load timings. Objects in a cache may therefore be deleted or replaced based on a cache replacement policy created by or including the above-described preferences and policies.

Just as for the multiple various embodiments described above, any particular component or step of the above describe example is non-limiting, and may be altered, performed independently, or combined with any other known or described step that allows the system to function. In certain embodiments, an input URL and associated dynamic response data are analyzed for nested or dependent relationships. These relationships may be between children of a root HTTP request or may be reliant on further input. In further embodiments, a prefetching system identifies how information from a prefetch response or a subsequent web application request during a page download may be used to synthesize dynamic fields in a child URL. The above description therefore includes many potential combinations of systems, apparatus, and methods of using real user usage data to determine the dependency structures of a web application.

Various embodiments according to the present innovations may therefore include combinations of systems that perform prefetching of dynamically generated child URLs, prefetching of child URLs for roots have not previously seen by the system, progressive prefetching, identification of object every time the user visits the page to defeat caches so that web servers will always see these requests. An example of javascript code for such a function is:

stringmakeURLUnique (string URL)

```
{
uniqueURL = URL + "random=" + rand( );
returnuniqueURL;
}
```

In an embodiment which only has proxy server data, and does not have access to a browser module, inferring the above code from HTTP requests and responses may require a significant number of samples to have a high level of confidence that the value associated with the key named "random" is both inconsequential and in fact a randomly generated value. Further, in proxy only embodiments, there may always be some probability that in fact the number is not randomly generated. By contrast, in embodiments where a web page acceleration system includes a component inside the browser, then the function used to construct the URL can be included in the feedback sent from the browser to the acceleration feedback collector after a page is rendered.

Dynamic URLs can also include calculated values using custom functions, values found in persistent cookies, or values based on built-in functions like Date( ) As an example, certain web page transactions may use the following method to add a specially constructed string to the end of a URL:

stringconcatSpecialString(string URL)

```
{
    //first add a key-value pair for the current timestamp
    specialString="timestamp=" + Date( );
    //second add a key-value pair for the session ID
    specialString += "sessionID= + document.cookies["SessionID"];
    //next hash this string using a standard MD5 algorithm (stringToMD5 function found
here)
    md5String = stringToMD5(specialString);
    //now concatanate the hashed string to the original URL
    specializedURL = URL + "MD5=" + md5String;
returnspecializedURL;
}
``` serializing objects, root URL identification, and identification of inconsequential elements in URLs among others. In certain embodiments the above operations involve inferring web page logic and structure based on observing HTTP requests and responses for the root object and the other objects on the page. In other embodiments of an acceleration system, a client-side component built into the web browser may be included. In embodiments of a web page acceleration system where the system has access to such a component built into the web browser, the inference may not be An example dynamic child URL could use both of the above functions and be generated as follows:

```
childURL = "http://mywebsite/myfooter.gif?";
childURL = makeURLUnique(childURL);
childURL = concatSpecialString(childURL);
Document.images[0].src = childURL;
```

The above would result in a request from a web browser for a URL of the following form on the network:

http://mywebsite/myfooter.gif?random=9999999&MD5=9e107d9d372bb6826bd81d3542a419d.

necessary because the structure and logic of the page may be understood by the browser in order to render the page.

In one particular embodiment, a child URL can be dynamically generated at page load time by concatenating a random number to the end of a URL. Such dynamic URLs are commonly used to generate unique URLs for a given The method used to generate this dynamic child URL would be very difficult to infer by observing instances as HTTP requests at a proxy. However a component in the browser may send the javascript code used to generate the child URL as part of the feedback sent from the browser to the feedback collector in the acceleration system.

One potential embodiment of a feedback message for the above web page transaction including the dynamic URL web browser operation may be:

```
Root
URL: http://mywebsite/
Last Modified Time: <timestamp here>
File Checksum: <checksum of object here>
File Size: <number of bytes in root object file here>
TimeToFirstByte: <milliseconds to receive the first byte in the response>
DownloadTime: <milliseconds from first to last byte in the response>
Child1
URL: dynamicChild1Function( )
Function dynamicChild1Function( )
{
childURL = "http://mywebsite/myfooter.gif?";
childURL = makeURLUnique(childURL);
childURL = concatSpecialString(childURL);
returnchildURL;
}
//referenced javascript functions including MD5 hashing function inserted
here
Last Modified Time:<timestamp here>
File Checksum: <checksum of object here>
File Size: <number of bytes in Child1 here>
TimeToFirstByte: <milliseconds to receive the first byte in the response>
DownloadTime: <milliseconds from first to last byte in the response>
Dependencies: Child2, Child3
Child2
URL: http://mywebsite/myicon.ico
Last Modified Time:<timestamp here>
File Checksum: <checksum of object here>
File Size: <number of bytes in Child2 here>
TimeToFirstByte: 500 ms
DownloadTime: From Cache
Dependencies: None
Child3
URL: http://mywebsite/myscripts.js
Last Modified Time:<timestamp here>
File Checksum: <checksum of object here>
File Size: <number of bytes in Child3 here>
TimeToFirstByte: From Cache
DownloadTime: From Cache
Dependencies: None
Child4
URL: http://myadserver/ad.gif
Last Modified Time:<timestamp here>
File Checksum: <checksum of object here>
File Size: <number of bytes of object here>
File Checksum: <checksum of object here>
File Size: <number of bytes in Child1 here>
Dependencies: None
```

In certain embodiments, such browser feedback may form the basis of prefetch hints supplied by either an optimization server in the assisted browsing architecture or the proxy server in the proxied architecture.

Other benefits of browser feedback are illustrated by the above-described example implementation. The browser feedback may indicate when a child object is read from browser cache and used as part of rendering the page without any networking communication with the web server. This addresses another weakness of network-based HTTP feedback—the challenge of distinguishing between objects that are no longer part of the page and objects that are just being read from cache and so don't show up in the network transaction. In the above example, TimeToFirstByte "From Cache" and DownloadTime "FromCache" indicate that the browser never communicated with the server.

Browser feedback can also provide information about inter-object dependencies that would otherwise need to be inferred. So, for instance, if makeURLUniquejavascript method is implemented in myscripts.js which is an object of Child 3 in the above example, then the Child 1 URL cannot be generated until Child 3 is downloaded. Likewise, if the response to Child 2 sets a cookie (SessionID cookie for instance), that is subsequently used to create a dynamic URL, or whose value is uploaded in the HTTP GET requests of subsequent objects sent to that host, then the requests for those objects are dependent on Child 2. Serializers are a specific case of inter-object dependencies where, during the course of rendering a page, a single object needs to be downloaded prior to any subsequent objects being requested on the page. In general, when the browser renders the page, it requests objects in a particular order. Ignoring limits on concurrent connections to hosts, this order is caused by the underlying interdependencies between the objects and this information is important for prefetching.

Browser feedback also provides perfect root object identification. In fact, it goes further by indicating which web control on the page was used to initiate the root object. So, for instance, browser feedback can indicate that the user clicked the "Search" button to initiate the root object request. Or the "submit" button. Or on the other hand, if the user clicked a link in an html header or an html footer. This type of click context information enables smarter root templating, which is where the acceleration system is able to identify child objects to prefetch for a give root object URL despite the fact that the exact root URL has never been seen before in the system.

The browser feedback described above can benefit both a proxied accelerator system as well as a web acceleration systems that includes a component inside the browser to perform prefetching. In general, browser-based feedback improves performance and efficiency as more objects are successfully prefetched with fewer extra objects downloaded that are not requested by the browser. Additional improvements may be seen when the web browser component not only provides feedback but also functions inside the browser to assist in the prefetching process itself. In such embodiments, the components such as browser acceleration component 206a functions both to provide feedback to an acceleration system and to improve the prefetching for objects in a web page transaction being currently executed by the web browser.

In certain such embodiments, when the user decides to initiate a page load either by clicking a link or pressing a button, the browser may request prefetch hints from the optimization server, prefetch analysis server, or proxy server.

In embodiments based on the above browser feedback described just above, these hints can take a similar form as the feedback itself. So, if the example feedback file was the result of the previous visit to http://mywebsite, then prefetch hints returned by the optimization server could take a similar form such that prefetch hint information sent to the browser comprises:

```
Root
URL: http://mywebsite/
Last Modified Time: <timestamp here>
File Checksum: <checksum of object here>
File Size: <number of bytes in root object file here>
TimeToFirstByte: <milliseconds to receive the first byte in the response>
DownloadTime: <milliseconds from first to last byte in the response>
Child1
URL: dynamicChild1Function( )
Function dynamicChild1Function( )
{
childURL = "http://mywebsite/myfooter.gif?";
childURL = makeURLUnique(childURL);
childURL = concatSpecialString(childURL);
returnchildURL;
```

-continued

```
}
//referenced javascript functions including MD5 hashing function inserted
here
Last Modified Time:<timestamp here>
File Checksum: <checksum of object here>
File Size: <number of bytes in Child1 here>
TimeToFirstByte: <milliseconds to receive the first byte in the response>
DownloadTime: <milliseconds from first to last byte in the response>
Dependencies: Child2, Child3
Child2
URL: http://mywebsite/myicon.ico
Last Modified Time:<timestamp here>
File Checksum: <checksum of object here>
File Size: <number of bytes in Child2 here>
TimeToFirstByte: 500 ms
DownloadTime: From Cache
Dependencies: None
Child3
URL: http://mywebsite/myscripts.js
Last Modified Time:<timestamp here>
File Checksum: <checksum of object here>
File Size: <number of bytes in Child3 here>
TimeToFirstByte: From Cache
DownloadTime: From Cache
Dependencies: None
Child4
URL: http://myadserver/ad.gif
Last Modified Time:<timestamp here>
File Checksum: <checksum of object here>
File Size: <number of bytes of object here>
File Checksum: <checksum of object here>
File Size: <number of bytes in Child1 here>
Dependencies: None
```

The browser may function using the prefetch hint information a smarter, dynamic manifest file that improves on any information that may be provided in an associated HTML5 manifest. The improved dynamic manifest file may cover all hosts referenced on the page, so for static objects, the improved manifest would allow the browser to issue the requests for these child objects in parallel as soon as the prefetch hints are received. In certain embodiments the manifest is "dynamic" because it did not need to be manually updated by the web developer, but may be instead be updated by the feedback from the proxy observation or the feedback from the browser acceleration component. Such a dynamic manifest file may be considered "smarter" because even the dynamic child objects with dependencies can be speculatively prefetched using, for example, the dynamic child creation methods described above or any similar such method for prefetching a dynamic child URL. In one embodiment, upon receipt of the manifest file, an acceleration system may compile the javascript associated with Child 1 and then execute all or part of the javascript to calculate the value of the URL for Child1 to enable prefetching. If at the time the browser needs to render this object, none of the variable input values (in this case SessionID only) have changed, then the system may use the prefetched copy.

Because the prefetcher can detect and enforce dependencies, this approach enables various embodiments to function in a way that is friendly to pages that update cookies during page load. Prefetched requests may thus be issued progressively for the first batch containing URLs that have no dependencies, and the second and subsequent containing URLs that depend on cookies being updated by the first batch of URLs. In certain embodiments, this applies to cookies that are updated via a Set-Cookie response header as well as those that are updated via javascript code executed in the browser. In alternate embodiments, the system may be amended to capture any cookie update that impacts child objects. In any embodiment, the prefetcher can be aware of a dependency and simply wait for the update to complete before issuing the dependent requests. In certain embodiments, prefetching may be used initially, and when errors or problems arise, the particular dependency may be flagged as a source of misses or fails and the system set to wait for the update prior to continuing with the web page transaction.

For embodiments that identify and prefetch dynamic children, the smart manifest or the prefetch hints may function most efficiently when they contain all the javascript used to generate the dynamic URL. Sections of javascript code that do not impact URL generation can be removed so that what is uploaded in the feedback and/or what is downloaded as part of the prefetch hints to the proxy server or web browser will contain only that code that is needed to generate the URL.

In certain embodiments structured with a manifest as described above, because of the other information in the manifest (Last Modified Time, Checksum, File Size), the browser may function to determine whether or not it can safely use an object in its cache without having to separately ask the web server about that object. Also, the file size can inform prefetch decisions. If the user is running over a narrowband connection, and the probability of use is low then the user can use browser-based prefetching components to decide not to prefetch the given object.

Therefore, for many embodiments, having a component inside the browser allows an acceleration system to gather significant amounts of detailed information about the structure and logic of the page and the page loading process that is not as easily or directly available to improve prefetching in a proxy-only embodiment. Further still, for embodiments that also have a browser component to read and act on the prefetch hints and to actively assist with prefetching for the web browser in addition to providing feedback, then prefetching success ratios and performance improvements may be even higher.

Figure 10:
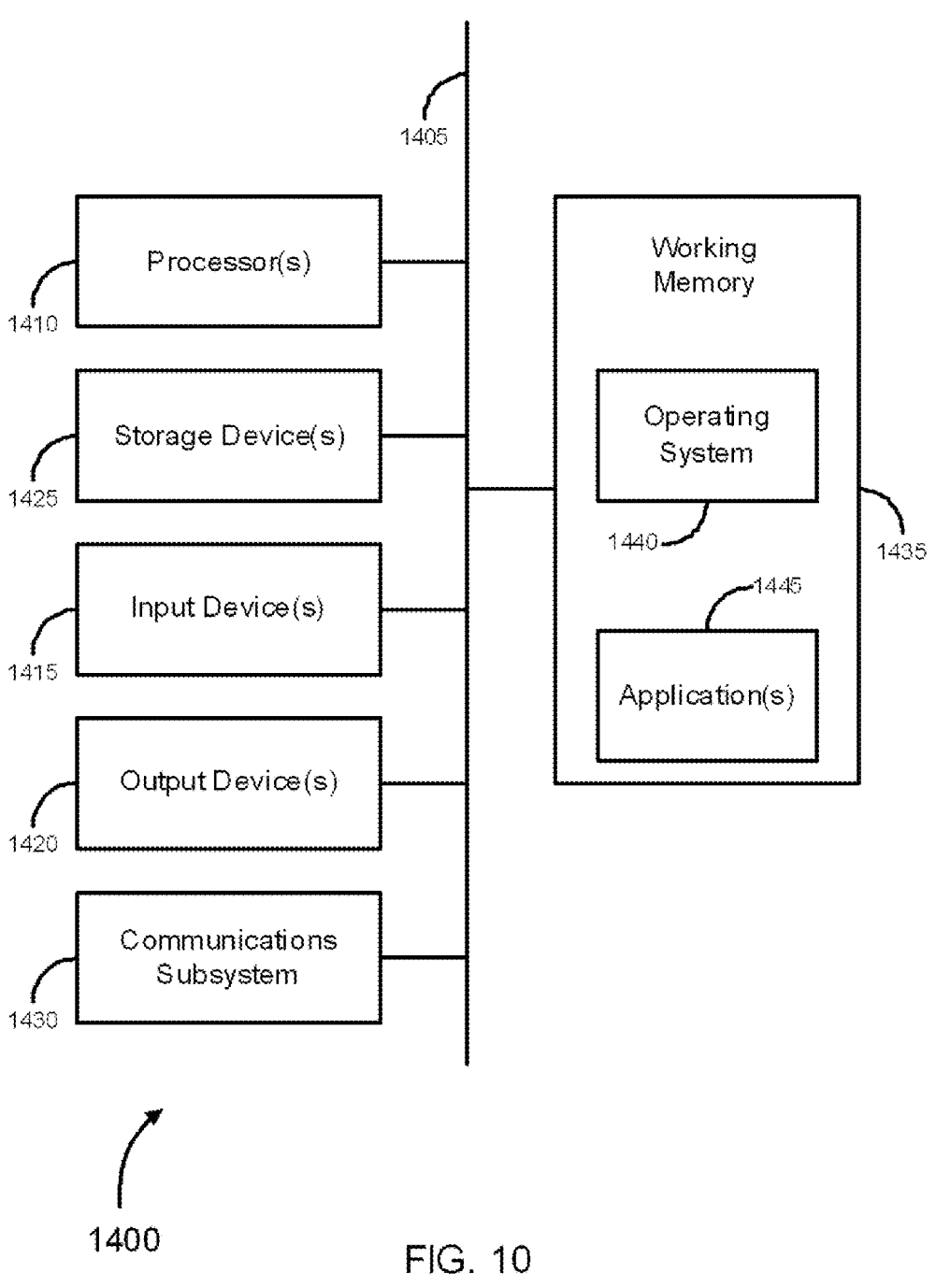
FIG. 10 illustrates a block diagram of one potential implementation of a computing device in accordance with one potential embodiment of the innovations presented herein.

FIG. 10 provides a schematic illustration of one embodiment of a computer system 1400 that can perform the methods of the invention, as described herein, and/or can function, for example, as any part of client 305, proxy server 320, or content server 330 in FIG. 3. It should be noted that FIG. 10 is meant only to provide a generalized illustration of various components, any or all of which may be utilized, as appropriate. FIG. 10, therefore, broadly illustrates how individual system elements may be implemented in a relatively separated or relatively more integrated manner.

The computer system 1400 is shown comprising hardware elements that can be electrically coupled via a bus 1405 (or may otherwise be in communication, as appropriate). The hardware elements can include one or more processors 1410, including, without limitation, one or more general-purpose processors and/or one or more special-purpose processors (such as digital signal processing chips, graphics acceleration chips, and/or the like); one or more input devices 1415, which can include, without limitation, a mouse, a keyboard, and/or the like; and one or more output devices 1420, which can include, without limitation, a display device, a printer, and/or the like.

The computer system 1400 may further include (and/or be in communication with) one or more storage devices 1425, which can comprise, without limitation, local and/or network accessible storage and/or can include, without limitation, a disk drive, a drive array, an optical storage device, a solid-state storage device such as a random access memory ("RAM") and/or a read-only memory ("ROM"), which can be programmable, flash-updateable, and/or the like. The computer system 1400 might also include a communications subsystem 1430, which can include, without limitation, a modem, a network card (wireless or wired), an infra-red communication device, a wireless communication device, and/or chipset (such as a Bluetooth device, an 802.11 device, a WiFi device, a WiMax device, cellular communication facilities, etc.), and/or the like. The communications subsystem 1430 may permit data to be exchanged with a network (such as the network described below, to name one example), and/or any other devices described herein. In many embodiments, the computer system 1400 will further comprise a working memory 1435, which can include a RAM or ROM device, as described above.

The computer system 1400 also can comprise software elements, shown as being currently located within the working memory 1435, including an operating system 1440 and/or other code, such as one or more application programs 1445, which may comprise computer programs of the invention, and/or may be designed to implement methods of the invention and/or configure systems of the invention, as described herein. Merely by way of example, one or more procedures described with respect to the method(s) discussed above might be implemented as code and/or instructions executable by a computer (and/or a processor within a computer). A set of these instructions and/or code might be stored on a non-transitory computer readable storage medium, such as the storage device(s) 1425 described above. In some cases, the storage medium might be incorporated within a computer system, such as the system 1400. In other embodiments, the storage medium might be separate from a computer system (i.e., a removable medium, such as a compact disc, etc.), and/or provided in an installation package, such that the storage medium can be used to program a general-purpose computer with the instructions/code stored thereon. These instructions might take the form of executable code, which is executable by the computer system 1400 and/or might take the form of source and/or installable code, which, upon compilation and/or installation on the computer system 1400 (e.g., using any of a variety of generally available compilers, installation programs, compression/decompression utilities, etc.), then takes the form of executable code.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

In one aspect, the invention employs a computer system (such as the computer system 1400) to perform methods of the invention. According to a set of embodiments, some or all of the procedures of such methods are performed by the computer system 1400 in response to processor 1410 executing one or more sequences of one or more instructions (which might be incorporated into the operating system 1440 and/or other code, such as an application program 1445) contained in the working memory 1435. Such instructions may be read into the working memory 1435 from another machine-readable medium, such as one or more of the storage device(s) 1425. Merely by way of example, execution of the sequences of instructions contained in the working memory 1435 might cause the processor(s) 1410 to perform one or more procedures of the methods described herein.

The terms "machine-readable medium" and "computer readable medium", as used herein, refer to any medium that participates in providing data that causes a machine to operate in a specific fashion. In an embodiment implemented using the computer system 1400, various machine-readable media might be involved in providing instructions/code to processor(s) 1410 for execution and/or might be used to store and/or carry such instructions/code (e.g., as signals). In many implementations, a computer readable medium is a physical and/or tangible storage medium. Such a medium may take many forms, including but not limited to, non-volatile media, volatile media, and transmission media. Non-volatile media includes, for example, optical or magnetic disks, such as the storage device(s) 1425. Volatile media includes, without limitation, dynamic memory, such as the working memory 1435. Transmission media includes coaxial cables, copper wire, and fiber optics, including the wires that comprise the bus 1405, as well as the various components of the communications subsystem 1430 (and/or the media by which the communications subsystem 1430 provides communication with other devices). Hence, transmission media can also take the form of waves (including, without limitation, radio, acoustic, and/or light waves, such as those generated during radio-wave and infra-red data communications).

Common forms of physical and/or tangible computer readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, an EPROM, a FLASH-EPROM, any other memory chip or cartridge, a carrier wave as described hereinafter, or any other medium from which a computer can read instructions and/or code.

Various forms of machine-readable media may be involved in carrying one or more sequences of one or more instructions to the processor(s) 1410 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 1400. These signals, which might be in the form of electromagnetic signals, acoustic signals, optical signals, and/or the like, are all examples of carrier waves on which instructions can be encoded, in accordance with various embodiments of the invention.

The communications subsystem 1430 (and/or components thereof) generally will receive the signals, and the bus 1405 then might carry the signals (and/or the data, instructions, etc., carried by the signals) to the working memory 1435, from which the processor(s) 1405 retrieves and executes the instructions. The instructions received by the working memory 1435 may optionally be stored on a storage device 1425 either before or after execution by the processor(s) 1410.

Figure 11:
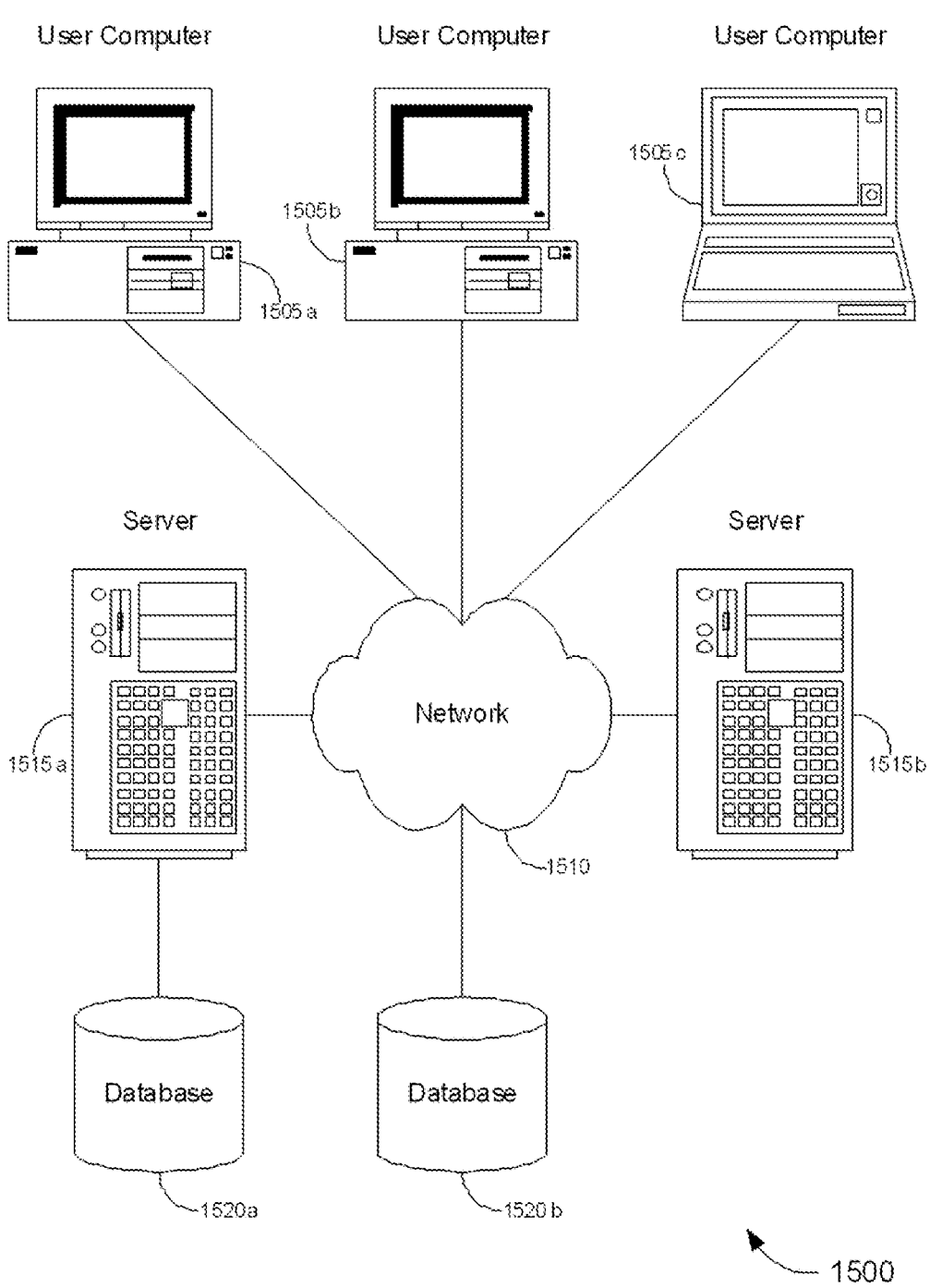
FIG. 11 illustrates a block diagram of one potential implementation of a communications system in accordance with one potential embodiment of the innovations presented herein.

A set of embodiments comprises systems for implementing staged configurator modeling. In one embodiment, proxy server 320 and/or client 305 (as shown in FIG. 3) may be implemented as computer system 1400 in FIG. 10. Merely by way of example, FIG. 11 illustrates a schematic diagram of a system 1500 that can be used in accordance with one set of embodiments. The system 1500 can include one or more user computers 1505. The user computers 1505 can be general purpose personal computers (including, merely by way of example, personal computers and/or laptop computers running any appropriate flavor of Microsoft Corp.'s Windows™ and/or Apple Corp.'s Macintosh™ operating systems) and/or workstation computers running any of a variety of commercially-available UNIX™ or UNIX-like operating systems. These user computers 1505 can also have any of a variety of applications, including one or more applications configured to perform methods of the invention, as well as one or more office applications, database client and/or server applications, and web browser applications. Alternatively, the user computers 1505 can be any other electronic device, such as a thin-client computer, Internet-enabled mobile telephone, and/or personal digital assistant (PDA), capable of communicating via a network (e.g., the network 1510 described below) and/or displaying and navigating web pages or other types of electronic documents. Although the exemplary system 1500 is shown with three user computers 1505, any number of user computers can be supported.

Certain embodiments of the invention operate in a networked environment, which can include a network 1510. The network 1510 can be any type of network familiar to those skilled in the art that can support data communications using any of a variety of commercially-available protocols, including, without limitation, TCP/IP, SNA, IPX, Apple-Talk, and the like. Merely by way of example, the network 1510 can be a local area network ("LAN"), including, without limitation, an Ethernet network, a Token-Ring network and/or the like; a wide-area network (WAN); a virtual network, including, without limitation, a virtual private network ("VPN"); the Internet; an intranet; an extranet; a public switched telephone network ("PSTN"); an infra-red network; a wireless network, including, without limitation, a network operating under any of the IEEE 802.11 suite of protocols, the Bluetooth™ protocol known in the art, and/or any other wireless protocol; and/or any combination of these and/or other networks.

Embodiments of the invention can include one or more server computers 1515. Each of the server computers 1515 may be configured with an operating system, including, without limitation, any of those discussed above, as well as any commercially (or freely) available server operating systems. Each of the servers 1515 may also be running one or more applications, which can be configured to provide services to one or more user computers 1505 and/or other servers 1515.

Merely by way of example, one of the servers 1515 may be a web server, which can be used, merely by way of example, to process requests for web pages or other electronic documents from user computers 1505. The web server can also run a variety of server applications, including HTTP servers, FTP servers, CGI servers, database servers, Java™ servers, and the like. In some embodiments of the invention, the web server may be configured to serve web pages that can be operated within a web browser on one or more of the user computers 1505 to perform methods of the invention.

The server computers 1515, in some embodiments, might include one or more application servers, which can include one or more applications accessible by a client running on one or more of the client computers 1505 and/or other servers 1515. Merely by way of example, the server(s) 1515 can be one or more general purpose computers capable of executing programs or scripts in response to the user computers 1505 and/or other servers 1515, including, without limitation, web applications (which might, in some cases, be configured to perform methods of the invention). Merely by way of example, a web application can be implemented as one or more scripts or programs written in any suitable programming language, such as Java™, C, C#™, or C++, and/or any scripting language, such as Perl, Python, or TCL, as well as combinations of any programming/scripting languages. The application server(s) can also include database servers, including without limitation those commercially available from Oracle™, Microsoft™, Sybase™, IBM™, and the like, which can process requests from clients (including, depending on the configurator, database clients, API clients, web browsers, etc.) running on a user computer 1505 and/or another server 1515. In some embodiments, an application server can create web pages dynamically for displaying the information in accordance with embodiments of the invention, such as information displayed on web browser 106 in FIG. 1. Data provided by an application server may be formatted as web pages (comprising HTML, Javascript, etc., for example) and/or may be forwarded to a user computer 1505 via a web server (as described above, for example). Similarly, a web server might receive web page requests and/or input data from a user computer 1505 and/or forward the web page requests and/or input data to an application server. In some cases, a web server may be integrated with an application server.

In accordance with further embodiments, one or more servers 1515 can function as a file server and/or can include one or more of the files (e.g., application code, data files, etc.) necessary to implement methods of the invention incorporated by an application running on a user computer 1505 and/or another server 1515. Alternatively, as those skilled in the art will appreciate, a file server can include all necessary files, allowing such an application to be invoked remotely by a user computer 1505 and/or server 1515. It should be noted that the functions described with respect to various servers herein (e.g., application server, database server, web server, file server, etc.) can be performed by a single server and/or a plurality of specialized servers, depending on implementation-specific needs and parameters.

In certain embodiments, the system can include one or more databases 1520. The location of the database(s) 1520 is discretionary: merely by way of example, a database 1520*a* might reside on a storage medium local to (and/or resident in) a server 1515*a* (and/or a user computer 1505). Alternatively, a database 1520*b* can be remote from any or all of the computers 1505 or servers 1515, so long as the database 1520*b* can be in communication (e.g., via the network 1510) with one or more of these. In a particular set of embodiments, a database 1520 can reside in a storage-area network ("SAN") familiar to those skilled in the art. (Likewise, any necessary files for performing the functions attributed to the computers 1505 or servers 1515 can be stored locally on the respective computer and/or remotely, as appropriate.) In one set of embodiments, the database 1520 can be a relational database, such as an Oracle™ database, that is adapted to store, update, and retrieve data in response to SQL-formatted commands. The database might be controlled and/or maintained by a database server, as described above, for example.

Multiple non-limiting embodiments are presented which describe systems and methods for internet performance. In certain embodiments, a system using smart tracking of parameters in web page transactions is used to improve prefetching performance by gathering information for a web browser prefetching component and/or integrating system level prefetching with the browser prefetching component. In one embodiment, an input URL and associated dynamic response data are analyzed for nested or dependent relationships. These relationships may be between children of a root HTTP request or may be reliant on further input. In further embodiments, a prefetching system identifies how information from a prefetch response or a subsequent web application request during a page download may be used to synthesize dynamic fields in a child URL. In further additional embodiments, the relationships are recorded in a smart manifest, and may be served from a hinting server to a web browsers in response to an indication that the user will select a root object associated with the smart manifest.

In one potential non-limiting embodiment, a system, device, or method functions by observing, using a computer, a web transaction including an HTTP request; creating a set of web transaction information based on the observing of the web transaction; receiving, at a database computing device the set of web transaction information; updating, using the set of web transaction information at the database computing device, hint information associated with efficient downloading of a subsequent web page associated with the HTTP request.

Further embodiments may function where the set of web transaction information comprises a root HTTP request and a list of child HTTP requests and child HTTP responses.

Further embodiments may function where the set of web transaction information further comprises request and response timings for the child HTTP requests and child HTTP responses.

Further embodiments may function where updating the hint information comprises parsing the request and response timings to identify a child object download order; and including child object download order information in the hint information.

Further embodiments may function where the set of web transaction information comprises a set of formula used to create at least one child URL and a list of input sources for the set of formula.

Further embodiments may function where the set of web transaction information comprises a list of interdependency relationships between child objects.

Further embodiments may function where the computer is a proxy server and the internet optimization server is the proxy server.

Further embodiments may function where the computer is a user computer operating a web browser that initiates the web transaction.

Further embodiments may function where the input sources are specified in javascript source code and javascript functions.

Further embodiments may function where the hint information comprises a list of one or more child objects for the HTTP request of the web transaction.

Further embodiments may function where the one or more child objects comprises at least two child objects from different hosts.

Further embodiments may function where the method further comprises communicating the smart manifest to a web browser; and using the smart manifest with a browser plug in module to render a web page associated with the web transaction.

Further embodiments may function where the hint information comprises a manifest file that includes information associated with efficient downloading of a subsequent web page associated with the HTTP request.

In one potential non-limiting embodiment, a system, device, or method functions by transmitting, from a user computer to an optimization server, a hint request based on a user browsing indicator associated with a root HTTP request; receiving, at the user computer, a set of hints associated with the root object in response to the transmission of the hint request; transmitting, from the user computer to a content server, the root HTTP request; transmitting at least one child HTTP request based on at least one of the set of hints; wherein the optimization server is different than the content server.

Further embodiments may function where the method further comprises prefetching all child objects for the root HTTP request based on the set of hints, wherein the set of hints comprises a list of all child objects for the root HTTP request.

Further embodiments may function where the set of hints further comprises a file size, a last mod time, and a checksum for a child URL of the list of child URLs.

Further embodiments may function where the set of hints further comprises a list of interdependencies among the URLs; and wherein prefetching all child objects for the root HTTP request comprises requesting a first subset of the child objects and then requesting a second subset of the child objects that is dependent upon the first subset of the child objects.

Further embodiments may function where the set of hints further comprises a list of generated child URLs and a set of information required for the list of generated child URLs; and wherein prefetching all the child objects comprises using the set of information to create at least one generated child URLs and an HTTP request for the at least one generated child URL.

Further embodiments may function where transmitting at least one child HTTP request based on at least one of the set of hints comprises transmitting the child HTTP request to an alternate URL when the set of hints further comprises the alternative URL for the child object.

Further embodiments may function where the alternative URL is for a URL at a dynamic CDN.

Further embodiments may function by recording, at the user computer, a set of transaction information for the page load process involving the root object as modified by the set of hints.

Further embodiments may function by comprising transmitting to a database, the set of transaction information.

In one potential non-limiting embodiment, a system, device, or method functions by receiving a set of web transaction information associated with a root object at a computer; analyzing the set of web transaction information to create a set of hints associated with the root object; receiving a hint request at the computer; transmitting the set of hints in response to receiving the hint request.

Further embodiments may function whereby receiving, at the computer, a set of web transaction update information associated with the root object in response to the transmission of the set of hints.

Further embodiments may function where receiving the set of web transaction information comprises communicating a set of information requests to a content server from a prefetch assistance server, receiving a set of information responses at the prefetch assistance server, and analyzing the set of requests and the set of responses to identify the set of web transaction information associated with the root object.

Further embodiments may function where the transmitting, the root HTTP request occurs prior to the receiving of the set of hints.

Further embodiments may function where set of information comprises at least one formula and instructions for retrieving any information required by the at least one formula.

In one potential non-limiting embodiment, a system, device, or method functions by receiving a hint request at an internet optimization server from a user computer, wherein the hint request identifies a root http object and the root http object identifies a content server that is different than the internet optimization server; requesting, by the internet optimization server from a hint database, hint information associated with the root http object; and transmitting the hint information to the user computer.

In one potential non-limiting embodiment, a system, device, or method functions by observing, with a web browser plug-in operating on a computer, at least a portion of a first web page transaction in a web browser operating on the computer, the first web page transaction comprising: a first HTTP request from the web browser, and resulting therefrom: a first HTTP response, and at least one child HTTP request; identifying, using the web browser plug-in, transaction information from the observing of the at least a portion of the first web page transaction; communicating transaction information to a prefetching system in a communication separate from the first web page transaction; and performing a prefetch operation using the transaction information from the web browser plug-in.

Further embodiments may function where the prefetching system comprises a proxy server, wherein the proxy server prefetches the at least one child HTTP request from a content server to the proxy server in response to receipt of the transaction information at the proxy server.

Further embodiments may function where the prefetching system comprises a web page transaction database module operating on the computer; and wherein the transaction information comprises the first HTTP request.

Further embodiments may function where performing the prefetch operation using the transaction information comprises searching the web page transaction database module for a record associated with the first web page transaction; and prefetching a list of child objects from the record associated with the first web page transaction.

Further embodiments may function where the transaction information further comprises a list of child objects observed by the web browser plug-in to be part of the first web page transaction; and wherein performing the prefetch operation comprises: storing the transaction information in the web page transaction database module; receiving, at the web page transaction database module, a second transaction information communication associated with a second web page transaction, wherein the second transaction information communication identifies the first HTTP request as part of the second web page transaction; communicating the list of the child objects from the web page transaction database module to the web browser plug-in in response to the second transaction information communication; and prefetching, using the web browser plug-in, the child objects; and rendering, using the web browser, a second web page for the second web page transaction using the child objects prefetched by the web browser plug-in.

Further embodiments may function where the prefetching system comprises a browser assistance server; and wherein the transaction information comprises the first HTTP request.

Further embodiments may function where performing the prefetch operation using the transaction information comprises receiving a set of prefetch hints at the computer from the browsing assistance server in response to communicating the transaction information.

Further embodiments may function where the set of prefetch hints comprises a list of child objects; wherein performing the prefetch operation further comprises prefetching the set of child objects.

Further embodiments may function where the set of prefetch hints further comprises a set of instructions for creating a dynamic child URL associated with the first HTTP request; wherein performing the prefetch operation further comprises constructing the dynamic child URL using the set of instructions and prefetching the dynamic child URL.

Further embodiments may function where observing the web page transaction further comprises observing browser execution of an instruction associated with the first web page transaction; and wherein the transaction information comprises the instruction and an associated object.

Further embodiments may function where the instruction is a javascript function call.

Further embodiments may function where the javascript function is rand( )

Further embodiments may function where the transaction information comprises a session id associated with the first web page transaction.

Further embodiments may function where the transaction information comprises a user configuration associated with the computer.

Further embodiments may function where the transaction information comprises a cookie associated with the first web page transaction.

Further embodiments may function by recording, in a transaction history record using the browser plug-in, a user indication associated with the first web page transaction, the first HTTP request, the first HTTP response, child request and response information, and a total render time for the first web page transaction; and communicating the transaction history record to the prefetching system following a web page rendering associated with the first web page transaction.

In one potential non-limiting embodiment, a system, device, or method functions by identifying, using a module operating on a computer, a function by which a web browser operating on the computer constructs a dynamic child URL for a root object.

In one potential non-limiting embodiment, a system, device, or method functions by observing with a web browser plug in at least a portion of a first web page transaction comprising: a first HTTP request from the web browser, and resulting therefrom: a first HTTP response, and at least one child HTTP request, wherein the at least one child HTTP request is constructed by the web browser using web transaction instructions; identifying, using the web browser plug in module, a set of inputs to the set of functions from the first root HTTP response and further identifying the set of functions.

Further embodiments may function by associating the first HTTP request with the set of functions and the set of inputs to the set of functions to create web page manifest data; and communicating the web page manifest data to a hint server.

In one potential non-limiting embodiment, a system, device, or method functions by requesting, by a server computer, an HTTP object from a content server; scanning the HTTP object to identify prefetch hint information for the HTTP object; and updating a manifest file associated with the HTTP object using the prefetch hint information.

In one potential non-limiting embodiment, a system, device, or method functions by identifying a plurality of child objects associated with the HTTP object; performing, by the server computer, a transaction to fetch the child objects; analyzing, at the server computer, the transaction to fetch the child objects to identify additional prefetch hint information for the HTTP object.

Further embodiments may function where the additional prefetch hint information comprises server responsiveness.

Further embodiments may function where analyzing the transaction to fetch the child objects comprises creating transaction performance data from the transaction, updating a transaction performance history based on the transaction performance data and, performing a statistical analysis on transaction performance history to created prefetch hint information.

In one potential non-limiting embodiment, a system, device, or method functions by observing, using a computing device, a web transaction including a root HTTP request and a plurality of child HTTP requests and responses; recording a set of timing information for the web page transaction; calculating, for at least one child object, an expected page load time impact associated with caching the at least one child object; adjusting a caching priority for the at least one child object based on the expected page load time impact; and making a caching decision based on the caching priority.

Further embodiments may function where the caching priority is for a local cache on a user computer that is different from the computing device.

Further embodiments may function where the caching priority is for a cache on a dynamic CDN.

Further embodiments may function by communicating the timing information from the computing device to an internet optimization server, wherein the calculating the expected page load time impact is performed on the internet optimization server.

Further embodiments may function where the set of timing information includes server responsiveness timing.

Further embodiments may function where the set of timing information includes an object download time.

Further embodiments may function where the set of timing information includes an overall page load time from user selection to complete web page rendering.

Further embodiments may function where the expected page load time impact comprises a first impact associated with a single user and a second impact associated with a group of users.

Further embodiments may function where adjusting a caching priority for the at least one child object based on the expected page load time impact comprises adjusting a caching priority based on the second impact associated with the group of users.

Further embodiments may function where the expected page load time impact is a time saved per byte of cache used over a caching period.

Further embodiments may function where the caching period is a freshness period specified by a content owner.

Further embodiments may function where the expected page load time impact is based on multiple expected future page loads for at least two separate web pages that use the at least one child object; wherein the multiple expected future page loads are determined using a page load history for the at least two separate web pages.

Further embodiments may function where the first impact is based on a bandwidth associated with the single user.

Further embodiments may function where the second impact is based on a content server responsiveness associated with the at least one child object.

Further embodiments may function by identifying, using the computing device, a cause of the expected page load time impact; and transmitting, using the computing device, a message including the cause of the expected page load time impact and the expected page load time impact.

Further embodiments may function where the web transaction is initiated by a web crawler operating on the computing device.

While the invention has been described with respect to exemplary embodiments, one skilled in the art will recognize that numerous modifications are possible. For example, the methods and processes described herein may be implemented using hardware components, software components, and/or any combination thereof. Further, while various methods and processes described herein may be described with respect to particular structural and/or functional components for ease of description, methods of the invention are not limited to any particular structural and/or functional architecture but instead can be implemented on any suitable hardware, firmware, and/or software configurator. Similarly, while various functionalities are ascribed to certain system components, unless the context dictates otherwise, this functionality can be distributed among various other system components in accordance with different embodiments of the invention.

Moreover, while the procedures comprised in the methods and processes described herein are described in a particular order for ease of description, unless the context dictates otherwise, various procedures may be reordered, added, and/or omitted in accordance with various embodiments of the invention. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments are described with—or without-certain features for ease of description and to illustrate exemplary features, the various components and/or features described herein with respect to a particular embodiment can be substituted, added, and/or subtracted from among other described embodiments, unless the context dictates otherwise. Consequently, although the invention has been described with respect to exemplary embodiments, it will be appreciated that the invention is intended to cover all modifications and equivalents within the scope of the following claims.

What is claimed is:

1. A method of rendering a web page, the method comprising:

responsive to a request for the web page, receiving, by a client computing device, a first hint for the requested web page, the first hint identifying a first web object transaction for obtaining a first web object of a plurality of web objects of the web page;

initiating, by the client computing device, the first web object transaction to obtain the first web object;

receiving, by the client computing device, the web page; and rendering, by the client computing device, the web page utilizing the first web object.

2. The method of claim 1, wherein initiating, by the client computing device, the first web object transaction to obtain the first web object occurs prior to the client computing device receiving the web page.

3. The method of claim 1, wherein the first web object transaction comprises a first plurality of steps for obtaining the first web object.

4. The method of claim 3, wherein:

the first hint further identifies a first server on which the first web object is stored; and the first plurality of steps is for obtaining the first web object from the first server.

5. The method of claim 4, wherein the first plurality of steps comprises:

establishing, by the client computing device, a connection with the first server.

6. The method of claim 5, wherein the first plurality of steps further comprises:

fetching, by the client computing device over the connection to the first server, the first web object.

7. The method of claim 6 further comprising:

receiving, by a client computing device, a second hint identifying a second web object transaction for obtaining a second web object of the plurality of web objects of the web page;

wherein the second web object transaction comprises a second plurality of steps for obtaining the second web object.

8. The method of claim 7, wherein:

the second hint further identifies a second server, different from the first server, on which the second web object is stored; and the second plurality of steps is for obtaining the second web object from the second server.

9. The method of claim 8, wherein the first server is on a first domain and the second server is on a second domain different from the first domain.

10. The method of claim 4, wherein:

receiving the web page comprises receiving the web page from a web server different than the first server.

11. The method of claim 3, wherein:

the first hint comprises an identifier identifying the first web object; and the first plurality of steps comprises performing a DNS operation on the identifier.

12. The method of claim 1, wherein the first hint indicates the first web object is an actual web object of the web page.

13. The method of claim 1, further comprising:

receiving, by the client computing device, a plurality of hints each identifying a web object transaction for obtaining an associated web object of the plurality of web objects of the web page, wherein:

the plurality of hints includes the first hint identifying the first web object transaction for obtaining the first web object;

each of the plurality of hints comprises a priority identifier; and initiating, by the client computing device prior to the client computing device receiving the web page, the first web object transaction identified by the first hint to obtain the first web object comprises:

for each of the plurality of hints, initiating, by the client computing device, the web object transaction identified by the hint based on the priority identifier.

14. The method of claim 1, further comprising:

receiving, by the client computing device, a plurality of hints each identifying a web object transaction for obtaining an associated web object of the plurality of web objects of the web page, wherein:

the plurality of hints includes the first hint identifying the first web object transaction for obtaining the first web object;

each of the plurality of hints comprises an order identifier that identifies an order the associated web object is to be prefetched with respect to the associated objects of the other of the plurality of hints; and initiating, by the client computing device prior to the client computing device receiving the web page, the first web object transaction identified by the first hint to obtain the first web object comprises:

initiating, by the client computing device, the web object transactions identified by the plurality of hints in the order determined from the order identifiers.

15. The method of claim 1, wherein the received first hint further identifies the first web object as being dependent on a cookie.

16. The method of claim 1, wherein the received first hint further identifies a probability of the first web object being used in a future rendering of the web page.

17. The method of claim 1, further comprising:

receiving, by the client computing device, a plurality of hints each identifying a web object transaction for obtaining an associated web object of the plurality of web objects of the web page, wherein the plurality of hints includes the first hint identifying the first web object transaction for obtaining the first web object; and identifying one or more interdependencies between the associated web objects of two or more of the plurality of hints.

18. The method of claim 1, wherein the first hint is part of a set of hints for use with a plurality of web pages that share a common URL parameter.

19. The method of claim 1, wherein the first hint is part of a set of hints for use with a plurality of web pages on a common domain.

20. The method of claim 1 further comprising:

making, via the client computing device, the request for the web page.

21. A client computing device for rendering a web page, the client computing device comprising:

at least one processor and a memory device that stores an application that, when loaded into the at least one processor, causes the at least one processor to:

responsive to a request for the web page, receive a first hint for the requested web page, the first hint identifying a first web object transaction for obtaining a first web object of a plurality of web objects of the web page;

initiate the first web object transaction to obtain the first web object;

receive the web page; and render the web page utilizing the first web object.

22. The client computing device of claim 21, wherein the application further causes the at least one processor to initiate the first web object transaction to obtain the first web object prior to receipt of the web page.

23. The client computing device of claim 21, wherein the first web object transaction comprises a first plurality of steps for obtaining the first web object and the application causes the at least one processor to perform the first plurality of steps.

24. The client computing device of claim 23, wherein:

the first hint further identifies a first server on which the first web object is stored; and the first plurality of steps is for obtaining the first web object from the first server.

25. The client computing device of claim 24, wherein the first plurality of steps causes the at least one processor to establish a connection with the first server.

26. The client computing device of claim 25, wherein the first plurality of steps further causes the at least one processor to fetch, over the connection to the first server, the first web object.

27. The client computing device of claim 26, wherein the application further causes the at least one processor to:

receive a second hint identifying a second web object transaction for obtaining a second web object of the plurality of web objects of the web page;

wherein the second web object transaction comprises a second plurality of steps for obtaining the second web object.

28. The client computing device of claim 27, wherein:

the second hint further identifies a second server, different from the first server, on which the second web object is stored; and the second plurality of steps is for obtaining the second web object from the second server.

29. The client computing device of claim 28, wherein the first server is on a first domain and the second server is on a second domain different from the first domain.

30. The client computing device of claim 21, wherein the application further causes the at least one processor to:

receive a plurality of hints each identifying a web object transaction for obtaining an associated web object of the plurality of web objects of the web page, wherein:

the plurality of hints includes the first hint identifying the first web object transaction for obtaining the first web object;

each of the plurality of hints comprises a priority identifier; and the application further causes the at least one processor to:

for each of the plurality of hints, initiate the web object transaction identified by the hint based on the priority identifier.

31. The client computing device of claim 21, wherein the application further causes the at least one processor to:

receive a plurality of hints each identifying a web object transaction for obtaining an associated web object of the plurality of web objects of the web page, wherein:

the plurality of hints includes the first hint identifying the first web object transaction for obtaining the first web object;

each of the plurality of hints comprises an order identifier that identifies an order the associated web object is to be prefetched with respect to the associated objects of the other of the plurality of hints; and the application further causes the at least one processor to:

initiate, by the client computing device, the web object transactions identified by the plurality of hints in the order determined from the order identifiers.

32. The client computing device of claim 21, wherein the application further adapts the at least one processor to:

receive a plurality of hints each identifying a web object transaction for obtaining an associated web object of the plurality of web objects of the web page, wherein the plurality of hints includes the first hint identifying the first web object transaction for obtaining the first web object; and identify one or more interdependencies between the associated web objects of two or more of the plurality of hints.

33. The client computing device of claim 21, wherein the application further causes the at least one processor to:

make the request for the web page.

34. A non-transitory computer-readable medium storing instructions that when loaded into at least one processor causes the at least one processor to:

responsive to a request for a web page, receive a first hint for the requested web page, the first hint identifying a first web object transaction for obtaining a first web object of a plurality of web objects of the web page;

initiate the first web object transaction to obtain the first web object;

receive the web page; and render the web page utilizing the first web object.

35. The non-transitory computer-readable medium of claim 34, wherein the stored instructions further cause the at least one processor to initiate the first web object transaction to obtain the first web object prior to receipt of the web page.

36. The non-transitory computer-readable medium of claim 34, wherein the first web object transaction comprises a first plurality of steps for obtaining the first web object, and the stored instructions further cause the at least one processor to perform the first plurality of steps.

37. The non-transitory computer-readable medium of claim 36, wherein:

the first hint further identifies a first server on which the first web object is stored; and the first plurality of steps is for obtaining the first web object from the first server.

38. The non-transitory computer-readable medium of claim 37, wherein the first plurality of steps causes the at least one processor to establish a connection with the first server.

39. The non-transitory computer-readable medium of claim 38, wherein the first plurality of steps further causes the at least one processor to fetch, over the connection to the first server, the first web object.

40. The non-transitory computer-readable medium of claim 39, wherein the stored instructions further cause the at least one processor to:

receive a second hint identifying a second web object transaction for obtaining a second web object of the plurality of web objects of the web page;

wherein the second web object transaction comprises a second plurality of steps for obtaining the second web object.

41. The non-transitory computer-readable medium of claim 40, wherein:

the second hint further identifies a second server, different from the first server, on which the second web object is stored; and the second plurality of steps is for obtaining the second web object from the second server.

42. The non-transitory computer-readable medium of claim 41, wherein the first server is on a first domain and the second server is on a second domain different from the first domain.

43. The non-transitory computer-readable medium of claim 34, wherein the stored instructions further cause the at least one processor to:

receive a plurality of hints each identifying a web object transaction for obtaining an associated web object of the plurality of web objects of the web page, wherein:

the plurality of hints includes the first hint identifying the first web object transaction for obtaining the first web object;

each of the plurality of hints comprises a priority identifier; and the stored instructions further causes the at least one processor to:

for each of the plurality of hints, initiate the web object transaction identified by the hint based on the priority identifier.

44. The non-transitory computer-readable medium of claim 34, wherein the stored instructions further cause the at least one processor to:

receive a plurality of hints each identifying a web object transaction for obtaining an associated web object of the plurality of web objects of the web page, wherein:

the plurality of hints includes the first hint identifying the first web object transaction for obtaining the first web object;

each of the plurality of hints comprises an order identifier that identifies an order the associated web object is to be prefetched with respect to the associated objects of the other of the plurality of hints; and the stored instructions further causes the at least one processor to:

initiate the web object transactions identified by the plurality of hints in the order determined from the order identifiers.

45. The non-transitory computer-readable medium of claim 34, wherein the stored instructions further cause the at least one processor to:

receive a plurality of hints each identifying a web object transaction for obtaining an associated web object of the plurality of web objects of the web page, wherein the plurality of hints includes the first hint identifying the first web object transaction for obtaining the first web object; and identify one or more interdependencies between the associated web objects of two or more of the plurality of hints.

46. The non-transitory computer-readable medium of claim 34, wherein the stored instructions further cause the at least one processor to:

make the request for the web page.

47. A method of rendering a web page, the method comprising:

receiving, by a client computing device, a first hint identifying a first web object transaction for obtaining a first web object of a plurality of web objects of the web page, wherein:

the first web object transaction comprises a first plurality of steps for obtaining the first web object, the first hint further identifies a first server on which the first web object is stored, and the first plurality of steps is for obtaining the first web object from the first server;

initiating, by the client computing device, the first web object transaction to obtain the first web object;

wherein the first plurality of steps comprises establishing, by the client computing device, a connection with the first server, and fetching, by the client computing device over the connection to the first server, the first web object;

wherein the method further comprises:

receiving, by a client computing device, a second hint identifying a second web object transaction for obtaining a second web object of the plurality of web objects of the web page, wherein:

the second web object transaction comprises a second plurality of steps for obtaining the second web object;

the second hint further identifies a second server, different from the first server, on which the second web object is stored; and the second plurality of steps is for obtaining the second web object from the second server;

wherein the method further comprises:

receiving, by the client computing device, the web page; and rendering, by the client computing device, the web page utilizing the first web object.

48. The method of claim 47, wherein the first server is on a first domain and the second server is on a second domain different from the first domain.

49. A client computing device for rendering a web page, the client computing device comprising:

at least one processor and a memory device that stores an application that, when loaded into the at least one processor, causes the at least one processor to:

receive a first hint identifying a first web object transaction for obtaining a first web object of a plurality of web objects of the web page, wherein:

the first web object transaction comprises a first plurality of steps for obtaining the first web object, the application causes the at least one processor to perform the first plurality of steps, the first hint further identifies a first server on which the first web object is stored, and the first plurality of steps is for obtaining the first web object from the first server and causes the at least one processor to: establish a connection with the first server, and fetch, over the connection to the first server, the first web object;

wherein the application further causes the at least one processor to:

initiate the first web object transaction to obtain the first web object;

receive a second hint identifying a second web object transaction for obtaining a second web object of the plurality of web objects of the web page;

wherein:

the second web object transaction comprises a second plurality of steps for obtaining the second web object;

the second hint further identifies a second server, different from the first server, on which the second web object is stored; and the second plurality of steps is for obtaining the second web object from the second server;

wherein the application further causes the at least one processor to:

receive the web page; and render the web page utilizing the first web object.

50. The client computing device of claim 49, wherein the first server is on a first domain and the second server is on a second domain different from the first domain.

51. A non-transitory computer-readable medium storing instructions that when loaded into at least one processor causes the at least one processor to:

receive a first hint identifying a first web object transaction for obtaining a first web object of a plurality of web objects of a web page, wherein:

the first web object transaction comprises a first plurality of steps for obtaining the first web object, and the stored instructions further cause the at least one processor to perform the first plurality of steps;

the first hint further identifies a first server on which the first web object is stored; and the first plurality of steps is for obtaining the first web object from the first server and causes the at least one processor to establish a connection with the first server and fetch, over the connection to the first server, the first web object;

initiate the first web object transaction to obtain the first web object;

receive a second hint identifying a second web object transaction for obtaining a second web object of the plurality of web objects of the web page;

wherein:

the second web object transaction comprises a second plurality of steps for obtaining the second web object;

the second hint further identifies a second server, different from the first server, on which the second web object is stored; and the second plurality of steps is for obtaining the second web object from the second server;

wherein the stored instructions further cause the at least one processor to:

receive the web page; and render the web page utilizing the first web object.

52. The non-transitory computer-readable medium of claim 51, wherein the first server is on a first domain and the second server is on a second domain different from the first domain.

* * * * *